(12) United States Patent
Lee

(10) Patent No.: US 12,499,011 B2
(45) Date of Patent: Dec. 16, 2025

(54) APPARATUS AND METHOD FOR DISTRIBUTING AND STORING WRITE DATA IN PLURAL MEMORY REGIONS

(71) Applicant: SK hynix Inc., Gyeonggi-do (KR)

(72) Inventor: Dong Sop Lee, Gyeonggi-do (KR)

(73) Assignee: SK hynix Inc., Gyeonggi-do (KR)

(*) Notice: Subject to any disclaimer, the term of this patent is extended or adjusted under 35 U.S.C. 154(b) by 109 days.

(21) Appl. No.: 18/485,329

(22) Filed: Oct. 12, 2023

(65) Prior Publication Data

US 2024/0134747 A1  Apr. 25, 2024
US 2024/0232015 A9  Jul. 11, 2024

Related U.S. Application Data

(60) Provisional application No. 63/418,844, filed on Oct. 24, 2022.

(30) Foreign Application Priority Data

Oct. 5, 2023 (KR) .................... 10-2023-0132292

(51) Int. Cl.
*G06F 11/00* (2006.01)
*G06F 3/06* (2006.01)
*G06F 11/10* (2006.01)

(52) U.S. Cl.
CPC .......... *G06F 11/108* (2013.01); *G06F 3/0619* (2013.01); *G06F 3/0647* (2013.01); *G06F 3/0656* (2013.01); *G06F 3/0688* (2013.01)

(58) Field of Classification Search
None
See application file for complete search history.

(56) References Cited

U.S. PATENT DOCUMENTS

| | | | |
|---|---|---|---|
| 8,775,901 B2 | 7/2014 | Sharon et al. | |
| 11,175,984 B1* | 11/2021 | Lercari | ................ G06F 11/108 |
| 12,131,035 B1* | 10/2024 | Lee | ......................... G06F 3/064 |
| 12,242,360 B2* | 3/2025 | Lee | ..................... G06F 11/1662 |
| 2016/0049192 A1 | 2/2016 | Lee | |
| 2019/0287643 A1* | 9/2019 | Kim | ................... G11C 16/3459 |
| 2020/0210280 A1* | 7/2020 | Singidi | ................ G06F 11/108 |
| 2022/0269559 A1* | 8/2022 | Singidi | ............... G06F 11/1044 |
| 2022/0291838 A1* | 9/2022 | Gorobets | ............. G06F 3/0673 |
| 2024/0161221 A1* | 5/2024 | Niemi | ..................... G06F 13/24 |
| 2024/0394155 A1* | 11/2024 | Lee | ........................... G06F 1/30 |

* cited by examiner

Primary Examiner — Mujtaba M Chaudry
(74) Attorney, Agent, or Firm — IP & T GROUP LLP

(57) ABSTRACT

A memory controller is coupled via at least one data path to plural memory regions for distributing and storing plural data entries. The memory controller includes parity generating circuitry configured to: perform logical operations on the plural data entries, based on an order in which the plural data entries are transmitted to the plural memory regions, to generate a parity entry; and add location information of the plural data entries, stored in the plural memory regions, into the parity entry.

18 Claims, 36 Drawing Sheets

FIG. 8

| | | Die 0 | | | | Die 1 | | | | Die n-1 | | | |
|---|---|---|---|---|---|---|---|---|---|---|---|---|---|
| | | Plane 0 | Plane 1 | Plane 2 | Plane 3 | Plane 0 | Plane 1 | Plane 2 | Plane 3 | Plane 0 | Plane 1 | Plane 2 | Plane 3 |
| WL0 | String 0 | page 0 | page 0 | page 0 | page 0 | page 0 | page 0 | page 0 | page 0 | page 0 | page 0 | page 0 | page 0 |
| | String 1 | page 1 | page 1 | page 1 | page 1 | page 1 | page 1 | page 1 | page 1 | page 1 | page 1 | page 1 | page 1 |
| | String 2 | page 2 | page 2 | page 2 | page 2 | page 2 | page 2 | page 2 | page 2 | page 2 | page 2 | page 2 | page 2 |
| | String 3 | page 3 | page 3 | page 3 | page 3 | page 3 | page 3 | page 3 | page 3 | page 3 | page 3 | page 3 | page 3 |
| | String 4 | page 4 | page 4 | page 4 | page 4 | page 4 | page 4 | page 4 | page 4 | page 4 | page 4 | page 4 | page 4 |
| | String 5 | page 5 | page 5 | page 5 | page 5 | page 5 | page 5 | page 5 | page 5 | page 5 | page 5 | page 5 | page 5 |
| | String 6 | page 6 | page 6 | page 6 | page 6 | page 6 | page 6 | page 6 | page 6 | page 6 | page 6 | page 6 | page 6 |
| | String 7 | page 7 | page 7 | page 7 | page 7 | page 7 | page 7 | page 7 | page 7 | page 7 | page 7 | page 7 | page 7 |
| WL1 | String 8 | String 8 | String 8 | String 8 | String 8 | page 8 | page 8 | page 8 | page 8 | page 8 | page 8 | page 8 | page 8 |
| | | | | | | | | | | | | | |
| | ... | ... | ... | ... | ... | ... | ... | ... | ... | ... | ... | ... | ... |
| WL8 | String 0 | page 72 | page 72 | page 72 | page 72 | page 72 | page 72 | page 72 | page 72 | page 72 | page 72 | page 72 | parity 0 |
| | String 1 | page 73 | page 73 | page 73 | page 73 | page 73 | page 73 | page 73 | page 73 | page 73 | page 73 | page 73 | parity 1 |
| | | | | | | | | | | | | | parity 2 |
| | | | | | | | | | | | | | parity 3 |
| | | | | | | | | | | | | | parity 4 |
| | | | | | | | | | | | | | parity 5 |
| | | | | | | | | | | | | | parity 6 |
| | | | | | | | | | | | | | parity 7 |
| WL9 | | | | | | | | | | | | | parity 8 |
| | | | | | | | | | | | | | parity 9 |
| | | | | | | | | | | | | | parity 10 |
| | | | | | | | | | | | | | parity 11 |
| | | | | | | | | | | | | | parity 12 |
| | | | | | | | | | | | | | parity 13 |
| | | | | | | | | | | | | | parity 14 |
| | | | | | | | | | | | | | parity 15 | parity 0 = (s-page 0) xor (s-page 16) xor (s-page 32)... (s-page 72)
parity 1 = (s-page 1) xor (s-page 17) xor (s-page 33)... (s-page 73)
...
parity 15 = (s-page 15) xor (s-page 31) xor (s-page 47)... (s-page 87)

FIG. 9

| | | Die 0 | | | | Die 1 | | | | Die n-1 | | | |
|---|---|---|---|---|---|---|---|---|---|---|---|---|---|
| | | Plane 0 | Plane 1 | Plane 2 | Plane 3 | Plane 0 | Plane 1 | Plane 2 | Plane 3 | Plane 0 | Plane 1 | Plane 2 | Plane 3 |
| WL0 | String 0 | page 0 | page 0 | page 0 | page 0 | page 0 | page 0 | page 0 | page 0 | page 0 | page 0 | page 0 | page 0 |
| | String 1 | page 1 | page 1 | page 1 | page 1 | page 1 | page 1 | page 1 | page 1 | page 1 | page 1 | page 1 | page 1 |
| | String 2 | page 2 | page 2 | page 2 | page 2 | page 2 | page 2 | page 2 | page 2 | page 2 | page 2 | page 2 | page 2 |
| | String 3 | page 3 | page 3 | page 3 | page 3 | page 3 | page 3 | page 3 | page 3 | page 3 | page 3 | page 3 | page 3 |
| | String 4 | page 4 | page 4 | page 4 | page 4 | page 4 | page 4 | page 4 | page 4 | page 4 | page 4 | page 4 | page 4 |
| | String 5 | page 5 | page 5 | page 5 | page 5 | page 5 | page 5 | page 5 | page 5 | page 5 | page 5 | page 5 | page 5 |
| | String 6 | page 6 | page 6 | page 6 | page 6 | page 6 | page 6 | page 6 | page 6 | page 6 | page 6 | page 6 | page 6 |
| | String 7 | page 7 | page 7 | page 7 | page 7 | page 7 | page 7 | page 7 | page 7 | page 7 | page 7 | page 7 | page 7 |
| WL1 | String 0 | page 8 | page 8 | page 8 | page 8 | page 8 | page 8 | page 8 | page 8 | page 8 | page 8 | page 8 | page 8 |
| | String 1 | page 9 | page 9 | page 9 | page 9 | page 9 | page 9 | page 9 | page 9 | page 9 | page 9 | page 9 | page 9 |
| | String 2 | page 10 | page 10 | page 10 | page 10 | page 10 | page 10 | page 10 | page 10 | page 10 | page 10 | page 10 | page 10 |
| | String 3 | page 11 | page 11 | page 11 | page 11 | page 11 | page 11 | page 11 | page 11 | page 11 | page 11 | page 11 | page 11 |
| | String 4 | page 12 | page 12 | page 12 | page 12 | page 12 | page 12 | page 12 | page 12 | page 12 | page 12 | page 12 | page 12 |
| | String 5 | page 13 | page 13 | page 13 | page 13 | page 13 | page 13 | page 13 | page 13 | page 13 | page 13 | page 13 | page 13 |
| | String 6 | page 14 | page 14 | page 14 | page 14 | page 14 | page 14 | page 14 | page 14 | page 14 | page 14 | page 14 | page 14 |
| | String 7 | page 15 | page 15 | page 15 | page 15 | page 15 | page 15 | page 15 | page 15 | page 15 | page 15 | page 15 | parity 0 |

| | | | Die 0 | | | | Die 1 | | | | Die n-1 | | | |
|---|---|---|---|---|---|---|---|---|---|---|---|---|---|---|
| | | Plane 0 | Plane 1 | Plane 2 | Plane 3 | Plane 0 | Plane 1 | Plane 2 | Plane 3 | Plane 0 | Plane 1 | Plane 2 | Plane 3 |
| WL0 | String 0 | page 0 | page 0 | page 0 | page 0 | page 0 | page 0 | page 0 | page 0 | page 0 | page 0 | page 0 | page 0 |
| | String 7 | page 7 | page 7 | page 7 | page 7 | page 7 | page 7 | page 7 | page 7 | page 7 | page 7 | page 7 | page 7 |
| WL1 | String 8 | page 8 | page 8 | page 8 | page 8 | page 8 | page 8 | page 8 | page 8 | page 8 | page 8 | page 8 | page 8 |
| | String 15 | page 15 | page 15 | page 15 | page 15 | page 15 | page 15 | page 15 | page 15 | page 15 | page 15 | page 15 | page 15 |
| WL29 | String 240 | page 240 | page 240 | page 240 | page 240 | page 240 | page 240 | page 240 | page 240 | page 240 | page 240 | page 240 | parity 0 |
| | String 247 | page 247 | page 247 | page 247 | page 247 | page 247 | page 247 | page 247 | page 247 | page 247 | page 247 | page 247 | parity 7 |
| WL30 | String 248 | page 248 | page 248 | page 248 | page 248 | page 248 | page 248 | page 248 | page 248 | page 248 | page 248 | page 248 | parity 8 |
| | String 255 | page 255 | page 255 | page 255 | page 255 | page 255 | page 255 | page 255 | page 255 | page 255 | page 255 | page 255 | parity 15 |

FIG. 12

| | | Die 0 | | | |
|---|---|---|---|---|---|
| | | Plane 0 | Plane 1 | Plane 2 | Plane 3 |
| WL0 | String 0 | page 0 | page 0 | page 0 | page 0 |
| | String 1 | page 1 | page 1 | page 1 | page 1 |
| | String 2 | page 2 | page 2 | page 2 | page 2 |
| | String 3 | page 3 | page 3 | page 3 | page 3 |
| | String 4 | page 4 | page 4 | page 4 | page 4 |
| | String 5 | page 5 | page 5 | page 5 | page 5 |
| | String 6 | page 6 | page 6 | page 6 | page 6 |
| | String 7 | page 7 | page 7 | page 7 | page 7 |
| WL1 | String 0 | page 8 | page 8 | page 8 | page 8 |
| | String 1 | page 9 | page 9 | page 9 | page 9 |
| | String 2 | page 10 | page 10 | page 10 | page 10 |
| | String 3 | page 11 | page 11 | page 11 | page 11 |
| | String 4 | page 12 | page 12 | page 12 | page 12 |
| | String 5 | page 13 | page 13 | page 13 | page 13 |
| | String 6 | page 14 | page 14 | page 14 | page 14 |
| | String 7 | page 15 | page 15 | page 15 | page 15 |

| Die 1 | | | |
|---|---|---|---|
| Plane 0 | Plane 1 | Plane 2 | Plane 3 |
| page 0 | page 0 | page 0 | page 0 |
| page 1 | page 1 | page 1 | page 1 |
| page 2 | page 2 | page 2 | page 2 |
| page 3 | page 3 | page 3 | page 3 |
| page 4 | page 4 | page 4 | page 4 |
| page 5 | page 5 | page 5 | page 5 |
| page 6 | page 6 | page 6 | page 6 |
| page 7 | page 7 | page 7 | page 7 |
| page 8 | page 8 | page 8 | page 8 |
| page 9 | page 9 | page 9 | page 9 |
| page 10 | page 10 | page 10 | page 10 |
| page 11 | page 11 | page 11 | page 11 |
| page 12 | page 12 | page 12 | page 12 |
| page 13 | page 13 | page 13 | page 13 |
| page 14 | page 14 | page 14 | page 14 |
| page 15 | page 15 | page 15 | page 15 |

| Die n (Parity Die) | | | |
|---|---|---|---|
| Plane 0 | Plane 1 | Plane 2 | Plane 3 |
| parity 0 | parity 1 | parity 2 | parity 3 |
| parity 4 | parity 5 | parity 6 | parity 7 |
| parity 8 | parity 9 | parity 10 | parity 11 |
| parity 12 | parity 13 | parity 14 | parity 15 |
| parity 16 | parity 17 | parity 18 | parity 19 |
| parity 20 | parity 21 | parity 22 | parity 23 |
| parity 24 | parity 25 | parity 26 | parity 27 |
| parity 28 | parity 29 | parity 30 | parity 31 |
| parity 32 | parity 33 | parity 34 | parity 35 |
| parity 36 | parity 37 | parity 38 | parity 39 |
| parity 40 | parity 41 | parity 42 | parity 43 |
| parity 44 | parity 45 | parity 46 | parity 47 |
| parity 48 | parity 49 | parity 50 | parity 51 |
| parity 52 | parity 53 | parity 54 | parity 55 |
| parity 56 | parity 57 | parity 58 | parity 59 |
| parity 60 | parity 61 | parity 62 | parity 63 |

| PG-Table | | | | | | | | | | | | | | |
|---|---|---|---|---|---|---|---|---|---|---|---|---|---|---|
| PPN | | | | | | | | | | | | | PG-Bin#0 | |
| | | | | | | | | | | | PG-Bin#1 | Hash#0 | | |
| | | | | | | | | PG-Bin#2 | Hash#1 | | | | | |
| Dummy | Hash#2 | | | | | | | | | | | | | |

```
Struct PGT-Struct {
  PPN-Sturct Bin-PG-List [3072] = 0; //START & B-PAGE IN EACH INVOLVED BLOCK,
  UINT8 Bin-PG-PG-Meta[TBD] = 0; //PARITY PHY-ADD, TOTAL # OF DATA PAGE, ETC.
};
Struct PPN-Struct {
  UIT16 StartPPN = 0; //DATA START ADDRESS IN BLOCK
  UIT16 N-Page = 0; //# of Data Pages
};
```

FIG. 31
1. XOR OP. FOR ERASE →
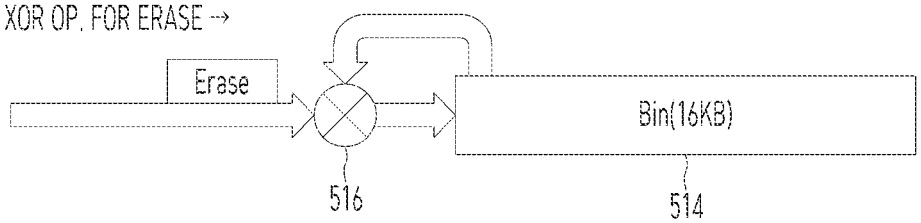
2. REMOVING CORRESPONDING PPN FROM PARITY GROUP AT PG-Bin →
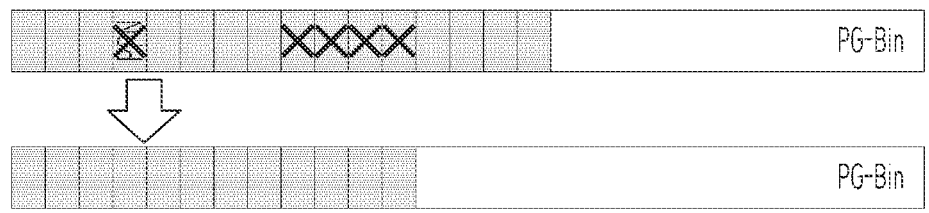

Traverse-path @RECOVERY = {PlaneX+1.PGT-Idx};
Worse Case SEARCH TIME = 200uS = THREE TIMES OF tR (One tR for NEXT PLANE, Two tRs for PGT).

ADJACENT PLANE OF THE SAME STRING (Plane.x-1, Plane.x+1)

FIG. 34

ESTABLISHED Traverse-path = {WL0.Chunk0, ..., WLn.Chunk0}
Worse Case SEARCH TIME = tR for PGT AFTER RECOGNITION WHEN BLOCK READ.

Chunk0.PGT-Idx of All WLs/Strings in BLOCK

Traverse-path @ERASE = {WL0.Chunk0, WL1.Chunk0, ..., WLn.Chunk0}
Worse Case SEARCH TIME = Chunk0.tR of All WLs/Strings in BLOCK.

APPARATUS AND METHOD FOR DISTRIBUTING AND STORING WRITE DATA IN PLURAL MEMORY REGIONS

CROSS-REFERENCE TO RELATED APPLICATIONS

This patent application claims the benefit of priority under 35 U.S.C. § 119 to U.S. Provisional Application Ser. No. 63/418,844 filed on Oct. 24, 2022, and Korean Patent Application No. 10-2023-0132292 filed on Oct. 5, 2023, the entire disclosures of which are incorporated herein by reference.

TECHNICAL FIELD

One or more embodiments of the present disclosure described herein relate to a memory system or a memory device, and an operation method thereof, and more particularly, to an apparatus and a method for distributing and programming write data in plural regions of the memory device.

BACKGROUND

A data processing system includes a memory system or a data storage device. The data processing system can be developed to store more voluminous data in the data storage device, store data in the data storage device faster, and read data stored in the data storage device faster. The memory system or the data storage device can include non-volatile memory cells and/or volatile memory cells for storing data. To improve data safety, data can be distributed and stored in plural regions of the memory device.

BRIEF DESCRIPTION OF THE DRAWINGS

The description herein makes reference to the accompanying drawings wherein like reference numerals refer to like parts throughout the figures.

FIG. 8 illustrates a second example of how to distribute and store plural data entries in a memory device.

FIG. 9 illustrates a first example of parity groups in a memory device.

FIG. 10 illustrates a second example of parity groups in a memory device.

FIG. 11 illustrates a third example of parity groups in a memory device.

FIG. 12 illustrates a fourth example of parity groups in a memory device.

Figure 17:
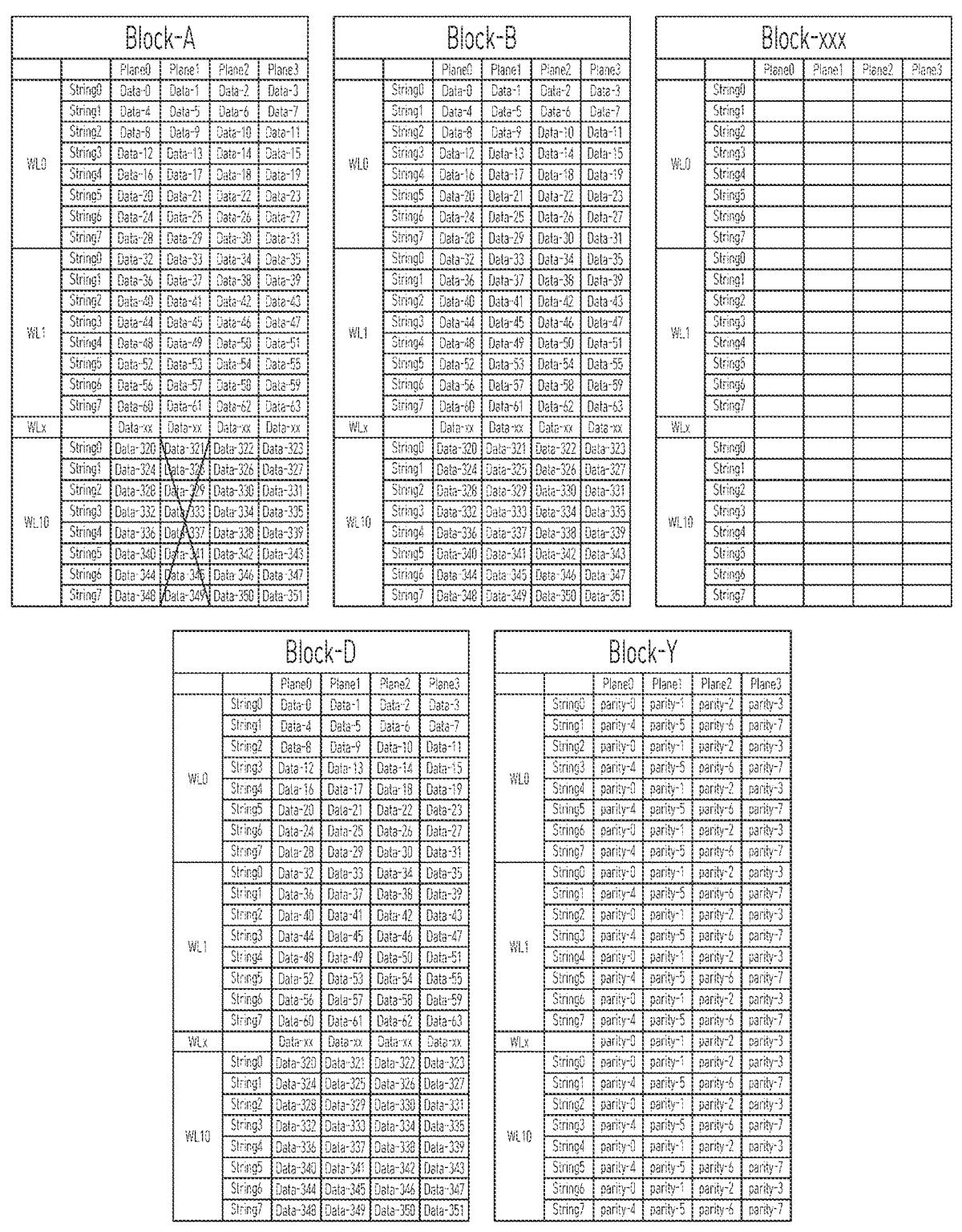

FIG. 17 illustrates calculation and a buffer size for generating a parity entry stored in a memory device.

FIG. 27 illustrates the parity entry generated by the parity generating circuitry and stored in the memory device.

FIG. 31 illustrates an operation for erasing a data entry stored in the memory system.

FIG. 34 illustrates an operation for searching a parity entry for an erase operation performed in the memory system.

DETAILED DESCRIPTION

Figure 1:
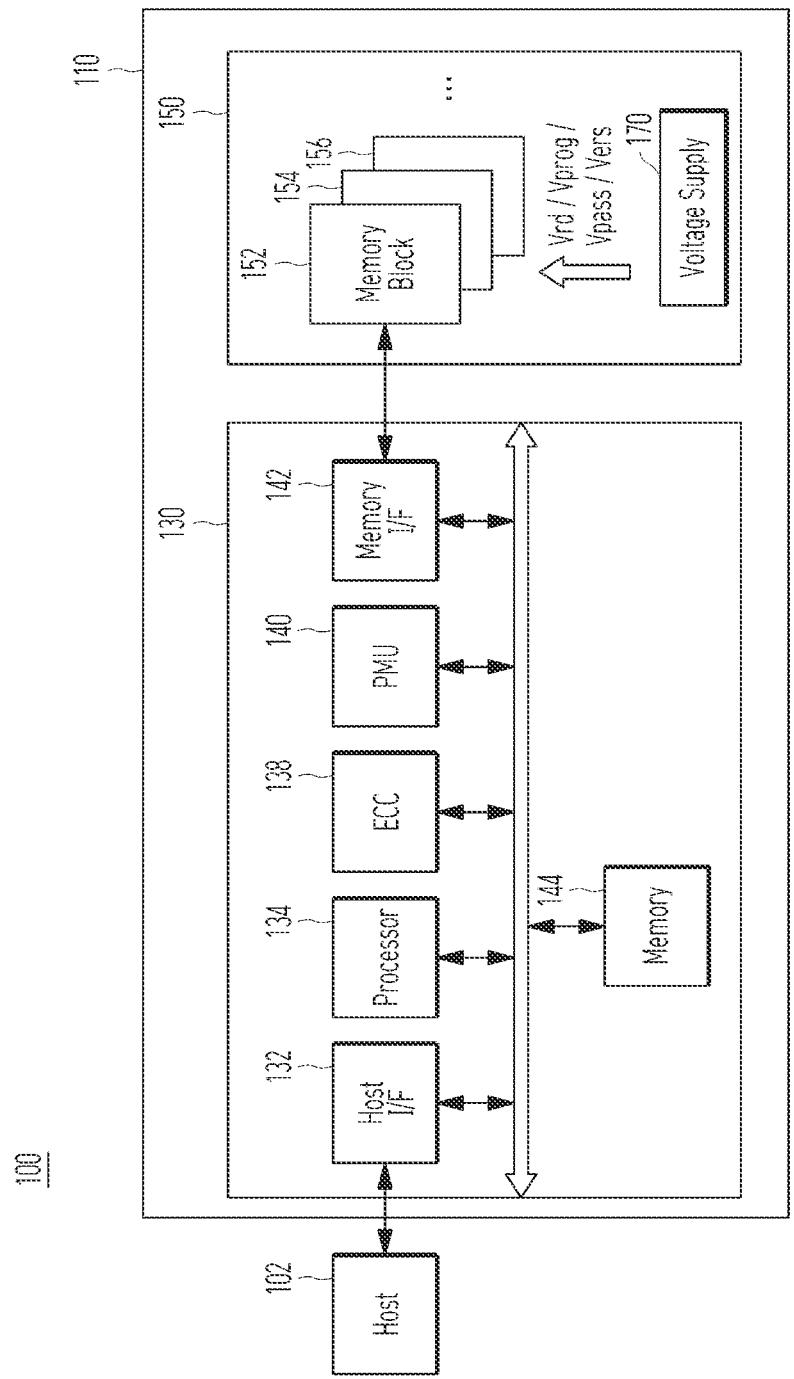
FIG. 1 illustrates a data processing system according to an embodiment of the present disclosure.

Various embodiments of the present disclosure are described below with reference to the accompanying drawings. Elements and features of this disclosure, however, may be configured or arranged differently to form other embodiments, which may be variations of any of the disclosed embodiments.

In this disclosure, references to various features (e.g., elements, structures, modules, components, steps, operations, characteristics, etc.) included in "one embodiment," "example embodiment," "an embodiment," "another embodiment," "some embodiments," "various embodiments," "other embodiments," "alternative embodiment," and the like are intended to mean that any such features are included in one or more embodiments of the present disclosure, but may or may not necessarily be combined in the same embodiments.

In this disclosure, the terms "comprise," "comprising," "include," and "including" are open-ended. As used in the appended claims, these terms specify the presence of the stated elements and do not preclude the presence or addition of one or more other elements. The terms in a claim do not foreclose the apparatus from including additional components e.g., an interface unit, circuitry, etc.

In this disclosure, various units, circuits, or other components may be described or claimed as "configured to" perform a task or tasks. In such contexts, "configured to" is used to connote structure by indicating that the blocks/units/circuits/components include structure (e.g., circuitry) that performs one or more tasks during operation. As such, the block/unit/circuit/component can be said to be configured to perform the task even when the specified block/unit/circuit/component is not currently operational, e.g., is not turned on nor activated. Examples of block/unit/circuit/component used with the "configured to" language include hardware, circuits, memory storing program instructions executable to implement the operation, etc. Additionally, "configured to" can include a generic structure, e.g., generic circuitry, that is manipulated by software and/or firmware, e.g., an FPGA or a general-purpose processor executing software to operate in manner that is capable of performing the task(s) at issue. "Configured to" may also include adapting a manufacturing process, e.g., a semiconductor fabrication facility, to fabricate devices, e.g., integrated circuits that are adapted to implement or perform one or more tasks.

As used in this disclosure, the term 'machine,' 'circuitry' or 'logic' refers to all of the following: (a) hardware-only circuit implementations such as implementations in only analog and/or digital circuitry and (b) combinations of circuits and software and/or firmware, such as (as applicable): (i) to a combination of processor(s) or (ii) to portions of processor(s)/software including digital signal processor(s), software, and memory(ies) that work together to cause an apparatus, such as a mobile phone or server, to perform various functions and (c) circuits, such as a microprocessor(s) or a portion of a microprocessor(s), that require software or firmware for operation, even if the software or firmware is not physically present. This definition of 'machine,' 'circuitry' or 'logic' applies to all uses of this term in this application, including in any claims. As a further example, as used in this application, the term 'machine,' 'circuitry' or 'logic' also covers an implementation of merely a processor or multiple processors or portion of a processor and its (or their) accompanying software and/or firmware. The term 'machine,' 'circuitry' or 'logic' also covers, for example, and if applicable to a particular claim element, an integrated circuit for a storage device.

As used herein, the terms 'first,' 'second,' 'third,' and so on are used as labels for nouns that they precede, and do not imply any type of ordering, e.g., spatial, temporal, logical, etc. The terms 'first' and 'second' do not necessarily imply that the first value must be written before the second value. Further, although the terms may be used herein to identify various elements, these elements are not limited by these terms. These terms are used to distinguish one element from another element that otherwise have the same or similar names. For example, a first circuitry may be distinguished from a second circuitry.

Further, the term 'based on' is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

Herein, a data entry, an entry of data, an item of data, or a data item may be a sequence of bits. For example, the data entry may include the contents of a file, a portion of the file, a page in memory, an object in an object-oriented program, a digital message, a digital scanned image, a part of a video or audio signal, metadata or any other entity which can be represented by a sequence of bits. According to an embodiment, the data entry may include a discrete object. According to another embodiment, the data entry may include a unit of information processed or handled for a data input/output operation. According to another embodiment, the data entry may include a unit of information within a transmission packet between two different components.

An embodiment in the disclosure can provide a memory system including a memory device, a data processing system including the memory system, and an operation process or a method, which may quickly and reliably process data into a memory device by reducing operational complexity and performance degradation of the memory system, thereby enhancing usage efficiency of the memory device.

An embodiment of the disclosure can provide an apparatus or a method for distributing a write data entry over plural regions in the memory device to improve reliability or safety of data stored in the memory device.

A memory system according to an embodiment of the disclosure can reduce internal resources used for generating a parity entry associated with plural data entries distributed in plural regions during a data program operation for programming write data in the memory device.

A memory system according to an embodiment of the disclosure can dynamically determine the number of data entries which are associated with a single parity entry, so that a data input/output operation can be free from a pattern of write commands, or a size of write data, input from an external device.

A memory system according to an embodiment of the disclosure can reduce overheads that may occur in a process of distributing and storing voluminous data in the memory device.

An embodiment of the present invention can provide a memory controller, coupled via at least one data path to plural memory regions for distributing and storing plural data entries. The memory controller can include parity generating circuitry configured to: perform logical operations on the plural data entries, based on an order in which the plural data entries are transmitted to the plural memory regions, to generate a parity entry; and add location information of the plural data entries, stored in the plural memory regions, into the parity entry.

The plural data entries and the parity entry can constitute a single parity group. Each of the plural data entries can include information regarding the single parity group.

The parity entry can include information indicating the number of the plural data entries.

Each of the plural memory regions can be distinguished according to the number of cell strings coupled to a single word line included in a memory plane and the number of bits of multi-bit data stored in each memory cell.

The number of the plural memory regions can correspond to the number of open memory blocks.

The plural memory regions can include a parity memory block configured to store the parity entry without the plural data entries.

The logical operation can be an exclusive OR (XOR) operation.

The parity generating circuitry can include a calculation circuit configured to perform the logical operations; and a buffer coupled to the calculation circuit and configured to provide a previous result for the logical operations and store a current result of the logical operations.

The buffer can be configured to store data having a size corresponding to data intertemporally programmed in the plural memory regions.

The buffer can have a size equal to or less than a size of page buffers included in, or coupled to, the plural memory regions.

When the memory controller erases at least one data entry among the plural data entries, the parity generating circuitry can be configured to: perform the logical operation on the at least one data entry and the party entry; remove location information regarding the at least one data entry from the parity entry; and output an updated parity entry to be stored in the plural memory regions.

The memory controller can perform garbage collection or wear leveling to at least some memory regions of the plural memory regions.

The garbage collection can include at least one logical operation performed on a first data entry which is invalid and stored in the at least some memory regions and a first parity entry associated with the first data entry; an operation of erasing a first physical address of the first data entry in the first parity entry; and an operation of adding a second physical address in the first parity entry, the second physical address indicating a location in which a second data entry which is valid and stored in the at least some memory regions is migrated.

The memory controller can further include a flash translation layer configured to: establish a parity group including the plural data entries and the parity entry; determine locations in which the plural data entries and the parity entry are stored; and transfer the parity group and the locations to the parity generating circuitry.

The flash translation layer can be further configured to change a number of data entries included in the parity group based on an amount of data to be stored in the plural memory regions.

The flash translation layer can be configured to, after recognizing an error in at least one of the plural data entries, search for the parity entry associated with the plural data entries, sequentially read the plural data entries based on the location information of the plural data entries, which is included in the parity entry. The parity generating circuitry can be configured to perform the logical operation on the parity entry and the plural data entries sequentially read from the plural data entries.

In another embodiment, a memory system can include plural memory regions comprising plural memory dies, plural memory planes, or plural memory blocks in which plural data entries are distributed and stored to resolve an uncorrectable error correction code (UECC); and a memory controller comprising parity generating circuitry configured to perform logical operations on the plural data entries, based on an order in which the plural data entries are transmitted to the plural memory regions, to generate a parity entry, the memory controller configured to change a number of the plural data entries involved in the logical operations.

The plural memory regions can be coupled via plural channels to the memory controller.

The data entry can include metadata, parity group information, user data, and parity data. The parity group information can indicate which parity group the data entry belongs to. The parity data can be generated based on an error correction code used by an ECC module.

The parity entry can include a result of the logical operations; and physical addresses indicating locations at which the plural data entries are stored in the plural memory regions.

The parity entry can include information regarding the number of the plural data entries.

Each of the plural memory regions can be distinguished from each other based on a number of cell strings coupled to a single word line in the memory plane and a number of bits of multi-bit data stored in each memory cell.

The number of the plural memory regions can correspond to the number of open memory blocks.

The plural memory regions comprise a parity memory block configured to store the parity entry without the plural data entries.

The logical operation can be an exclusive OR (XOR) operation.

The parity generating circuitry can include a calculation circuit configured to perform the logical operations; and a buffer coupled to the calculation circuit and configured to provide a previous result for the logical operations and store a current result of the logical operations.

The buffer can be configured to store data having a size corresponding to data intertemporally programmed in the plural memory regions.

The buffer can have a size equal to or less than a size of page buffers included in, or coupled to, the plural memory regions.

When the memory controller erases at least one data entry among the plural data entries, the parity generating circuitry can be configured to: perform the logical operation on the at least one data entry and the party entry; remove location information regarding the at least one data entry from the parity entry; and output an updated parity entry to be stored in the plural memory regions.

The memory controller can perform garbage collection or wear leveling to at least some memory regions of the plural memory regions.

The garbage collection can include at least one logical operation performed on a first data entry which is invalid and stored in the at least some memory regions and a first parity entry associated with the first data entry; an operation of erasing a first physical address of the first data entry in the first parity entry; and an operation of adding a second physical address in the first parity entry, the second physical address indicating a location in which a second data entry which is valid and stored in the at least some memory regions is migrated.

The memory controller can include a flash translation layer configured to: establish a parity group including the plural data entries and the parity entry; determine locations in which the plural data entries and the parity entry are stored; and transfer the parity group and the locations to the parity generating circuitry.

The flash translation layer can be configured to, after recognizing an error in at least one of the plural data entries, search for the parity entry associated with the plural data entries, sequentially read the plural data entries based on the location information of the plural data entries, which is included in the parity entry. The parity generating circuitry can be configured to perform the logical operation on the parity entry and the plural data entries sequentially read from the plural data entries.

Two data entries, stored in two cell strings coupled to a single word line included in at least one of the plural memory regions, can belong to different parity groups.

In another embodiment, a memory device can include plural memory dies configured to distribute and store plural data entries and at least one parity entry which belong to a single parity group. Data entries storing at a same location of the plural memory dies can belong to different parity groups.

The same location can be determined by a same memory plane address, a same word line address, and a same cell string address.

Each of the plural data entries can include information regarding the single parity group.

The at least one parity entry can include information regarding locations at which the plural data entries are stored.

The at least one parity entry can include information regarding the number of the plural data entries.

At least one memory die among the plural memory dies can be configured to store the parity entry only.

Each memory cell included in the plural memory dies can store multi-bit data. The same location can be determined by a same bit position of the multi-bit data.

Two data entries, stored in two cell strings coupled to a single word line included in at least one of the plural memory dies, can belong to different parity groups.

In another embodiment, a parity generator can include a calculation circuit configured to sequentially perform logical operations on plural data entries to be transferred to plural memory regions via at least one data path for a one-shot program operation; and a buffer coupled to the calculation circuit and configured to provide a previous result for the logical operations and store a current result of the logical operations.

The calculation circuit can be further configured to store information of locations at which the plural data entries are stored in the buffer.

The parity generator can be configured to generate a parity entry including the current result and the information of the locations, which are stored in the buffer.

Each of the plural memory regions can be distinguished according to a number of cell strings coupled to a single word line included in a memory plane and a number of bits of multi-bit data stored in each memory cell.

The number of the plural memory regions corresponds to the number of open memory blocks.

The logical operation can be an exclusive OR (XOR) operation.

The buffer can be configured to store data having a size corresponding to data intertemporally programmed in the plural memory regions.

The buffer can have a size equal to or less than a size of page buffers included in, or coupled to, the plural memory regions.

In another embodiment, a method of operating a memory system can include determining locations where plural data entries are distributed over, and stored in, plural memory regions; classifying and transmitting the plural data entries based on the locations; performing a logical operation on one of the plural data entries and a previous result; updating the previous result with a current result of the logical operation; recording an address indicating the location; and generating a parity entry including the current result and the address. The logical operation, the updating, and the recording can be repeatedly performed on each of the plural data entries.

The method of operating the memory system can further include determining a parity group including the plural data entries and the parity entry; and adding information indicating the parity group to the data entry.

The method of operating the memory system can further include changing the number of the plural data entries belonging to the parity group in response to the amount of data to be stored in the plural memory regions.

The method of operating the memory system can further include changing the number of the plural data entries belonging to the parity group in response to the amount of data to be stored in the plural memory regions.

The method of operating the memory system can further include sequentially transferring the plural data entries and the parity entry to the plural memory regions; and programming the plurality of data entries and the parity entry in the plural memory regions.

Each of the plural data entries can include metadata, parity group information, user data, and parity data. The parity group information can indicate the parity group to which the data entry belongs. The parity data can be generated based on an error correction code used by the ECC module.

The method of operating the memory system can further include adding information about the number of the plural data entries into the parity entry.

Each of the plural memory regions can be distinguished according to the number of cell strings connected to one word line in the memory plane and the number of bits of multi-bit data stored in each memory cell.

The number of the plural memory regions may correspond to the number of open memory blocks. Additionally, the plural memory regions may include a parity memory block that stores only the parity entries without the plural data entries. Additionally, the logical operation can be an exclusive OR (XOR) operation.

The method of operating the memory system can further include allocating a buffer for the logical operation.

The buffer can be set to store the size of data to be programmed intertemporally within the plurality of memory areas. Additionally, the size of the buffer can be equal to or smaller than the size of the page buffer coupled to, or engaged with, the plural memory regions.

In another embodiment, a method of operating a memory system can include reading a data entry from a memory device based on an erase target address corresponding to an erase command externally input or internally generated; reading a parity entry from the memory device based on parity group information included in the data entry; updating the parity value by performing a logical operation on user data included in the data entry and a parity value included in the parity entry; removing the erase target address in the parity entry; and storing an updated parity entry in the memory device.

The memory device can include plural memory regions including a plurality of memory dies, a plurality of memory planes, or a plurality of memory blocks which plural data entries are distributed over and stored in to resolve errors (UECC). Additionally, each of the plural memory regions can be distinguished according to the number of cell strings connected to one word line in the memory plane and the number of bits of multi-bit data stored in each memory cell. Additionally, the logical operation may be an exclusive OR (XOR) operation.

In another embodiment, a method of operating a memory system can include determining a target block for garbage collection in a memory device; reading both valid and invalid data entries of the target block and storing the valid and invalid data entries in a garbage collection buffer; reading at least one parity entry corresponding to the valid data entry and the invalid data entry from the memory device; updating a parity value by performing a logical operation on the invalid data entry and the at least one parity entry corresponding to the invalid data entry, and removing a physical address of the invalid data entry from the at least one parity entry; adding a location where the valid data entry is stored into the at least one parity entry corresponding to the valid data entry; and storing an updated at least one parity entry in the memory device.

Embodiments will now be described with reference to the accompanying drawings, wherein like numbers reference like elements.

FIG. 1 illustrates a data processing system according to an embodiment of the present disclosure.

Referring to FIG. 1, the data processing system 100 may include a host 102 engaged or coupled with a memory system, such as memory system 110. For example, the host 102 and the memory system 110 can be coupled to each other via a data bus, a host cable and the like to perform data communication.

The memory system 110 may include a memory device 150 and a controller 130. The memory device 150 and the controller 130 in the memory system 110 may be considered components or elements physically separated from each other. The memory device 150 and the controller 130 may be connected via at least one data path. For example, the data path may include a channel and/or a way.

According to an embodiment, the memory device 150 and the controller 130 may be components or elements functionally divided. Further, according to an embodiment, the memory device 150 and the controller 130 may be implemented with a single chip or a plurality of chips.

The controller 130 may perform a data input/output operation (such as a read operation, a program operation, an erase operation, or etc.) in response to a request or a command input from an external device such as the host 102. For example, when the controller 130 performs a read operation in response to a read request input from an external device, data stored in a plurality of non-volatile memory cells included in the memory device 150 is transferred to the controller 130. Further, the controller 130 can independently perform an operation regardless of the request or the command input from the host 102. Regarding an operation state of the memory device 150, the controller 130 can perform an operation such as garbage collection (GC), wear leveling (WL), a bad block management (BBM) for checking whether a memory block is bad and handing a bad block.

The memory device 150 may include a plurality of memory blocks 152, 154, 156. The memory blocks 152, 154, 156 may be understood as a group of non-volatile memory cells in which data is removed together by a single erase operation. Although not illustrated, the memory block 152, 154, 156 may include a page which is a group of non-volatile memory cells that store data together during a single program operation or output data together during a single read operation. For example, one memory block 152, 154, 156 may include a plurality of pages. The memory device 150 may include a voltage supply circuit 170 capable of supplying at least one voltage into the memory block 152, 154, 156. The voltage supply circuit 170 may supply a read voltage Vrd, a program voltage Vprog, a pass voltage Vpass, or an erase voltage Vers into a non-volatile memory cell included in the memory block 152, 154, 156.

The host 102 interworking with the memory system 110, or the data processing system 110 including the memory system 110 and the host 102, is a mobility electronic device (such as a vehicle), an portable electronic device (such as a mobile phone, an MP3 player, a laptop computer, or the like), and a non-portable electronic device (such as a desktop computer, a game machine, a TV, a projector, or the like). The host 102 may provide interaction between the host 102 and a user using the data processing system 100 or the memory system 110 through at least one operating system (OS). The host 102 transmits a plurality of commands corresponding to user's request to the memory system 110, and the memory system 110 performs data input/output operations corresponding to the plurality of commands (e.g., operations corresponding to the user's request).

The memory system 110 may be implemented with any of various types of storage devices. Non-limiting examples of storage devices include a solid state drive (SSD), a multimedia card (MMC), an embedded MMC (eMMC), a reduced size MMC (RS-MMC), a micro-MMC, a secure digital (SD) card, a mini-SD, a micro-SD, a universal serial bus (USB) storage device, a universal flash storage (UFS) device, a compact flash (CF) card, a smart media (SM) card, a memory stick, and the like. According to an embodiment, the controller 130 may include a host interface 132, a processor 134, a power management unit (PMU) 140, a memory interface 142, and a memory 144. Components may be added to or omitted from the controller 130 according to structures, functions, operation performance, or the like, regarding the memory system 110.

The host 102 and the memory system 110 each may include a controller or an interface for transmitting and receiving signals, data, and the like, in accordance with one or more predetermined protocols. For example, the host interface 132 in the memory system 110 may include an apparatus or a circuit capable of transmitting signals, data, and the like to the host 102 or receiving signals, data, and the like from the host 102. According to an embodiment, the host interface 132 is a type of layer for exchanging data with the host 102 and is implemented with, or driven by, firmware called a host interface layer (HIL). According to an embodiment, the host interface 132 can include a command queue.

The host 102 and the memory system 110 may use a predetermined set of rules or procedures for data communication or a preset interface to transmit and receive data therebetween. Examples of sets of rules or procedures for data communication standards or interfaces supported by the host 102 and the memory system 110 for sending and receiving data include Universal Serial Bus (USB), Multi-Media Card (MMC), Parallel Advanced Technology Attachment (PATA), Small Computer System Interface (SCSI), Enhanced Small Disk Interface (ESDI), Integrated Drive Electronics (IDE), Peripheral Component Interconnect Express (PCIe or PCI-e), Serial-attached SCSI (SAS), Serial Advanced Technology Attachment (SATA), Mobile Industry Processor Interface (MIPI), and the like. According to an embodiment, the host 102 and the memory system 110 may be coupled to each other through a Universal Serial Bus (USB). The Universal Serial Bus (USB) is a highly scalable, hot-pluggable, plug-and-play serial interface that ensures cost-effective, standard connectivity to peripheral devices such as keyboards, mice, joysticks, printers, scanners, storage devices, modems, video conferencing cameras, and the like.

The memory system 110 may support the Non-volatile memory express (NVMe). The Non-volatile memory express (NVMe) is a type of interface based at least on a Peripheral Component Interconnect Express (PCIe) designed to increase performance and design flexibility of the host 102, servers, computing devices, and the like equipped with the non-volatile memory system 110. The PCIe can use a slot or a specific cable for connecting a computing device (e.g., host 102) and a peripheral device (e.g., memory system 110). For example, the PCIe can use a plurality of pins (e.g., 18 pins, 32 pins, 49 pins, or 82 pins) and at least one wire (e.g., ×1, ×4, ×8, or ×16) to achieve high speed data communication over several hundred MB per second (e.g., 250 MB/s, 500 MB/s, 984.6250 MB/s, or 1969 MB/s). According to an embodiment, the PCIe scheme may achieve bandwidths of tens to hundreds of Giga bits per second.

The power management unit (PMU) 140 may control electrical power provided to the controller 130. The PMU 140 may monitor the electrical power supplied to the memory system 110, e.g., a voltage supplied to the controller 130, and provide the electrical power to components included in the controller 130. The PMU 140 may not only detect power-on or power-off, but also generate a trigger signal to enable the memory system 110 to urgently back up a current state when the electrical power supplied to the memory system 110 is unstable. According to an embodiment, the PMU 140 may include a device or a component (such as Auxiliary Power Supply) capable of accumulating electrical power that may be used in an emergency.

The memory interface 142 may serve as an interface for handling commands and data transferred between the controller 130 and the memory device 150, in order to allow the controller 130 to control the memory device 150 in response to a command or a request input from the host 102. In a case when the memory device 150 includes a NAND flash memory, the memory interface 142 includes a NAND flash controller (NFC). According to an embodiment, the memory interface 142 can be implemented through, or driven by, firmware called a Flash Interface Layer (FIL) for exchanging data with the memory device 150. Further, according to an embodiment, the memory interface 142 may support an open NAND flash interface (ONFi), a toggle mode, or the like, for data input/output with the memory device 150. For example, the ONFi may use a data path (e.g., a channel, a way, etc.) that includes at least one signal line capable of supporting bi-directional transmission and reception in a unit of 8-bit or 16-bit data. Data communication between the controller 130 and the memory device 150 can be achieved through at least one interface regarding an asynchronous single data rate (SDR), a synchronous double data rate (DDR), a toggle double data rate (DDR), or the like.

The memory 144 may be used as a working memory of the memory system 110 or the controller 130, while temporarily storing transactional data for operations performed in the memory system 110 and the controller 130. According to an embodiment, the memory 144 may be implemented with a volatile memory. For example, the memory 144 may be implemented with a static random access memory (SRAM), a dynamic random access memory (DRAM), or both. The memory 144 can be disposed within the controller 130, embodiments are not limited thereto. The memory 144 may be located within or external to the controller 130. For instance, the memory 144 may be embodied by an external volatile memory having a memory interface transferring data and/or signals between the memory 144 and the controller 130.

The processor 134 may control the overall operations of the memory system 110. For example, the processor 134 can control a program operation or a read operation of the memory device 150 in response to a write request or a read request entered from the host 102. According to an embodiment, the processor 134 may execute firmware to control the program operation or the read operation in the memory system 110. Herein, the firmware may be referred to as a flash translation layer (FTL). An example of the FTL will be described in detail, referring to FIGS. 3 and 4. According to an embodiment, the processor 134 may be implemented with a microprocessor, a central processing unit (CPU), or the like. According to an embodiment, the memory system 110 may be implemented with at least one multi-core processor, co-processors, or the like.

The plurality of memory blocks 152, 154, 156 included in the memory device 150 may be classified according to the number of bits that can be stored in, or expressed by, each memory cell. A memory block included in the memory device 150 may include a single level cell (SLC) memory block, a double level cell (DLC), a triple level cell (TLC), and a quadruple level cell (QLC), or a multiple level cell including a plurality of pages implemented by memory cells, each capable of storing 5 bits or more bits of data in one memory cell.

According to an embodiment, the controller 130 may use an MLC memory block included in the memory device 150 as an SLC memory block that stores one-bit data in each memory cell. A data input/output speed of the multi-level cell (MLC) memory block can be slower than that of the SLC memory block. That is, when the MLC memory block is used as the SLC memory block, a margin for a read or program operation can be reduced. For example, the controller 130 may perform a data input/output operation with a higher speed when the MLC memory block is used as the SLC memory block. The controller 130 may use the MLC memory block as a SLC buffer to temporarily store data because the SLC buffer for write data, or a write booster buffer, can provide a high data input/output speed for improving performance of the memory system 110.

Further, according to an embodiment, the controller 130 can program data in an MLC a plurality of times without performing an erase operation on a specific MLC memory block included in the memory device 150. In general, non-volatile memory cells do not support data overwrite. However, the controller 130 may program 1-bit data in the MLC a plurality of times using a feature in which the MLC is capable of storing multi-bit data. For a MLC overwrite operation, the controller 130 may store the number of program times as separate operation information when 1-bit data is programmed in a MLC. According to an embodiment, an operation for uniformly levelling threshold voltages of the MLCs may be carried out before another 1-bit data is programmed in the same MLCs, each having stored 1-bit data.

According to an embodiment, the memory device 150 is embodied as a non-volatile memory such as a flash memory, for example, a Read Only Memory (ROM), a Mask ROM (MROM), a Programmable ROM (PROM), an Erasable ROM (EPROM), an Electrically Erasable ROM (EEPROM), a Magnetic (MRAM), a NAND flash memory, a NOR flash memory, or the like. In another embodiment, the memory device 150 may be implemented by at least one of a phase change random access memory (PCRAM), a Resistive Random Access Memory (ReRAM), a ferroelectrics random access memory (FRAM), a transfer torque random access memory (SU-RAM), and a spin transfer torque magnetic random access memory (STT-MRAM), or the like.

Figure 2:
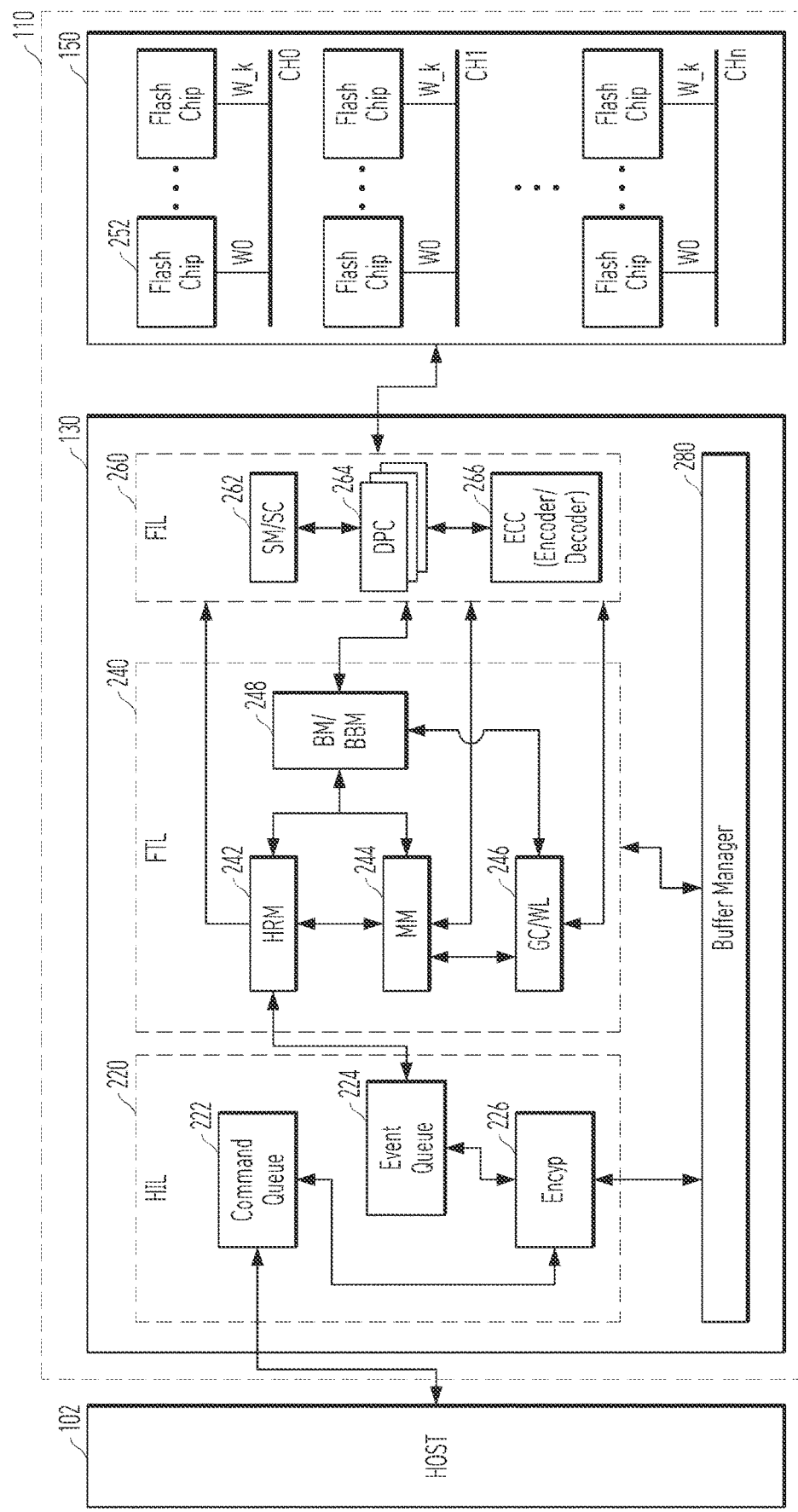
FIG. 2 illustrates a memory system according to an embodiment of the present disclosure.

FIG. 2 illustrates a memory system according to an embodiment of the present disclosure.

Referring to FIG. 2, the controller 130 in a memory system operates along with the host 102 and the memory device 150. As illustrated, the controller 130 may have a layered structure including the host interface (HIL) 220, a flash translation layer (FTL) 240, the memory interface (flash interface layer, FIL) 260.

The memory device 150 can include plural memory chips 252 coupled to the controller 130 through plural channels CH0, CH1, . . . , CH1_n and ways W0, . . . , W_k. The memory chip 252 can include a plurality of memory planes or a plurality of memory dies. According to an embodiment, the memory plane may be considered a logical or a physical partition including at least one memory block, a driving circuit capable of controlling an array including a plurality of non-volatile memory cells, and a buffer that can temporarily store data inputted to, or outputted from, non-volatile memory cells. Each memory plane or each memory die can support an interleaving mode in which plural data input/output operations are performed in parallel or simultaneously. According to an embodiment, memory blocks included in each memory plane, or each memory die, included in the memory device 150 can be grouped to input/output plural data entries as a super memory block.

An internal configuration of the memory device 150 shown in FIGS. 1 and 2 may be changed based on operating performance of the memory system 110. An embodiment of the present disclosure may not be limited to the internal configuration described in FIGS. 1 and 2.

The host interface layer (HIL) 220, the flash translation layer (FTL) 240, and the memory interface layer (FIL) 260 described in FIG. 2 are illustrated as one embodiment. The host interface layer (HIL) 220, the flash translation layer (FTL) 240, and the memory interface layer (FIL) 260 may be implemented in various forms according to the operating performance of the memory system 110. According to an embodiment, the host interface layer 220 may be included in the host interface 132 illustrated in FIG. 1, and the memory interface layer 260 may be included in the memory interface 142 illustrated in FIG. 1.

A buffer manager 280 in the controller 130 can control the input/output of data or operation information in conjunction with the host interface layer (HIL) 220, the flash conversion layer (FTL) 240, and the memory interface layer (FIL) 142. To this end, the buffer manager 280 can set or establish various buffers, caches, or queues in the memory 144 described in FIG. 1, and control data input/output of the buffers, the caches, or the queues, or data transmission between the buffers, the caches, or the queues in response to a request or a command generated by the host interface layer (HIL) 220, the flash translation layer (FTL) 240, and the memory interface layer (FIL) 142. For example, the controller 130 may temporarily store read data provided from the memory device 150 in response to a request from the host 102 before providing the read data to the host 102. Also, the controller 130 may temporarily store write data provided from the host 102 in the memory 144 before storing the write data in the memory device 150. When controlling operations such as a read operation, a program operation, and an erase operation performed within the memory device 150, the read data or the write data transmitted or generated between the controller 130 and the memory device 150 in the memory system 110 could be stored and managed in a buffer, a queue, etc. established in the memory 144 by the buffer manager 280. Besides the read data or the write data, the buffer manager 280 can store signal or information (e.g., map data, a read command, a program command, or etc. which is used for performing operations such as programming and reading data between the host 102 and the memory device 150) in the buffer, the cache, the queue, etc. established in the memory 144. The buffer manager 280 can set, or manage, a command queue, a program memory, a data memory, a write buffer/cache, a read buffer/cache, a data buffer/cache, a map buffer/cache, and etc.

The host interface layer (HIL) 220 may handle commands, data, and the like transmitted from the host 102. By way of example but not limitation, the host interface layer 220 may include a command queue manager 222 and an event queue manager 224. The command queue manager 222 may sequentially store the commands, the data, and the like received from the host 102 in a command queue, and output them to the event queue manager 224, for example, in an order in which they are stored in the command queue manager 222. The event queue manager 224 may sequentially transmit events for processing the commands, the data, and the like received from the command queue. According to an embodiment, the event queue manager 224 may classify, manage, or adjust the commands, the data, and the like received from the command queue. Further, according to an embodiment, the host interface layer 220 can include an encryption manager 226 configured to encrypt a response or output data to be transmitted to the host 102 or to decrypt an encrypted portion in the command or data transmitted from the host 102.

A plurality of commands or data of the same characteristic may be transmitted from the host 102, or a plurality of commands and data of different characteristics may be transmitted to the memory system 110 after being mixed or jumbled by the host 102. For example, a plurality of commands for reading data, i.e., read commands, may be delivered, or commands for reading data, i.e., a read command, and a command for programming/writing data, i.e., a write command, may be alternately transmitted to the memory system 110. The command queue manager 222 of the host interface layer 220 may sequentially store commands, data, and the like, which are transmitted from the host 102, in the command queue. Thereafter, the host interface layer 220 may estimate or predict what type of internal operations the controller 130 will perform according to the characteristics of the commands, the data, and the like, which have been transmitted from the host 102. The host interface layer 220 may determine a processing order and a priority of commands, data and the like based on their characteristics. According to the characteristics of the commands, the data, and the like transmitted from the host 102, the event queue manager 224 in the host interface layer 220 is configured to receive an event, which should be processed or handled internally within the memory system 110 or the controller 130 according to the commands, the data, and the like input from the host 102, from the buffer manager 280. Then, the event queue manager 224 can transfer the event including the commands, the data, and the like into the flash translation layer (FTL) 240.

According to an embodiment, the flash translation layer (FTL) 240 may include a host request manager (HRM) 242, a map manager (MM) 244, a state manager 246, and a block manager 248. Further, according to an embodiment, the flash translation layer (FTL) 240 may implement a multi-thread scheme to perform data input/output (I/O) operations. A multi-thread FTL may be implemented through a multi-core processor using multi-thread included in the controller 130. For example, the host request manager (HRM) 242 may manage the events transmitted from the event queue. The map manager (MM) 244 may handle or control map data. The state manager 246 may perform an operation such as garbage collection (GC) or wear leveling (WL), after checking an operation state of the memory device 150. The block manager 248 may execute commands or instructions onto a block in the memory device 150.

The host request manager (HRM) 242 may use the map manager (MM) 244 and the block manager 248 to handle or process requests according to read and program commands and events which are delivered from the host interface layer 220. The host request manager (HRM) 242 may send an inquiry request to the map manager (MM) 244 to determine a physical address corresponding to a logical address which is entered with the events. The host request manager (HRM) 242 may send a read request with the physical address to the memory interface layer 260 to process the read request, i.e., handle the events. In one embodiment, the host request manager (HRM) 242 may send a program request (or a write request) to the block manager 248 to program data to a specific empty page storing no data in the memory device 150, and then may transmit a map update request corresponding to the program request to the map manager (MM) 244 in order to update an item relevant to the programmed data in information of mapping the logical and physical addresses to each other.

The block manager 248 may convert a program request delivered from the host request manager (HRM) 242, the map manager (MM) 244, and/or the state manager 246 into a flash program request used for the memory device 150, in order to manage flash blocks in the memory device 150. In order to maximize or enhance program or write performance of the memory system 110, the block manager 248 may collect program requests and send flash program requests for multiple-plane and one-shot program operations to the memory interface layer 260. In an embodiment, the block manager 248 sends several flash program requests to the memory interface layer 260 to enhance or maximize parallel processing of a multi-channel and multi-directional flash controller.

In an embodiment, the block manager 248 may manage blocks in the memory device 150 according to the number of valid pages, select and erase blocks having no valid pages when a free block is needed, and select a block including the least number of valid pages when it is determined that garbage collection is to be performed. The state manager 246 may perform garbage collection to move valid data stored in the selected block to an empty block and erase data stored in the selected block so that the memory device 150 may have enough free blocks (i.e., empty blocks with no data).

When the block manager 248 provides information regarding a block to be erased to the state manager 246, the state manager 246 may check all flash pages of the block to be erased to determine whether each page of the block is valid. For example, to determine validity of each page, the state manager 246 may identify a logical address recorded in an out-of-band (0013) area of each page. To determine whether each page is valid, the state manager 246 may compare a physical address of the page with a physical address mapped to a logical address obtained from an inquiry request. The state manager 246 sends a program request to the block manager 248 for each valid page. A map table may be updated by the map manager 244 when a program operation is complete.

The map manager 244 may manage map data, e.g., a logical-physical map table. The map manager 244 may process various requests, for example, queries, updates, and the like, which are generated by the host request manager (HRM) 242 or the state manager 246. The map manager 244 may store the entire map table in the memory device 150, e.g., a flash/non-volatile memory, and cache mapping entries according to the storage capacity of the memory 144. When a map cache miss occurs while processing inquiry or update requests, the map manager 244 may send a read request to the memory interface layer 260 to load a relevant map table stored in the memory device 150. When the number of dirty cache blocks in the map manager 244 exceeds a certain threshold value, a program request may be sent to the block manager 246, so that a clean cache block is made and a dirty map table may be stored in the memory device 150.

When garbage collection is performed, the state manager 246 copies valid page(s) into a free block, and the host request manager (HRM) 242 may program the latest version of the data for the same logical address of the page and concurrently issue an update request. When the state manager 246 requests the map update in a state in which the copying of the valid page(s) is not completed normally, the map manager 244 may not perform the map table update. This is because the map request is issued with old physical information when the state manger 246 requests a map update and a valid page copy is completed later. The map manager 244 may perform a map update operation to ensure accuracy when, or only if, the latest map table still points to the old physical address.

The memory interface layer 260 may exchange data, commands, state information, and the like, with a plurality of memory chips 252 in the memory device 150 through a data communication method. According to an embodiment, the memory interface layer 260 may include a status check schedule manager 262 and a data path manager 264. The status check schedule manager 262 can check and determine the operation state regarding the plurality of memory chips 252 coupled to the controller 130, the operation state regarding a plurality of channels CH0, CH1, . . . , CH1_n and the plurality of ways W0, . . . , W_k, and the like. The transmission and reception of data or commands can be scheduled in response to the operation states regarding the plurality of memory chips 252 and the plurality of channels CH0, CH1, . . . , CH1_n. The data path manager 264 can control the transmission and reception of data, commands, etc. through the plurality of channels CH0, CH1, . . . , CH1_n and ways W0, . . . , W_k based on the information transmitted from the status check schedule manager 262. According to an embodiment, the data path manager 264 may include a plurality of transceivers, each transceiver corresponding to each of the plurality of channels CH0, CH1, . . . , CH1_n.

According to an embodiment, the memory interface layer 260 may further include ECC (error correction code) module 266 configured to perform error checking and correction of data transferred between the controller 130 and the memory device 150. The ECC unit 266 may be implemented as a separate module, circuit, or firmware in the controller 130, but may also be implemented in each memory chip 252 included in the memory device 150 according to an embodiment. The ECC module 266 may include a program, a circuit, a module, a system, or an apparatus for detecting and correcting an error bit of data processed by the memory device 150.

For finding and correcting any error of data transferred from the memory device 150, the ECC module 266 can include an error correction code (ECC) encoder and an ECC decoder. The ECC encoder may perform error correction encoding of data to be programmed in the memory device 150 to generate encoded data into which a parity bit is added, and store the encoded data in the memory device 150. The ECC decoder can detect and correct error bits contained in the data read from the memory device 150 when the controller 130 reads the data stored in the memory device 150. For example, after performing error correction decoding on the data read from the memory device 150, the ECC module 266 can determine whether the error correction decoding has succeeded or not, and outputs an instruction signal, e.g., a correction success signal or a correction fail signal, based on a result of the error correction decoding. The ECC module 266 may use a parity bit, which has been generated during the ECC encoding process for the data stored in the memory device 150, in order to correct the error bits of the read data entries. When the number of the error bits is greater than or equal to the number of correctable error bits, the ECC circuitry 138 may not correct the error bits and instead may output the correction fail signal indicating failure in correcting the error bits.

According to an embodiment, the ECC circuitry 138 may perform an error correction operation based on a coded modulation such as a low density parity check (LDPC) code, a Bose-Chaudhuri-Hocqueng hem (BCH) code, a turbo code, a Reed-Solomon (RS) code, a convolution code, a recursive systematic code (RSC), a trellis-coded modulation (TCM), a Block coded modulation (BCM), or the like. The ECC circuitry 138 may include all circuits, modules, systems, and/or devices for performing the error correction operation based on at least one of the above-described codes.

In accordance with an embodiment, a manager included in the host interface layer 220, the flash translation layer (FTL) 240, and the memory interface layer 260 could be implemented with a general processor, an accelerator, a dedicated processor, a co-processor, a multi-core processor, or the like. According to an embodiment, the manager can be implemented with firmware working with a processor.

Figure 3:
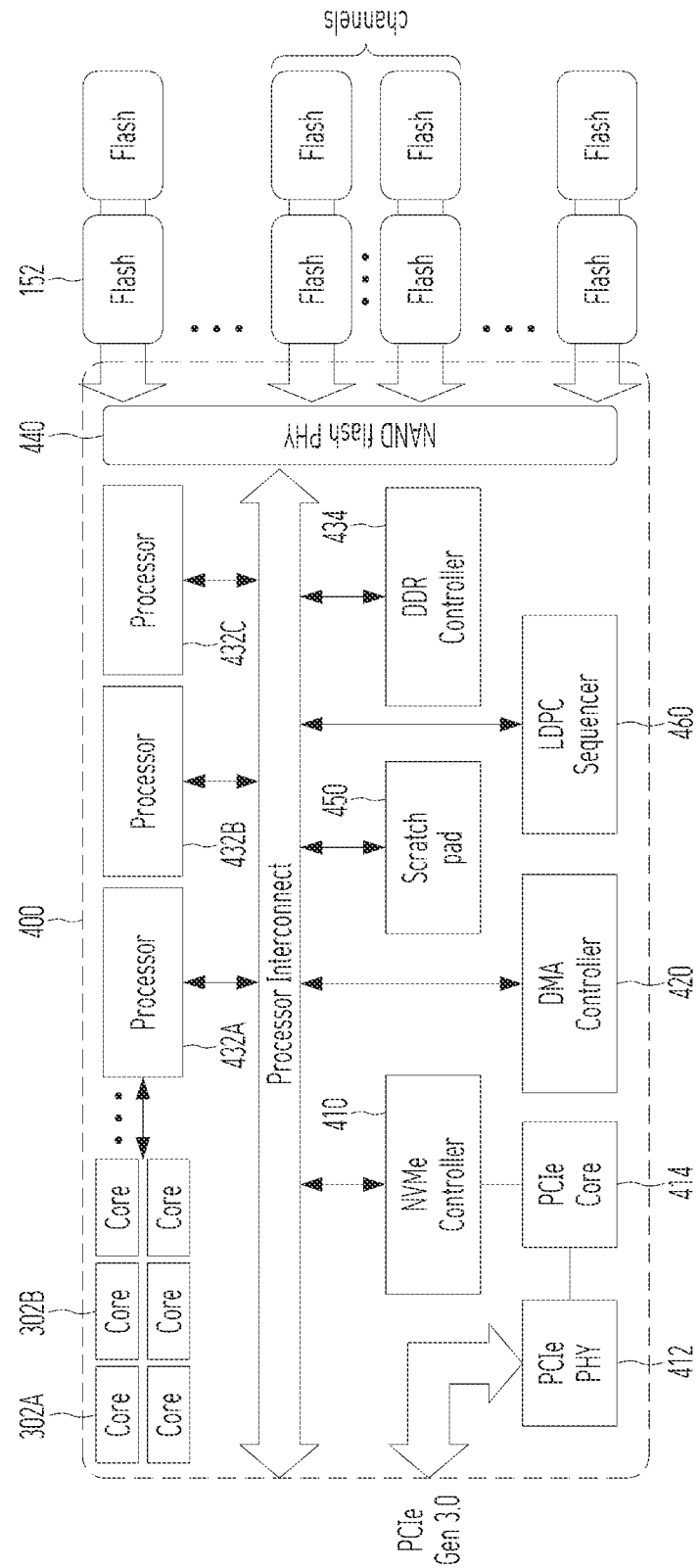
FIG. 3 illustrates a memory system according to another embodiment of the present disclosure.

FIG. 3 illustrates a memory system according to another embodiment of the present disclosure. Specifically, FIG. 3 shows a memory system including multiple cores or multiple processors, which is an example of a data storage system. The memory system may support the Non-Volatile Memory Express (NVMe) protocol.

The NVMe is a kind of transfer protocol designed for a solid-state memory that could operate much faster than a conventional hard drive. The NVMe can support higher input/output operations per second (IOPS) and lower latency, resulting in faster data transfer speeds and improved overall performance of the data storage system. Unlike SATA which has been designed for a hard drive, the NVMe can leverage the parallelism of solid-state storage to enable more efficient use of multiple queues and processors (e.g., CPUs). The NVMe is designed to allow hosts to use many threads to achieve higher bandwidth. The NVMe can allow the full level of parallelism offered by SSDs to be fully exploited. However, because of limited firmware scalability, limited computational power, and high hardware contention within SSDs, the memory system might not process a large number of I/O requests in parallel.

Referring to FIG. 3, the host, which is an external device, can be coupled to the memory system through a plurality of PCIe Gen 3.0 lanes, a PCIe physical layer 412, and a PCIe core 414. A controller 400 may include three embedded processors 432A, 432B, 432C, each using two cores 302A, 302B. Herein, the plurality of cores 302A, 302B or the plurality of embedded processors 432A, 432B, 432C may have a pipeline structure.

The plurality of embedded processors 432A, 432B, 432C may be coupled to the internal DRAM controller 434 through a processor interconnect. The controller 400 further includes a Low Density Parity-Check (LDPC) sequencer 460, a Direct Memory Access (DMA) engine 420, a scratch pad memory 450 for metadata management, and an NVMe controller 410. Components within the controller 400 may be coupled to a plurality of channels connected to a plurality of memory packages 152 through a flash physical layer 440. The plurality of memory packages 152 may correspond to the plurality of memory chips 252 described in FIG. 2.

According to an embodiment, the NVMe controller 410 included in the controller 400 is a type of storage controller designed for use with solid state drives (SSDs) that use an NVMe interface. The NVMe controller 410 may manage data transfer between the SSD and the computer CPU as well as other functions such as error correction, wear leveling, and power management. The NVMe controller 410 may use a simplified, low-overhead protocol to support fast data transfer rates.

According to an embodiment, a scratch pad memory 450 may be a storage area set by the NVMe controller 410 to temporarily store data. The scratch pad memory 450 may be used to store data waiting to be written to a plurality of memory packages 152. The scratch pad memory 450 can also be used as a buffer to speed up the writing process, typically with a small amount of Dynamic Random Access Memory (DRAM) or Static Random Access Memory (SRAM). When a write command is executed, data may first be written to the scratch pad memory 450 and then transferred to the plurality of memory packages 152 in larger blocks. The scratch pad memory 450 may be used as a temporary memory buffer to help optimize the write performance of the plurality of memory packages 152. The scratch pad memory 450 may serve as intermediate storage of data before the data is written to non-volatile memory cells.

The Direct Memory Access (DMA) engine 420 included in the controller 400 is a component that transfers data between the NVMe controller 410 and a host memory in the host system without involving host's processor. The DMA engine 420 can support the NVMe controller 410 to directly read or write data from or to the host memory without intervention of the host's processor. According to an embodiment, the DMA engine 420 may achieve or support high-speed data transfer between a host and an NVMe device, using a DMA descriptor that includes information regarding data transfer such as a buffer address, a transfer length, and other control information.

The Low Density Parity Check (LDPC) sequencer 460 in the controller 400 is a component that performs error correction on data stored in the plurality of memory packages 152. Herein, an LDPC code is a type of error correction code commonly used in a NAND flash memory to reduce a bit error rate. The LDPC sequencer 460 may be designed to immediately process encoding and decoding of LDPC codes when reading and writing data from and to the NAND flash memory. According to an embodiment, the LDPC sequencer 460 may divide data into plural blocks, encode each block using an LDPC code, and store the encoded data in the plurality of memory packages 152. Thereafter, when reading the encoded data from the plurality of memory packages 152, the LDPC sequencer 460 can decode the encoded data based on the LDPC code and correct errors that may have occurred during a write or read operation. The LDPC sequencer 460 may correspond to the ECC module 266 described in FIG. 2.

Figure 10:
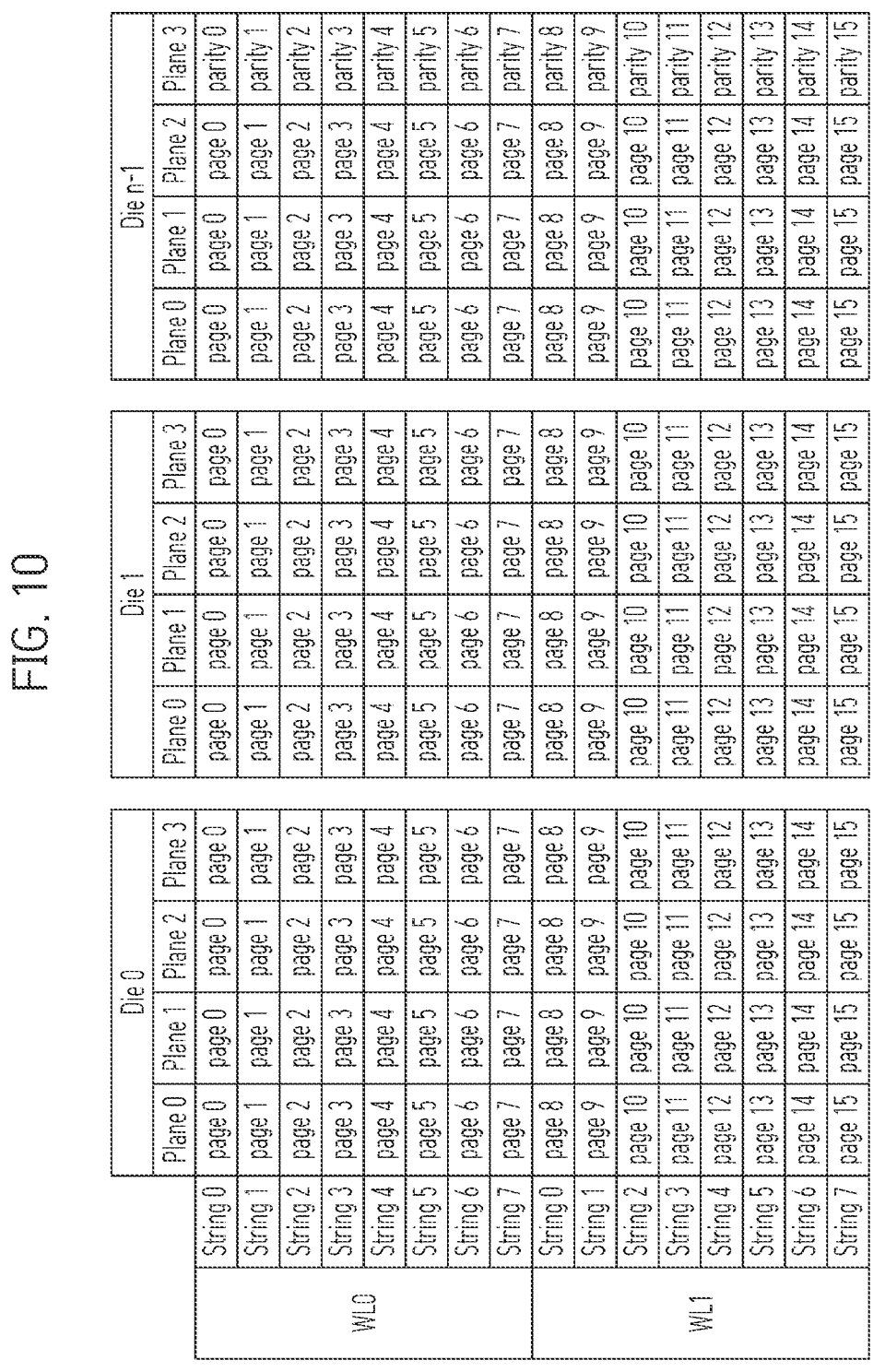

In addition, although FIGS. 9 and 10 illustrate an example of a memory system including a memory device 150 or a plurality of memory packages 152 capable of storing data, the data storage system according to an embodiment of the present invention may not be limited to the memory system described in FIGS. 9 and 10. For example, the memory device 150, the plurality of memory packages 152, or the data storage device controlled by the controllers 130, 400 may include non-volatile or non-volatile memory devices. In FIG. 3, it is explained that the controller 400 can performs data communication with the host 102 externally placed from the memory system (see FIGS. 1 and 2) through an NVM Express (NVMe) interface and a PCI Express (PCIe). In an embodiment, the controller 400 may perform data communication with at least one host through a protocol such as a Compute Express Link (CXL).

Additionally, according to an embodiment, an apparatus and method for performing distributed processing or allocation/reallocation of the plurality of instructions in a controller including multi processors of the pipelined structure according to an embodiment of the present invention can be applicable to a data processing system including a plurality of memory systems or a plurality of data storage devices. For example, a Memory Pool System (MPS) is a very general, adaptable, flexible, reliable and efficient memory management system where a memory pool such as a logical partition of primary memory or storage reserved for processing a task or group of tasks could be used to control or manage a storage device coupled to the controller. The controller including multi processors in the pipelined structure can control data and program transfer to the memory pool controlled or managed by the memory pool system (MPS).

Figure 4:
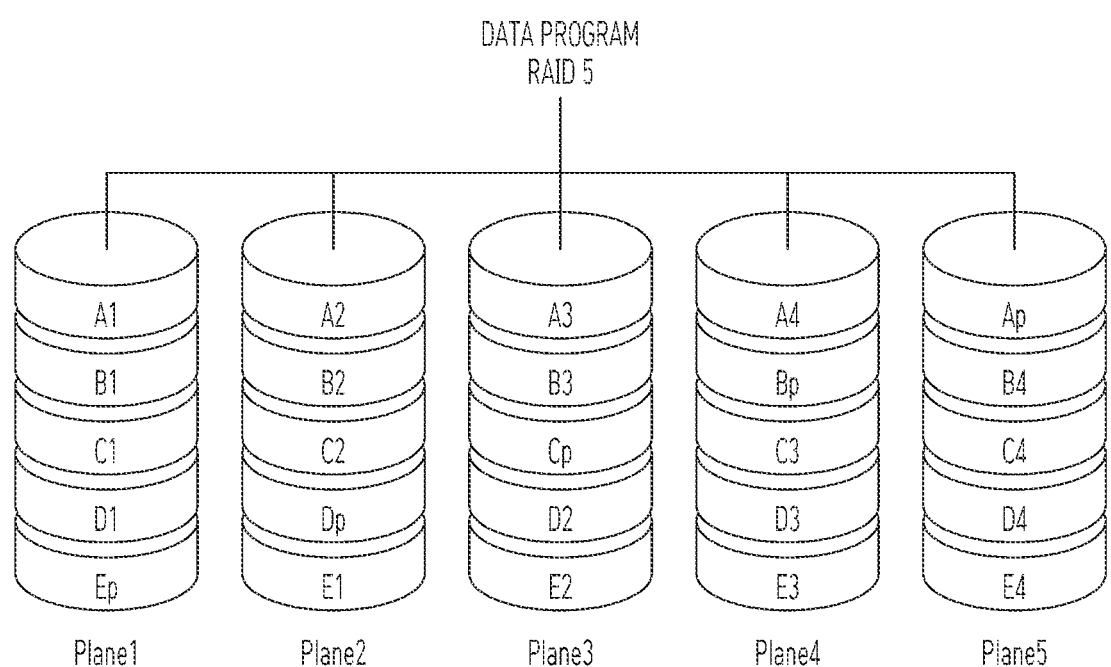
FIG. 4 illustrates a redundant array of independent (or inexpensive) disks (RAID) applicable to a memory device in accordance with another embodiment of the present disclosure.

FIG. 4 illustrates a redundant array of independent (or inexpensive) disks (RAID) applicable to a memory device in accordance with another embodiment of the present disclosure. Specifically, FIG. 4 shows an example of using five regions (Plane1, Plane2, Plane3, Plane4, Plane5) in a Redundant Array of Independent Disk (RAID) or a Redundant Array of Inexpensive Disk (RAID).

Five regions included in the memory device using a RAID scheme can have substantially a same size. According to an embodiment, each of the five regions Plane1, Plane2, Plane3, Plane4, Plane5 included in the memory device 150 can include a memory plane, a memory block, a memory die, or the like. In another embodiment, the five regions Plane1, Plane2, Plane3, Plane4, and Plane5 can be five logical regions established by a user.

The memory system 110 can use the RAID scheme to store 4 entries of data A1, A2, A3, A4 and 1 parity Ap in five regions Plane1, Plane2, Plane3, Plane4, Plane5. Even if an error occurs in one region of the five regions Plane1, Plane2, Plane3, Plane4, Plane5, data stored in an errored region can be recovered and restored based on the other entries of data and the parity stored in the remaining four regions. For example, the parity Ap can be generated by an exclusive-OR (XOR) logical operation on the four entries of data A1, A2, A3, A4. Thereafter, when an error occurs in a second entry of data A2 among the four entries of data A1, A2, A3, A4, the second data A2 can be recovered and restored by an exclusive-OR (XOR) operation on first, third, and fourth entries of data A1, A3, A4 and the entry of parity Ap.

In addition, because it is difficult to predict at which region among the five regions Plane1, Plane2, Plane3, Plane4, Plane5 a problem will occur, locations for storing four entries of data and one entry of parity can be changed. For example, one entry of first parity Ap corresponding to the four entries of first data A1, A2, A3, A4 can stored in a fifth region Plane5, but one entry of second parity Bp corresponding to four entries of second data B1, B2, B3, B4 can be stored in a fourth space Plane4.

For generating a parity, the memory system 110 can include a parity generation engine. Referring to FIG. 4, in the five regions Plane1, Plane2, Plane3, Plane4, Plane5 of the memory device 150, four entries of first data A1, A2, A3, A4 and one entry of first parity Ap can be programmed. The parity generation engine may generate one entry of first parity Ap based on the four entries of first data A1, A2, A3, A4. In the memory system 110, four entries of first data A1, A2, A3, A4 can be stored in a first non-volatile cell region, and one entry of first parity Ap can be stored in a second non-volatile cell region. In order to program the multi-bit data, when the memory device 150 according to an embodiment of the disclosure can perform a two-step program operation, a parity can be generated and stored in the RAID scheme. In this case, the size of the SLC buffer above described can be reduced or used efficiently.

Referring to FIG. 4, four entries of data A1, A2, A3, and A4 are used to generate one entry of parity information Ap. In order for the memory system 110 to generate one entry of parity information Ap, it must have a buffer for storing four entries of data A1, A2, A3, and A4 and one entry of parity information Ap. If the memory system 110 generates one parity based on 63 entries of data, the memory system 110 should include a buffer for storing 64 entries of data and parity.

Figure 5:
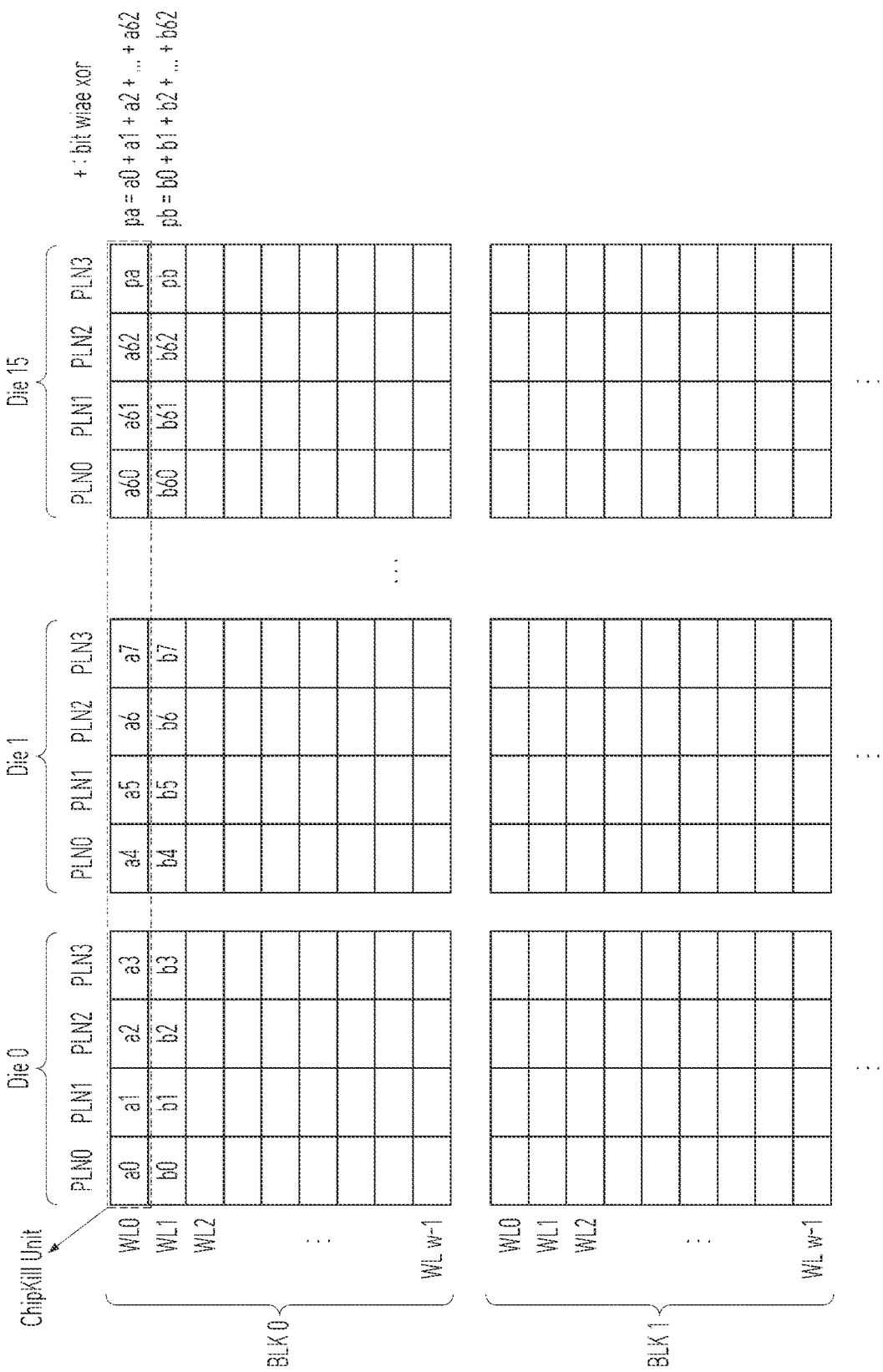
FIG. 5 illustrates a first example of how to distribute and store plural data entries in a memory device.

FIG. 5 illustrates a first example of how to distribute and store plural data entries in a memory device. Specifically, FIG. 5 shows the memory device 150 capable of storing plural data entries distributed over plural open memory blocks and a parity entry associated with the plural data entries. Herein, the plural open memory blocks could be understood as a super memory block.

Referring to FIG. 5, the memory device 150 can include a plurality of memory dies Die0, Die1, . . . , Die15. Each memory die Die0 to Die15 can include four memory planes PLN0, PLN1, PLN2, PLN3. Each of the memory planes PLN0, PLN1, PLN2, PLN3 can include a plurality of memory blocks BLK0, BLK1, . . . , and each of the memory blocks BLK0, BLK1, . . . can include a plurality of memory cells connected to a plurality of word lines WL0, WL1, WL2, . . . , WLw-1.

According to an embodiment, a non-volatile memory cell of the memory device 150 can store multi-bit data. However, for convenience of description, FIG. 8 shows, as an example, the memory device 150 for storing a single data entry a0, a1, a2, . . . , a61, a62 or a single parity entry pa, pb in plural memory cells coupled to each word line in each memory region or area.

In order to improve a speed of the data input/output operation performed in the memory system 110, the memory system 110 can read or program plural data entries having a preset size together or in parallel. The speed of the data input/output operation can be improved through an interleaving mode in which plural data entries of a preset size are read or programmed in parallel in plural memory areas or regions in which the data input/output operation can be performed independently or individually. In FIG. 5, data input/output operations can be independently or individually performed in each of the memory planes PLN0, PLN1, PLN2, PLN3. For example, open memory block BLK0 included in each of the plural memory planes PLN0, PLN1, PLN2, PLN3 can be included in a super memory block to be programmed with plural data entries transferred from the controller 130.

Referring to FIG. 5, the memory system 110 can program 63 first data entries a0, a1, a2, . . . , a61, a62 into a memory block included in 63 memory areas or regions (e.g., memory planes). In addition, the memory system 110 can calculate and generate a first parity entry pa based on the 63 first data entries a0, a1, a2, . . . , a61, a62, and program the first parity entry pa in a memory area or regions other than the 63 memory areas or regions. The memory system 110 may distribute and store the 63 first data entries a0, a1, a2, . . . , a61, a62 and the first parity entry pa in 64 memory areas or regions. Herein, the 63 first data entries a0, a1, a2, . . . , a61, a62 and the first parity entry pa could be included in a single chipkill unit or a single chipkill decoding unit. Even if UECC occurs in one of the data entries or the parity entry included in one chipkill unit, a UECC-generated data entry may be restored based on other data entries and the parity entry having no errors. According to an embodiment, the ECC unit 266 described in FIG. 2 may generate parity information corresponding to a plurality of data or recover the UECC-generated data entry based on the chipkill unit.

The memory system 110 may be configured to store voluminous data. For example, 3-bit data may be stored in each of the nonvolatile memory cells in the memory device 150, and eight strings may constitute one page. Further, data entries and a parity entry (total 16 entries) may be distributed and stored in 16 open memory blocks in the memory device 150. The data entries may be stored in 15 open memory blocks out of 16 open memory blocks, and the parity entry may be stored in another open memory block. In this case, the number of non-volatile memory cells commonly connected to one word line of each of the 16 open memory blocks is 8 (the number of strings), and data stored in each nonvolatile memory cell is 3-bit data, so that 384 (=16×8×3) bits of data and parity can be programmed in the memory device 150. The memory system 110 should include a buffer or a cache configured to temporarily store 384-bit data and parity in order that the controller 130 generates the parity entry based on the data entries during a program operation. As the number of open memory blocks in the memory device 150 increases, as the number of strings increases, and as the number of bits of data stored in each non-volatile memory cell increases, the memory system 110 should establish or set a larger buffer or cache for generating parity during a program operation. That is, a size of the buffer or the cache would be increased.

Although the above-described parity generating method and apparatus are simply implemented, the size of a buffer used for parity generation should increase as an amount of data programmed one-time in the memory device 150 increases, so that internal resources are burdened. For example, as the memory system 110 includes a larger buffer for parity generation, the production cost of the memory system 110 may also increase. In the above-described parity generation method, the number of data used to generate parity is preset, and locations for storing data entries and parity entry are predetermined. Accordingly, the size of the buffer to be secured by the memory system 110 to generate the parity may be determined according to a data size of the program operation and a size of the chipkill unit.

Figure 6:
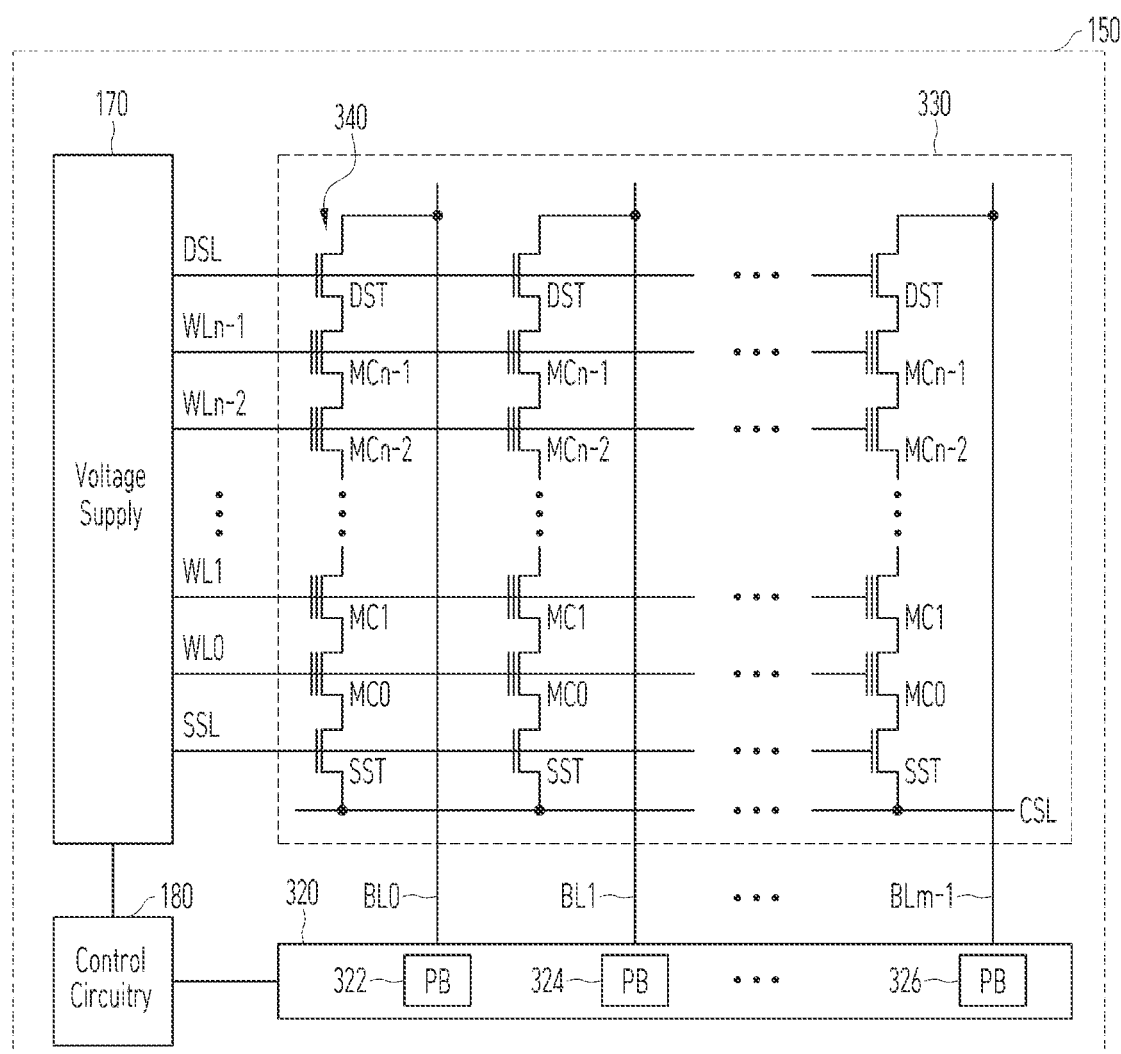
FIG. 6 illustrates a memory device according to another embodiment of the present disclosure.

FIG. 6 illustrates a memory device according to another embodiment of the present disclosure. Specifically, FIG. 6 illustrates a memory cell group (e.g., a cell array) included in a memory plane or a memory die included in the memory device 150 according to an embodiment of the present disclosure.

Referring to FIG. 6, the memory device 150 may include at least one memory group 330 having a plurality of cell strings 340. Each cell string 340 may include a plurality of non-volatile memory cells MC0 to MCn-1 connected to a respective bit line of a plurality of bit lines BL0 to BLm-1. The cell strings 340 are disposed in respective columns of the memory group 330, and each cell string 340 can include at least one drain select transistor DST and at least one source select transistor SST. The non-volatile memory cells MC0 to MCn-1 of each cell string 340 may be connected in series between a drain select transistor DST and a source select transistor SST. Each of the non-volatile memory cells MC0 to MCn-1 may be configured as a multi-level cell (MLC) that stores a data item having plural bits per cell. The cell strings 340 may be electrically connected to corresponding bit lines of the bit lines BL0 to BLm-1.

In an embodiment, the memory group 330 may include NAND-type flash memory cells MC0 to MCn-1. In another embodiment, the memory group 330 can be implemented as a NOR-type flash memory, a hybrid flash memory in which at least two different types of memory cells are mixed or combined, or a one-chip NAND flash memory in which a controller is embedded in a single memory chip. In an embodiment, the memory group 330 can include a flash memory cell including a charge trap flash (CTF) layer that includes a conductive floating gate or insulating layer.

According to an embodiment, the memory device 150 shown in FIG. 6 can include at least one memory block shown in FIG. 1. The memory group 330 can have a two-dimensional (2D) or three-dimensional (3D) structure. For example, each of the memory blocks in the memory device 150 may be implemented as a 3D structure, for example, a vertical structure. Each of the memory blocks may have a three-dimensional structure extending along first to third directions, for example, an x-axis direction, a y-axis direction, and a z-axis direction.

The memory group 330 including at least one memory block can be coupled to a plurality of bit lines BL, a plurality of string select lines SSL, a plurality of drain select lines DSL, a plurality of word lines WL, a plurality of dummy word lines DWL, and a plurality of common source lines CSL. In one embodiment, the memory group 330 can include a plurality of NAND strings NS which, for example, may respectively correspond to cell strings 340. Each NAND string NS may include a plurality of memory cells MC and may be connected to a respective bit line of the bit lines BL. In addition, the string select transistor SST of each NAND string NS may be connected to a common source line CSL, and the drain select transistor DST of each NAND string NS can be connected to a corresponding bit line BL. In each NAND string NS, the memory cells MC may be arranged between the string select transistor SST and the drain select transistor DST.

The memory device 150 may include the voltage supply circuit 170 which can supply a word line voltage e.g., one or more predetermined voltages such as a program voltage, a read voltage, and a pass voltage, for respective word lines of the word lines according to an operation mode, or may supply a voltage to a bulk, e.g., a well region, in which each memory block including the memory cells MC are formed. In this case, a voltage generating operation of the voltage supply circuit 170 may be performed under a control of the control circuitry 180. Also, the voltage supply circuit 170 may generate a plurality of variable read voltages to distinguish a plurality of data items from each other.

In response to the control of the control circuitry 180, one of the memory blocks (or sectors) of the memory cell array may be selected, and one of the word lines of the selected memory block may be selected. Word line voltages may be supplied to the selected word line and the unselected word line of the memory group 330, individually. The voltage supply circuit 170 may include a voltage generation circuit for generating target voltages having various levels, which are applicable to word lines of the memory group 330.

The memory device 150 may also include a read/write circuit 320 controlled by the control circuitry 180. The read/write circuit 320 may operate as a sense amplifier or a write driver according to an operation mode. For example, in a verify operation and a read operation, the read/write circuit 320 may operate as a sense amplifier for reading the data item from the memory cell array. In a program operation, the read/write circuit 320 may operate as a write driver that controls potentials of bit lines according to a data item to be stored in the memory cell array. The read/write circuit 320 may receive the data item to be programmed to the cell array from page buffers during the program operation. The read/write circuit 320 can drive bit lines based on the input data item. To this end, the read/write circuit 320 may include a plurality of page buffers (PB) 322, 324, 326, with each page buffer corresponding to each column or each bit line, or each column pair or each bit line pair. According to an embodiment, a plurality of latches may be included in each of the page buffers 322, 324, 326. According to an embodiment, the number of latches or page buffers coupled to each bit line can be equal to, or greater than, the number of bits of data stored in the memory cells MC.

The page buffers 322, 324, 326 may be coupled to a data input/output device, e.g., a serialization circuit or a serializer, through a plurality of buses BUS. When each of the page buffers 322, 324, 326 is coupled to the data input/output device through different buses, a delay that may occur in data transmission from the page buffers 322, 324, 326 can be reduced. For example, each page buffer 322, 324, 326 can perform the data transmission without a waiting time.

According to an embodiment, the memory device 150 may receive a write command, write data, and information, e.g., a physical address, regarding a location in which the write data is to be stored. The control circuitry 180 causes the voltage supply circuit 170 to generate a program pulse, a pass voltage, etc., used for a program operation performed in response to a write command, and to generate one or more voltages used for a verification operation performed after the program operation.

When a multi-bit data item is programmed in non-volatile memory cells included in the memory group 330, the error rate might be higher than that when a single-bit data item is stored in the non-volatile memory cells. For example, an error in the non-volatile memory cells may be induced due to cell-to-cell interference (CCI). In order to reduce error in the non-volatile memory cells, a width (deviation) of a threshold voltage distribution, corresponding to stored data items between the non-volatile memory cells, should be reduced.

To this end, the memory device 150 can perform an incremental step pulse programming (ISPP) operation to effectively make a narrow threshold voltage distribution of the non-volatile memory cells. In an embodiment, the memory device 150 can use the ISPP operation for multi-step program operations. For example, the memory device 150 may divide a program operation into a Least Significant Bit (LSB) program operation and a Most Significant Bit (MSB) operation according to a predetermined order between the non-volatile memory cells or pages.

A multi-bit value programmed in a memory cell in a NAND flash memory (e.g., NAND-type flash memory cells MC0 to MCn-1 in the memory group 330) can be determined based on a threshold voltage window or a threshold voltage distribution to which the cell's threshold voltage belongs. As a size of each memory cell shrinks and more bits (e.g., 3-bit, 4-bit, or 5-bit) of data are programmed per memory cell, a width of the threshold voltage window used to represent each multi-bit value becomes narrower, increasing an error rate when determining the multi-bit value stored in the memory cell. This is because process variations become more widespread when an amount of charge stored in each memory cell decreases with a feature size, resulting in large differences in threshold voltages of different memory cells storing the same value. As a result, it becomes increasingly difficult to determine to which value a threshold voltage of a memory cell corresponds.

According to an embodiment, the control circuitry 180 may include a read retry table (RRT). The RRT may be stored in the memory device 150. A read error may occur in a process of applying a read voltage to a non-volatile memory cell in the memory device 150 through a word line and reading data stored in the non-volatile memory cell. The control circuitry 180 in the memory device 150 may manage information regarding a read retry mechanism for resolving read errors. One of the information regarding the read retry mechanism is the read RRT. The read retry mechanism uses the RRT for a recorded location where the error has occurred, so that the memory device 150 can ensure data integrity by applying an appropriate correction value (e.g., changing a read voltage level) when re-reading.

Figure 7:
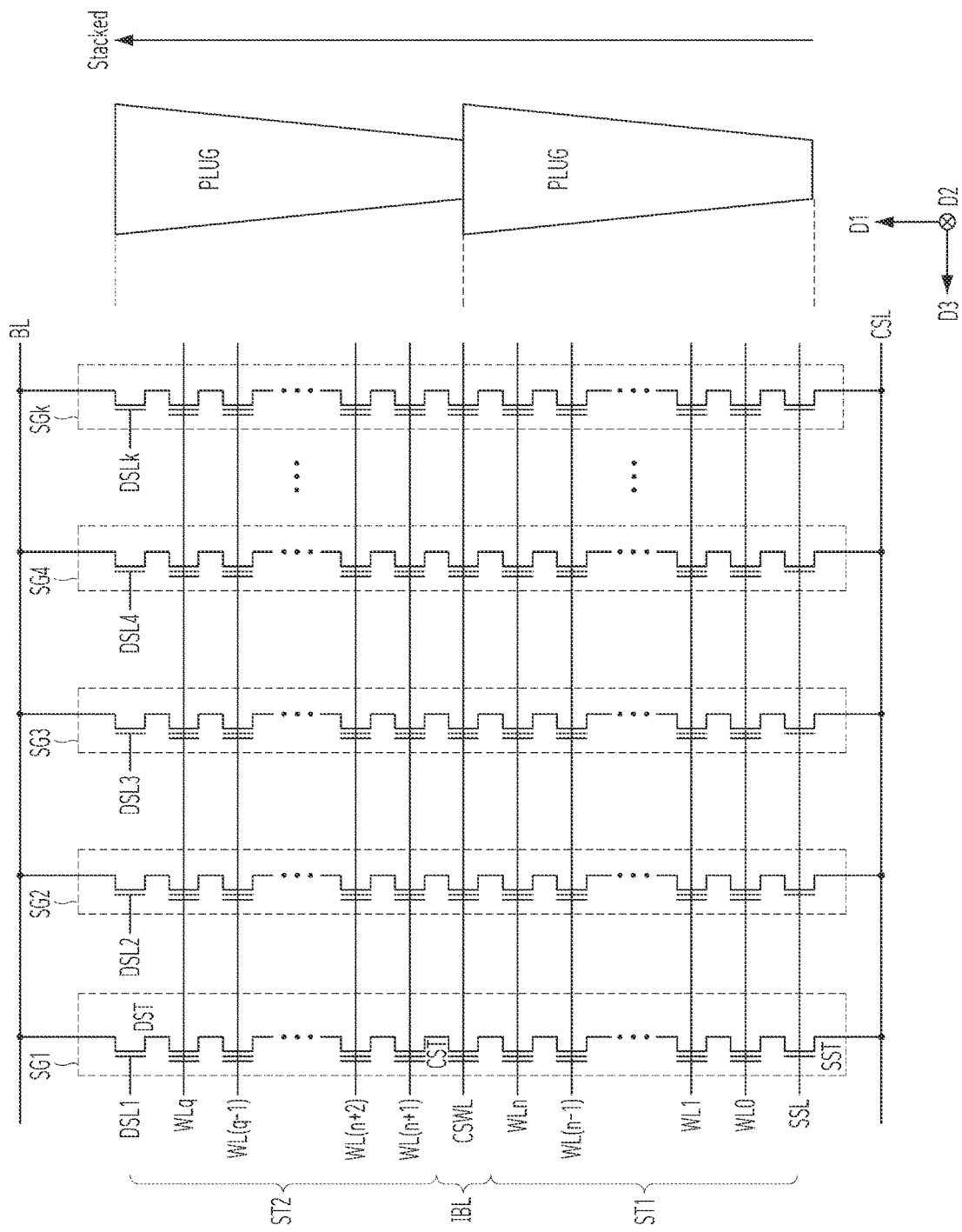
FIG. 7 illustrates a memory device according to another embodiment of the present disclosure.

FIG. 7 illustrates a memory device according to another embodiment of the present disclosure.

Referring to FIG. 7, the memory cell array may have a structure including portions or layers stacked in a vertical direction D1. The memory cell array may include at least one memory block. Hereinafter, a direction substantially perpendicular to the upper surface of the substrate may be defined as a first direction D1, and two directions parallel to the upper surface of the substrate and intersecting each other may be defined as the second direction D2 and the third direction D3, individually. For example, the second direction D2 and the third direction D3 may intersect each other substantially perpendicularly. The first direction D1 may be referred to as a vertical direction, the second direction D2 may be referred to as a row direction, and the third direction D3 may be referred to as a column direction. The direction indicated by the arrow in the drawing and the direction opposite to it are explained as the same direction.

For convenience of explanation, FIG. 7 shows NAND strings or cell strings SG1 to SGk connected to one bit line BL and one common source line CSL among the cell strings included in the memory block.

The memory block may include a plurality of cell strings SG1 to SG5 connected between the same bit line (BL) and the common source line CSL. Each of the cell strings SG1 to SGk can include at least one source select transistor SST controlled by a source select line SSL, plural memory cells controlled by word lines WL, a central switching transistor CST disposed in an intermediate boundary layer IBL and controlled by a central switching word line CSWL, and a drain select transistor DST controlled by each drain select line DSL1, DSL2, DSL3, . . . , DSLk.

According to an embodiment, plural memory cells connected to at least one word line located at both ends of first and second stacks ST1, ST2 in the first direction D1 may be dummy cells. Any data may not be stored in the dummy cells. Further, according to an embodiment, the dummy cells may be used to store data having a smaller number of bits than other memory cells. According to an embodiment, the intermediate boundary layer IBL may include at least one gate line. One gate line corresponds to the central switching word line CSWL which can simultaneously control switching operations of the central switching transistors CST connected thereto. Further, although FIG. 7 illustrates a structure in which the first and second stacks ST1, ST2 are stacked, three or more stacks may be vertically stacked in the cell array 330. When a plurality of stacks is stacked, an intermediate boundary layer IBL may be formed and disposed between each two stacked stacks. The intermediate boundary layer IBL may include at least one switching transistor configured to couple memory cells in one stack of the two stacks to other memory cells in the other stack.

FIG. 7 shows an embodiment in which the source select transistors SST included in the plurality of cell strings SG1 to SGk are connected to the common selection line CSL. However, according to an embodiment, a certain number of source selection transistors could be coupled to each of plural source ground selection lines.

Referring to FIGS. 6 to 7, the cell array 330 can include a plurality of memory blocks arranged along a plurality of directions D1, D2, D3. In an embodiment, a memory block may be selected by the control circuitry 180 shown in FIG. 6. For example, a read voltage, a program voltage, or an erase voltage may be applied to a memory block and a word line selected by the control circuitry 180.

Each of the cell strings SG1 to SGk may include a plurality of switch transistors as well as a plurality of memory cells capable of storing data. Here, the plurality of switch transistors can include a drain select transistor DST, a source select transistor SST, and a central switching transistor CST. FIG. 7 shows an embodiment in which each of the cell strings SG1 to SGk includes one drain select transistor DST, one source select transistor SST, and one central switching transistor CST, respectively. However, according to an embodiment, each of the cell strings SG1 to SGk may include a plurality of drain select transistors DST, a plurality of source select transistors SST, or a plurality of intermediate switching transistors CST.

FIG. 8 illustrates a second example of how to distribute and store plural data entries in a memory device. Specifically, FIG. 8 shows locations where data entries are stored in memory dies Die0, Die1, Die n−1 having a structure in which eight strings String0 to String7 are coupled to each word line WL0, WL1, WL, . . . , WL9. FIG. 8 describes the parity entry generated based on the data entries.

As shown in FIG. 8, the memory device 150 can include the plural memory dies Die0, Die1, Die n−1. Each of the memory dies Die0, Die1, Die n−1 can include four memory planes Plane0, Plane1, Plane2, Plane3. Each word line WL0, WL1, WL, . . . , WL9 can be coupled to 8 cell strings String0 to String7. Although FIG. 9 shows an example of the memory device 150 including 10 word lines WL0, WL1, WL, . . . , WL9, the number of word lines included in the memory device 150 can vary based on storage capacity of the memory device 150. A plurality of parities Parity0, Parity1, . . . , Parity15 can be generated for plural data entries which are stored at different locations in the memory device 150. The plurality of parities Parity0, Parity1, . . . , Parity15 can be stored at locations, each location corresponding to locations in which each data entries are stored.

Regarding parity generation and storage, a method shown in FIG. 8 might be similar to that shown in FIG. 6. First, based on locations of data entries stored in the memory device 150, combination of data entries for generating each parity Parity0, Parity1, . . . , Parity15 could be determined. For example, an exclusive OR (XOR) operation on a plurality of data entries s-page0, s-page16, s-page32, s-page72 stored in locations corresponding to a first string String0 coupled to the odd word lines WL0, . . . , WL8 of each plane included in the n number of memory dies can be performed to calculate a first parity parity0. The first parity parity0 may be stored in the first string String0 connected to the ninth word line WL8 in the fourth memory plane Plane3 of the n-th memory die. The other 15 parities parity1, . . . , parity15 can also be generated in the same way and stored in the corresponding location within the memory device 150.

Referring to FIG. 8, the 16 parities parity0, parity1, . . . , parity15 can be generated. The combination of data entries for generating each parity can be called a parity group. The 16 parity groups can be stored in locations corresponding to 10 word lines in the memory device 150. Each parity group can correspond to 16 super-pages. Here, the super page may be a means for managing multiple locations distributed within the memory device 150 as one logical page, such as a super memory group. Provided that the memory device 150 contains 100 word lines, 160 (=16×10) parity groups can be generated and stored. As the number of memory dies in the memory device 160 increases (the larger the value of n), the size of data entries included in each super page increases. Also, the number of data entries included in each parity group may increase. In this case, the amount of parities (or a ratio of parities and data entries) stored in the memory device 150 could be reduced, so greater data entries can be stored even when the storage capacity of the memory device 150 is the same.

According to an internal configuration of the memory device 150 or a set of the parity group, the number of parities stored in the memory device 150 can vary. This may result in a difference in error recovery performance for recovering a data entry in response to an error (e.g., UECC) when the error occurs in the memory device 150. Hereinafter, it will be explained that error recovery performance varies depending on parity group sets and location sets for data entry storage.

FIGS. 9 to 12 illustrates first to fourth examples of parity groups in the memory device 150. FIGS. 9 to 12 describe four different schemes for generating a parity through an exclusive OR (XOR) operation. Herein, non-limiting examples are 1-string XOR, 16-string XOR, all-string XOR (e.g., plane-level chipkill), and die-level XOR.

Specifically, FIGS. 9 to 12 illustrate parity generation for a plurality of data entries stored in the memory device 150. Parity group sets can vary depending on storage locations of the plurality of data entries and parity. Referring to FIGS. 8 and 9 to 12, error recovery performance may vary depending on how many data entries are combined to generate a parity or where the data entries and parity are stored (e.g., physical addresses of the memory device 150). When an error or a defect occurs in the memory device 150, the error or the defect may occur in a memory cell at a specific location, a specific memory block, or a specific memory plane. To recover the error that occurs due to the defect occurring in specific locations, it may be more advantageous to distribute and store data in the memory device 150.

Referring to FIG. 9 showing the first example (1-string XOR), the controller 130 can generate a party entry based on plural data entries programmed in non-volatile memory cells coupled to two word lines in open memory blocks of plural memory dies Die_0 to Die_n−1. Each memory die Die_0 to Die_n−1 can have four memory planes Plane_0 to Plane_3. Each word line WL_0, WL_1 is coupled to 8 strings String_0 to String_7. If the number of memory dies is 8 (n=8), a single parity entry is generated based on 511 (=2×8×4×8−1) data entries. The chipkill unit can include the 511 data entries and the 1 parity entry. The chipkill unit can be programmed in non-volatile memory cells coupled to two adjacent word lines in 32 open memory blocks in each of the four memory planes Plane_0 to Plane_3 in each of the eight memory dies Die_0 to Die_7(=8−1).

In the first example (1-string XOR), the controller 130 can check whether 511 data entries are ready to be programmed in a write buffer or a write cache. When 511 data entries are included in the write buffer or the write cache, the controller 130 can generate a parity entry based on the 511 data entries, and transfer the chipkill unit (total 512 entries) to the memory device 150 (e.g., 8 memory dies). Herein, sizes of each data entry and parity entry can be determined based on the number of bits of data programmed in each non-volatile memory cell.

The first parity parity0 in FIG. 9 can be generated by combining data entries stored in 16 super pages page0, page1, ..., page15. In an embodiment described in FIG. 9, when each parity group is sequentially stored, there may be an advantage in that the number of open memory blocks in the memory device 150 could be reduced.

However, provided that a defect occurs in the memory device 150, errors (e.g., UECCs) may occur in data entries stored in multiple locations rather than in a single data location. For example, one error may occur at a location connected to a first word line WL0, and another error may occur at a location connected to a second word line WL1. If errors occur in plural data entries in a single parity group to which the first parity parity0 belongs, it may be difficult to recover the errors in the data entries based on the first parity parity0.

Referring to FIG. 10 showing the second example (16-string XOR), the controller 130 can generate one party entry based on 511 data entries, like the first example (1-string XOR). However, timings for generating a parity entry and locations where the 511 data entries and the 1 parity entry are stored are different from those of the first example. Each of open memory blocks includes non-volatile memory cells coupled to 31 word lines WL_0 to WL_31. The controller 130 can generate 16 parity entries Parity_0 to Parity_15 based on 8,176 (16×511) data entries.

In the second example (16-string XOR), the controller 130 can check whether 8,176 data entries are ready to be programmed in a write buffer or a write cache. When 8,176 data entries are included in the write buffer or the write cache, the controller 130 can generate 16 parity entries based on the 8,176 data entries (each parity entry generated based on each 511 data entries), and transfer the chipkill unit (total 8,192 entries) to the memory device 150 (e.g., 8 memory dies). A size of programmed data and parity entries during a one-time program operation can be different based on performance of the memory system 110.

Referring to FIG. 10, the 16 parity groups can be stored in the memory device 150. The locations of data entries and parity belonging to each parity group may have the same word line and the same cell string location, except that the memory die and the memory plane are different. Compared to the first example shown in FIG. 9, the number of parities in FIG. 10 can be increased by 16 times. However, in the case of the memory device 150 described in FIG. 10, when an error (e.g., UECC) does not occur in a plurality of data at the same word line and the same cell string location, the corresponding data entry can be recovered. For example, even if a single error occurs at a location connected to the first word line WL0 and another error occurs at a location connected to the second word line WL1, the corresponding data entries could be recovered using parities corresponding to different locations because multiple errors does not occur in the same word line and the same cell string.

Referring to FIG. 11 showing the third example (all-string XOR, e.g., plane-level chipkill), the controller 130 can check generate one party entry based on 511 data entries, like the first and second examples (1-string XOR, 16-string XOR). However, timings for generating a parity entry and locations where the 511 data entries and the 1 parity entry are stored are different from those of the first and second examples. In the third example, one memory plane in a specific memory die could be programmed with only parity entries (e.g., 256 (=8×32) parity entries). The controller 130 can generate 256 parity entries based on 130,816 data entries, each parity entry generated based on 511 data entries. The controller 130 can check whether 130,816 data entries are ready to be programmed in a write buffer or a write cache.

In the third example, the 16 parity groups may be stored in the memory device 150. Each parity group can include data entries stored in locations coupled to 15 word lines within 4 memory planes Plane0, Plane1, Plane2, Plane3 within n number of memory dies Die 0, Die 1, ..., Die n−1. Similar to the memory device 150 described in FIG. 8, the memory device 150 of FIG. 11 can be divided into odd word lines and even word lines to constitute parity groups. Accordingly, even if two errors (e.g., UECCs) occur in the memory device 150, the two errors could be recovered based on the data entries and the parity of the corresponding parity group because the two errors (e.g., UECCs) occur in the odd word line and the even word line among the 30 word lines.

Referring to FIG. 12 showing the fourth example (die-level XOR), the controller 130 can check generate one party entry based on 511 data entries, like the first to third examples (1-string XOR, 16-string XOR, all-string XOR). However, timings for generating a parity entry and locations where the 511 data entries and the 1 parity entry are stored are different from those of the first to third examples. In the third example, a specific memory die could be programmed with only parity entries (e.g., 1,024 (=256×4) parity entries). The controller 130 can generate 1,024 parity entries based on 523,264 data entries, each parity entry generated based on 511 data entries. The controller 130 can check whether 523,264 data entries are ready to be programmed in a write buffer or a write cache.

In the fourth example, the same location within n number of memory dies Die 0, Die 1, ..., Die n−1 can belong to the same parity group. For example, a parity group is differently established for each cell string and each word line of each memory plane Plane0, Plane1, Plane2, Plane3 within each memory die Die0, Die1, ..., Die n−1. Referring to FIG. 12, the first parity group is the first word line of each memory plane Plane0, Plane1, Plane2, Plane3 in each memory die Die0, Die1, ..., Die n−1. Data entries and parity may be included at the positions of the first word line WL0 and the first cell string String0. The memory device 150 described in FIG. 12 is capable of recovering errors based on the data entries and parity belonging to each parity group, even if multiple errors (e.g., UECCs) occur, as long as the multiple errors do not occur in the same word line and the same cell string.

Referring to FIGS. 8 to 12, how to configure or set the parity group for data entries stored in the memory device 150 may vary according to an embodiment. According to locations at which errors occur, an error recovery performance for the memory device 150 may vary. Additionally, the parity group sets could be changed depending on operating characteristics of the memory device 150. As the number of parities stored in the memory device 150 decreases, the number of data entries stored in the same storage space can increases.

The size of programmed data and parity entries during the one-time program operation would be critical to determine performance of the memory system 110. For a faster data input operation, the size of programmed data and parity entries during the one-time program operation increases. Further, if the number of data entries in the write buffer or cache is less than a preset number of data entries for the one-time program operation, the memory system 110 may add some dummy data entries in the data entries for the one-time program operation.

FIGS. 13 to 16 illustrates first to fourth examples of error correction or recovery in a memory device. FIGS. 13 to 16 describe an error in the memory device 150 from which data can be restored based on a parity entry generated through an exclusive OR (XOR) operation to the Chipkill unit. FIGS. 13 to 16 describe four different situations in which UECC occurs but the controller 130 recovers or restores the UECC.

Referring to FIGS. 13 to 16, a parity entry and data entries are distributed in the memory device 150. When a defect occurs in an area corresponding to a plurality of word lines, a defect occurs in an area corresponding to a plurality of strings, or a defect occurs in a memory plane or a memory die, an error stored in the corresponding area can be recovered or restored. For example, a recoverable defect could be determined based on different schemes for generating a parity through the exclusive OR (XOR) operation described in FIGS. 13 to 16.

Figure 13:
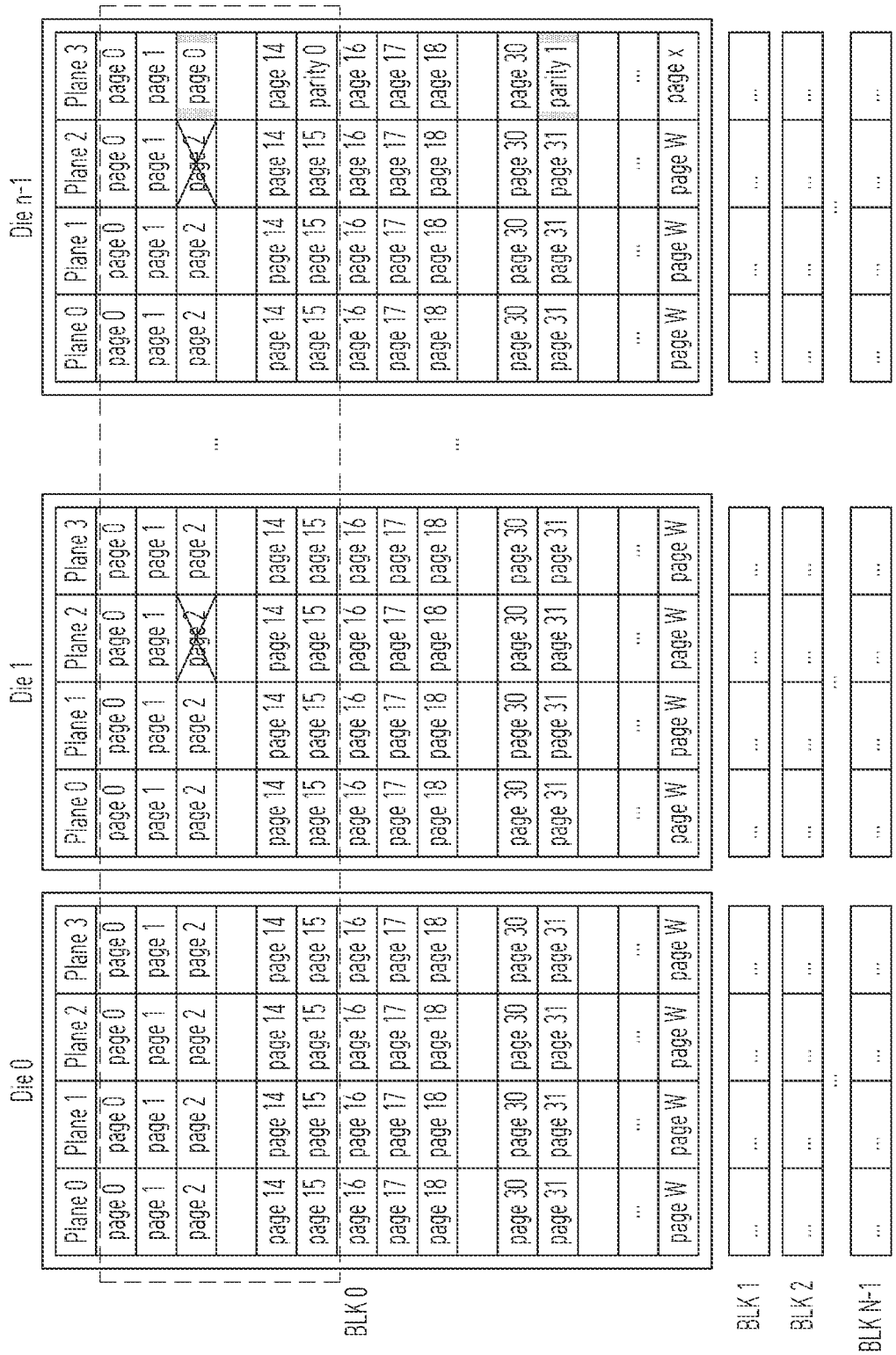
FIG. 13 illustrates a first example of error correction in a memory device.

Referring to FIG. 13, the memory device 150 may store data in a manner similar to the parity group described in FIG. 9. The memory device 150 can be configured to store data entries in locations connected to the four word lines included in a first memory block BLK0 on four memory planes Plane0, Plane1, Plane2, Plane3 within n number of memory dies Die0, Die1, ..., Die n−1. For example, an error (marked as 'X') may occur in a data entry stored in a location connected to the third word line of the third memory plane Plane2 in the second memory die Die1. In this case, the error can be recovered based on other error-free data entries and the first parity Parity0 in the corresponding parity group.

Figure 14:
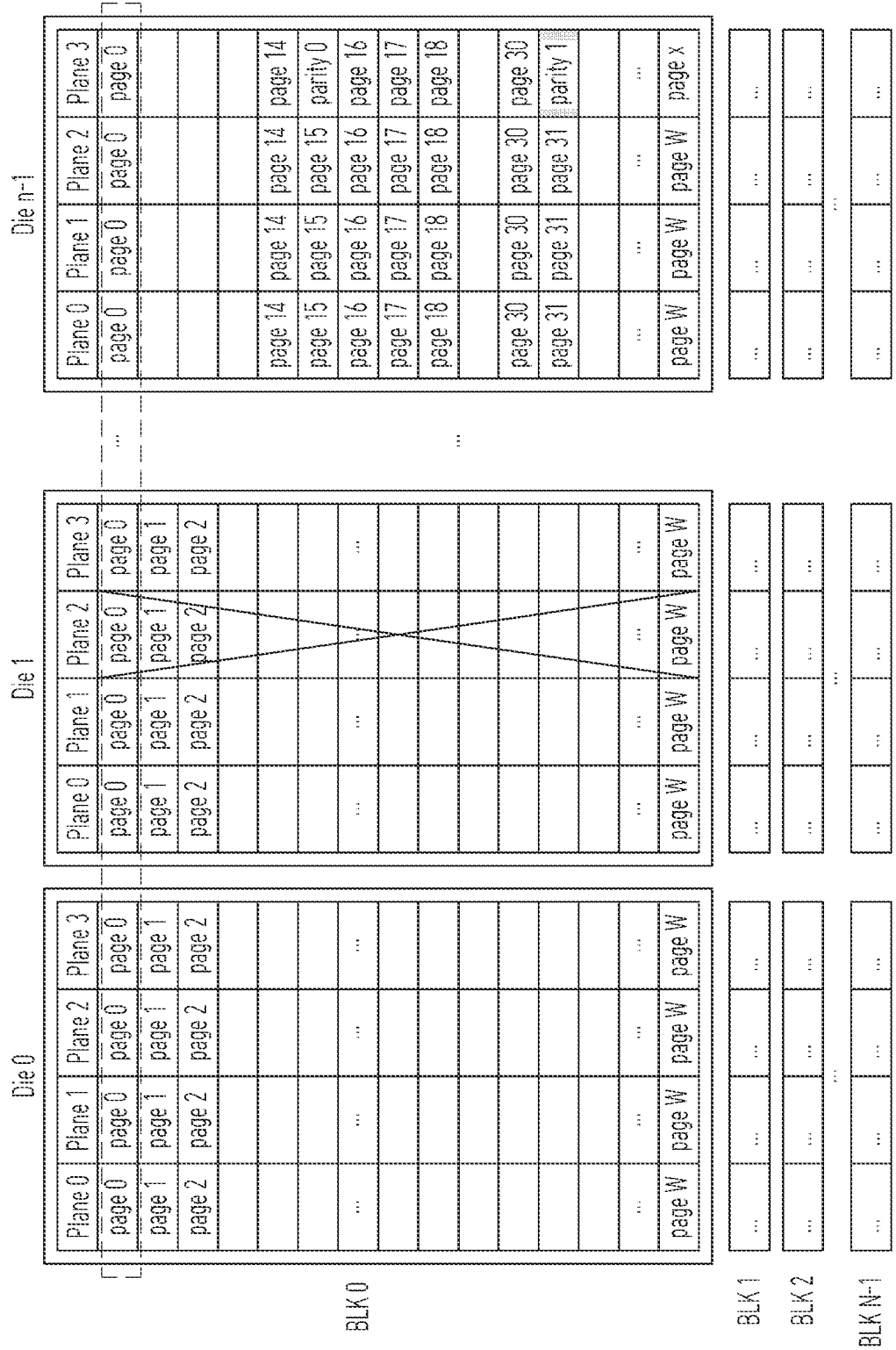
FIG. 14 illustrates a second example of error correction in a memory device.

Referring to FIG. 14, the memory device 150 may store data in a manner similar to the parity group described in FIG. 10. Parity groups may be set differently for each word line in the first memory block BLK0 on four memory planes Plane0, Plane1, Plane2, Plane3 within n number of memory dies Die0, Die1, ..., Die n−1. In the case of the embodiment described in FIG. 14, even if an error (marked as 'X') occurs in the third memory plane Plane2 in the second memory die Die1, the error could be recovered or restored based on each parity group including error-free data entries and parity stored in other memory planes. The embodiment shown in FIG. 14 may enable error recovery at a memory plane level (e.g., determining defect and usage on a memory plane basis).

Figure 15:
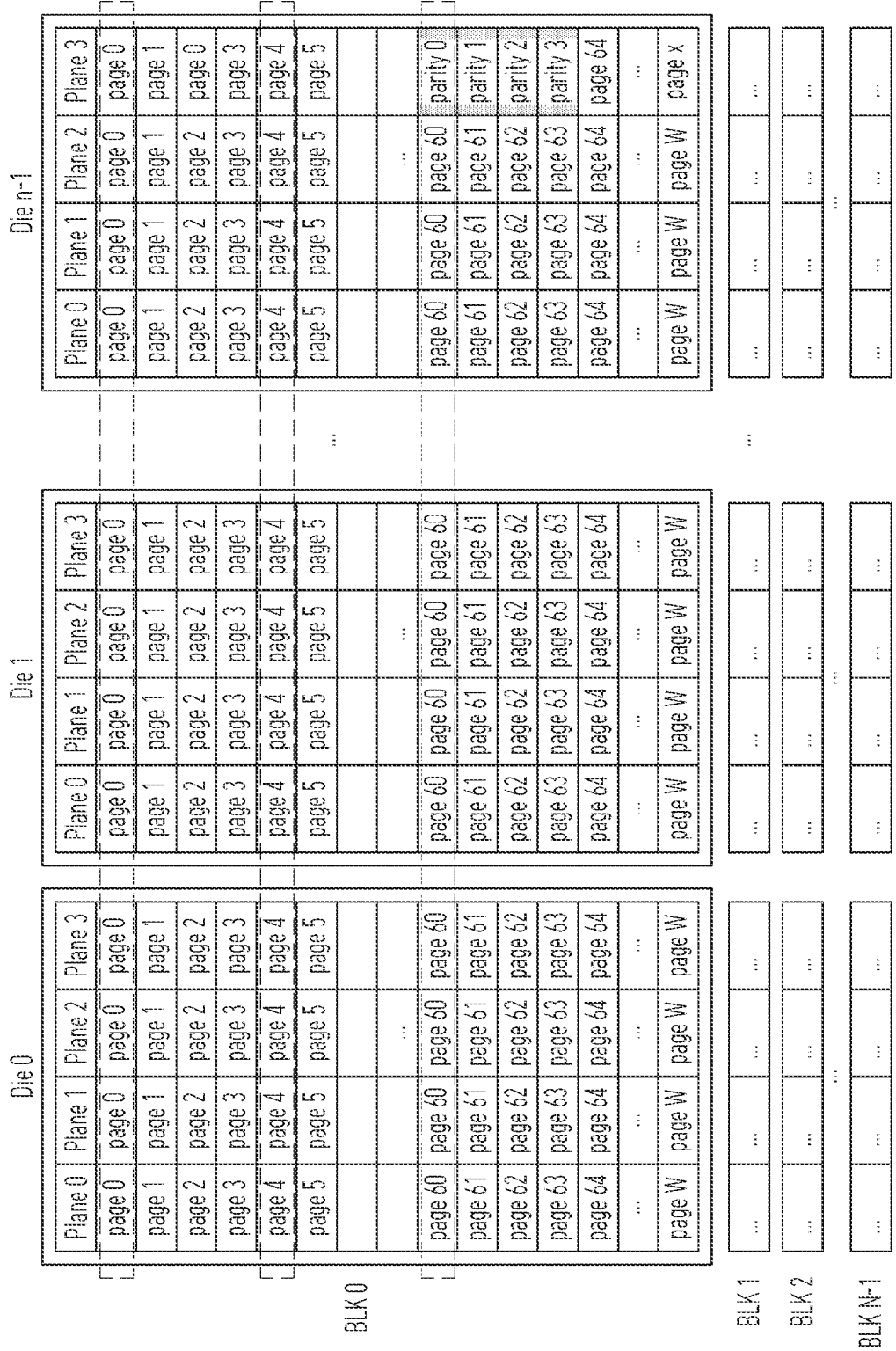
FIG. 15 illustrates a third example of error correction in a memory device.

Referring to FIG. 15, the memory device 150 may store 16 parity groups within the memory device 150. The memory device 150 can include parity groups set on every four word lines within four memory planes Plane0, Plane1, Plane2, Plane3 within n number of memory dies Die0, Die1, ..., Die n−1. For example, data entries and a parity stored in locations coupled to the 1st word line, 5th word line, 9th word line, etc. can belong to a 1st parity group. Data entries and a parity stored in locations coupled to the 2nd word line, 6th word line, 10th word line, etc. can belong to a 2nd parity group. In this case, four parity groups could be set on 64 word lines of the first memory block BLK0 in four memory planes Plane0, Plane1, Plane2, Plane3 in the n number of memory dies Die0, Die1, ..., Die n−1. Referring to FIG. 15, even if a defect occurs at locations coupled to the 61st to 64th word lines of the third memory plane Plane2 in the second memory die Die1, each parity group can recover the error.

Figure 16:
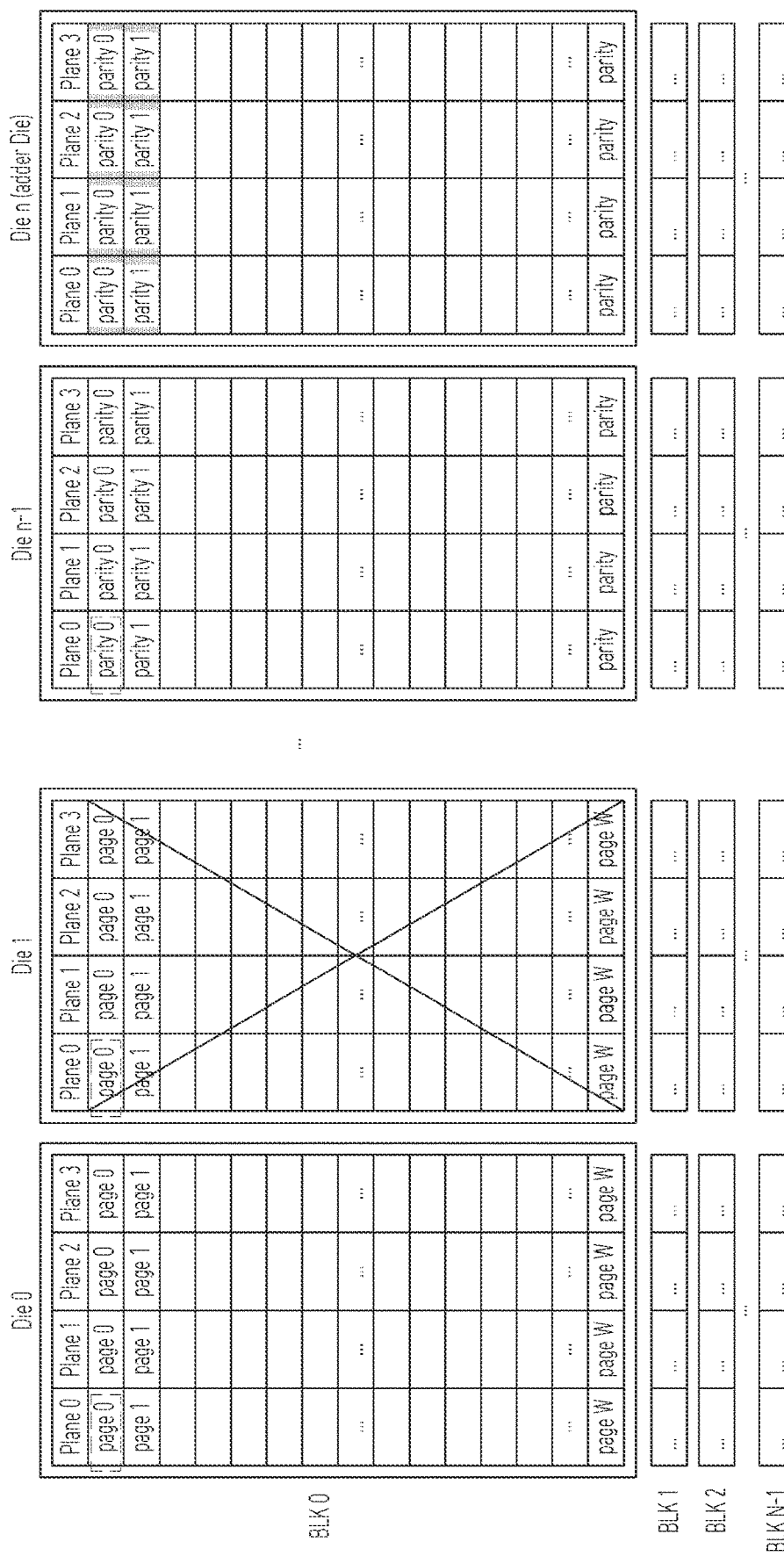
FIG. 16 illustrates a fourth example of error correction in a memory device.

Referring to FIG. 16, the memory device 150 may set a parity group in a manner similar to the embodiment described in FIG. 12. Each parity group can include data entries and a parity located at the same location (e.g., can be set to the data and parity stored in the memory cell connected to the same word line) in fourth memory planes Plane0, Plane1, Plane2, Plane3 of the n+1 number of memory dies Die0, Die1, ..., Die n−1, Die n. For example, data entries Page0 stored at locations coupled to the first word line in the first memory plane Plane0 in each of the n memory dies Die 0, Die 1, ..., Die n−1 and the first parity Parity0 stored at a location coupled to the first word line in the first memory plane Plane0 of the additional memory die Die n may belong to a first parity group. In this case, the memory device 150 may include the separate and additional memory die for storing parities only, not data entries. In this case, even if the entire second memory die Die1 cannot be used due to a defect or all data entries are determined to be errors, the data entries and parities stored in other memory dies are used to recover the data entries stored in the second memory die Die1. Referring to FIG. 16, error recovery may be possible at a memory die level (e.g., determining defect and use on a memory die basis).

Referring to FIGS. 8 to 16, based on various manners for distributed storage of parities and data entries in the memory device 150, the data entries stored in an area can be recovered even if a defect may occur in the area corresponding to a plurality of word lines, a plurality of cell strings, a memory plane, or a memory die.

The memory system 110 or memory device 150 may have different required error recovery performance depending on a purpose of usage, performance, etc. For example, the memory device 150 may be required to provide error recovery performance for a single cell string, a single memory plane, or a single memory die. Additionally, error recovery performance for defects or faults such as 8 consecutive super pages or 16 consecutive super pages may be required. A parity group including data entries and a parity stored in the memory device 150 may be configured based on required error recovery performance.

FIG. 17 illustrates calculation and a buffer size for generating a parity entry stored in a memory device. As described in FIGS. 8 to 16, a logical operation for generating a parity entry may be exclusive OR (XOR). The controllers 130, 400 shown in FIGS. 1 to 3 may perform exclusive OR (XOR) operations to generate the parity entry. To perform the exclusive OR (XOR) operation, the controllers 130, 400 may establish a parity operation buffer, which is a space used for parity generation in the memory 144.

Referring to FIG. 17, the memory device may include n number of open memory blocks Block-A, Block-B, Block-xxx, Block-D. Further, the memory device may include a parity memory block Block-Y to store only parities corresponding to data entries stored in the n number of open memory blocks Block-A, Block-B, Block-xxx, Block-D. To store data entries in the memory device, a one-shot program operation may be performed in which a lot of data entries are distributed, transferred, and stored across a plurality of memory planes (e.g., memory plane interleaving method). For example, the number of parities stored in eight strings String0, String1, . . . , String6, String7 coupled to the first word line WL0 of the parity memory block Block-Y in the four memory planes Plane0, Plane1, Planet, Plane3 can be 32. That is, data entries and parity entries belonging to 32 parity groups could be stored in the memory device through the one-shot program operation. Additionally, each of non-volatile memory cells included in the memory device can store multi-bit data. For example, each memory cell may be a TLC that can store 3 bits of data.

According to an embodiment, a parity generating operation can include virtualizing plural open memory blocks (e.g., integrating a parity entry generation for multi-thread processes, each process performed for programming at least one data entry in each open memory block), configuring a data entry group for generating the parity entry, and programming the parity entry in a different memory block which is separate from locations for storing the data group.

The controllers 130, 400 can determine where each data entry will be stored so that the data entries belonging to the 32 parity groups can be distributed over and stored in plural memory blocks. For example, the flash translation layer (FTL) 240 can allow the controllers 130, 400 to perform a mapping operation between at least one of logical addresses used by external devices, at least one of virtual addresses used to increase the efficiency of internal operations, and/or at least one of physical addresses that indicate to physical locations in the memory device. Additionally, the controllers 130, 400 may perform an exclusive OR operation on data entries belonging to each parity group to generate each parity entry.

For example, a parity calculation can be performed in a unit of memory planes Plane0, Plane1, Planet, Plane3 among 32 parity groups. In this case, the number of data entries used for parity operation may be a value obtained by multiplying the number of cell strings, the number of bits of data stored in each memory cell, and the number of open memory blocks. The number of open memory blocks may include at least one data block where data entries are stored and at least one parity block where parity entries are stored. Further, when the memory system 110 controls or manages a memory device with a plurality of zoned namespaces, the number of data entries for the parity calculation may increase in proportion to the number of zones.

According to an embodiment, the number of bits of multi-bit data stored in each memory cell may increase, and the number of cell strings may also increase. Additionally, the number of open memory blocks and the number of zones may also increase. Accordingly, the size of the parity operation buffer that the controllers 130, 400 secure to generate a parity entry may increase in linear proportion to the above-described parameters. Herein, the parity calculation performed by the controllers 130, 400 is a kind of internal operations in the memory system 110 which tries to input or output data at a high speed. It would be important for the memory system 110 to reduce overheads of the internal operation to improve or maintain data input/output performance (e.g., data throughput). For this reason, the parity operation buffer can use a SRAM rather than a DRAM included in the memory system 110 including non-volatile memory devices. Allocating more than 2M to 5M bits of SRAM storage capacity as a parity operation buffer would be not efficient in a view of resource usage or allocation in the controller 130.

The controllers 130, 400 may try to use a SRAM that supports fast operation speed for plural operations in order to reduce overheads and latencies occurring in the plural operations. As multi processors performing the plural operations use the SRAM competitively, it may become difficult to manage resource allocation. Additionally, increasing a storage space of the SRAM may place a burden on the controllers 130, 400 implemented as a system-on-chip (SoC) in views of integration degree and manufacturing cost. As the number of data entries stored in the memory device increases or the number of data entries belonging to each parity group increases, the controllers 130, 400 should allocate more resources to a device or a module for generating a parity. However, adding more resources in the controllers 130, 400 may be limited for a design purpose. Therefore, the controllers 130, 400 could be configured to reduce resources allocated for the parity generating operation.

Figure 18:
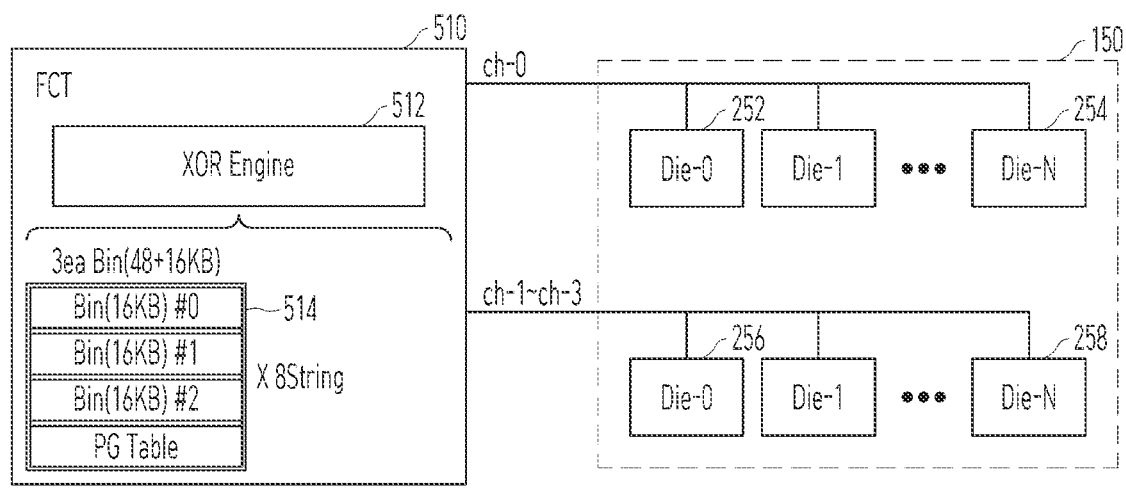
FIG. 18 illustrates parity generating circuitry included in a memory system according to another embodiment of the present disclosure.

FIG. 18 illustrates parity generating circuitry included in a memory system according to another embodiment of the present disclosure. FIG. 18 describes an apparatus configured to generate a parity entry included in the memory system 110 according to an embodiment of the disclosure.

Referring to FIGS. 1 to 3, the controller 130, 400 can be connected to the memory device 150 through a plurality of channels Ch-0, Ch-1, . . . , Ch-3. A plurality of memory dies Die-0, Die-1, . . . , Die-N may be coupled to each of the channels Ch-0, Ch-1 to Ch-3. The number of data entries distributed and stored in the plurality of memory dies Die-0, Die-1, . . . , Die-N may vary based on configuration and performance of the memory system 110 and configuration and performance of the memory device 150.

The parity generating circuitry (FCT) 510 may generate a parity entry by performing an XOR operation on data entries transmitted through each channel Ch-0 to Ch-3. The parity generating circuitry 510 can include a parity generating engine 512 configured to perform an exclusive OR operation. The parity generating circuitry 510 can include a parity operation buffer 514 or can be operatively engaged with the parity operation buffer 514.

The parity generating circuitry (FCT) 510 in the controller 130 may have a buffer corresponding to the number of bits of multi-bit data stored in each non-volatile memory cell. For example, when the non-volatile memory cell stores 3-bit data and 8 cell strings are included in the memory block, the parity operation buffer 514 included in the parity generating circuitry 510 may store a buffer Bin(16 KB) #0 to Bin(16 KB) #2 configured to store data entries sequentially transferred to each memory block and a buffer (PG Table) configured to store a parity entry. The parity generating circuitry 510 does not have to include a buffer having a size corresponding to all of data entries distributed and programmed in a plurality of open memory blocks in a process of generating the parity entry (e.g., the first to fourth examples shown in FIGS. 9 to 12). For example, it might be sufficient for the parity operation buffer 514 to include a buffer corresponding to a size of data entries concurrently transmitted in each open memory block and a buffer capable of storing the corresponding parity.

According to an embodiment, the parity operation buffer 514 may have a size of data entries that are programmed intertemporally within the memory device 150. Further, according to an embodiment, the parity operation buffer 514 can have a size corresponding to the amount of data entries transferred to be programmed in the memory device 150 (e.g., a size of data stored in a page buffer included in the memory device 150).

When the controller 130, 400 performs the one-shot program operation for programming a preset amount of data entries in the memory device 150 including the plurality of memory dies Die-0, Die-1, . . . , Die-N, the controller 130 may distribute and transmit the data entries to be programmed to the plurality of memory dies Die-0, Die-1, . . . , Die-N in the memory device 150. For example, 16 memory dies in memory device 150 can be included. If the controller 130, 400 intends to distribute and store 16M byte data in the memory device 150, the controller 130, 400 may divide the 16M byte data into 16 parts having a same size (i.e., 1M byte). The controller 130, 400 may transmit 1M byte data to each memory die, and each memory die may program 1M byte data into non-volatile memory cells.

For example, when 16M byte data is distributed and stored in 16 open memory blocks in a memory system, a plurality of processes may be performed in parallel through a plurality of multi cores or multi processors in the controller 130, 400. In order to generate at least one parity entry for the data entries programmed in the memory device 150, the at least one parity entry can be individually generated by each process corresponding to each open memory block, and then, when the at least one parity entry generated in each process is integrated through an exclusive OR operation, each process or each core (or thread) for generating parity could capture a memory space for storing data entries and another memory space for generating the at least one parity entry. A write buffer or cache established by the controller 130 may be allocated for the plurality of processes to temporarily store programmed data entries and parity entries generated in response to the data entries. Accordingly, the larger the size of data entries that can be stored through one-shot program operation, the larger the size of the buffer allocated for the plurality of processes.

However, the parity generating circuitry 510 according to an embodiment of the present disclosure does not perform an operation for calculating a parity entry for data entries distributed and stored in the memory device 150 in each process or each core/thread corresponding to each open memory block. After each process corresponding to each open memory block is performed, the parity entry can be calculated through the parity generating circuitry 510 before each data entry is transferred to, and distributed over, a plurality of open memory blocks in the memory device 150. For example, when 16M byte data is stored in 16 open memory blocks, the controller 130 may divide 16M byte data into 16 data groups. After the parity generating circuitry 510 generates the first parity for the first data group stored in the first open memory block among the 16 open memory blocks, the controller 130 can transfer the first data group into a memory die including the first open memory block.

Thereafter, the parity generating circuitry 510 can generate a second parity entry for a second data group stored in a second open memory block among 16 open memory blocks and merge the first parity entry and the second parity entry. Then, the controller 130 may transfer the second data group to a memory die including the second open memory block. According to a time sequence in which a plurality of data groups programmed in a plurality of open memory blocks are transferred from the controller 130 to the memory device 150, the parity generating circuitry 510 can perform an XOR operation for generating at least one parity entry. Accordingly, the parity generating circuitry 510 does not have to occupy a buffer space corresponding to a total size of data entries programmed in the plurality of open memory blocks for generating the at least one parity entry. A buffer space corresponding to the size of data entries transferred to be programmed in one open memory block might be sufficient.

Referring to FIG. 18, a size of data entries transferred to be programmed in one open memory block may be determined according to the number of bits of multi-bit data stored in the non-volatile memory cell and the number of cell strings coupled to the word line. Because the parity generating circuitry 510 sequentially generates at least one parity with respect to data entries transferred to each open memory block, a size of a buffer or cache allocated to generate a parity entry (e.g., parity operation buffer 514) does not increase according to the number of open memory blocks, the number of memory planes, or the number of memory dies. That is, even if the size of data entries programmed by the controller 130 in the memory device 150 through the one-shot program operation increases as the number of open memory blocks increases, the size of the buffer required to generate the parity entry might not increase.

Further, even if the size of data entries programmed by the controller 130, 400 in the memory device 150 through the one-shot program operation is changed, the size of the buffer or cache used by the parity generating circuitry 510 might not be changed. For example, provided that the size of data entries transferred to each open memory block is 1M byte, 10M byte data entries can be distributed over and stored in 10 open memory blocks, and 15M byte data entries can be distributed over and stored in 15 open memory blocks. In these cases, the size of the buffer or cache allocated to the parity generating circuitry 510 may be determined to correspond to the size (e.g., 1M byte) of data entries transferred to each open memory block, not the total size of data entries such as 10M byte or 15M byte.

According to an embodiment of the present disclosure, the size of data entries used for generating a parity entry can be dynamically adjusted or changed, and a location where the parity entry stored in a plurality of data is stored can also be changed. Further, the memory system 110 may reduce a size of the buffer or cache for generating the parity entry during a program operation. Because the memory system 110 can change the number of data entries used to generate a parity entry, unlike the conventional memory system that adds dummy data entries for generating a parity entry when the number of data entries in the buffer or cache is less than a preset number of data entries for the program operation, the controller 130, 400 does not have to store the dummy data entries in the memory device 150. Accordingly, it is possible to efficiently use internal resources of the memory system 110.

In the memory device 150 described in FIGS. 8 to 17, after a parity group including programmed data entries and parity entry is set, and locations where the data entries and the parity entry included in the parity group are stored may be determined. Additionally, whether the data entry belongs to a specific parity group can be determined depending on where the data entry is stored in the memory device 150. Accordingly, the operation for calculating the parity entry may continue until all data entries programmed at those locations is determined, or the parity entry may be calculated after all data entries programmed at those locations are determined. Because of this, a device that calculates the parity entry requires a parity calculation buffer, which has a storage space that can temporarily store all of the data entries and the parity entry.

However, locations of data entries might not be considered when the controller 130, 400 including the parity generating circuitry 510 described in FIG. 18 determines a parity group including the corresponding data entries stored in the memory device 150. The parity generating circuitry 510 can perform an exclusive OR operation based on how many data entries are involved to generate a parity entry, regardless of where the data entries are stored. Even before locations of data entries to be stored in the memory device 150 are determined, the parity generating circuitry 510 can sequentially performs an exclusive OR operation on a preset number of the data entries to be programmed in the memory device 150 by the controller 130, 400. Additionally, even after the locations of data entries stored in the memory device 150 are determined, the parity generating circuitry 510 may only consider the number of data entries belonging to the parity group. The parity generating circuitry 510 may not check information about the locations. Accordingly, the parity generating circuitry 510 does not need a parity calculation buffer having a size corresponding to the preset number of data entries and parities. The parity generating circuitry 510 can sequentially perform exclusive OR operations on the data entries before the data entries are sequentially transmitted to the memory device through each channel Ch-0 to Ch-3. It may be sufficient for the parity operation buffer 514 to temporarily store an input data entry and a result of operations which have been calculated. Thus, the size of the parity operation buffer 514 could be reduced.

Figure 19:
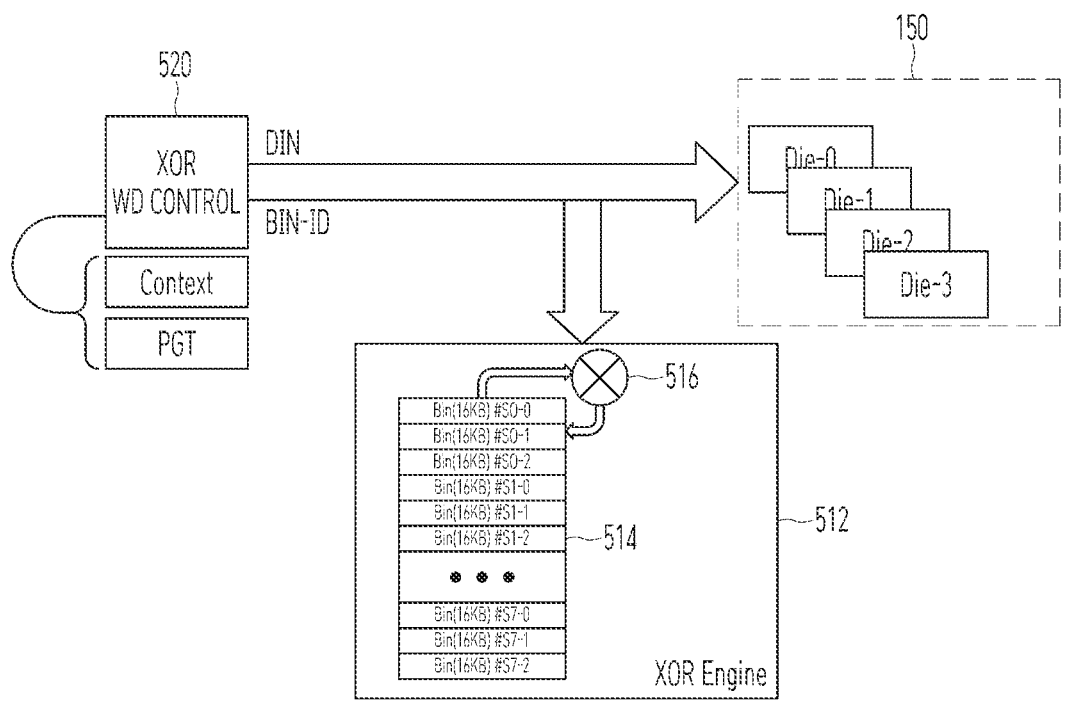
FIG. 19 illustrates a write operation in a memory system according to another embodiment of the present disclosure.

FIG. 19 illustrates a write operation in a memory system according to another embodiment of the present disclosure. FIG. 19 describes in detail an operation of the parity generating apparatus FCT and data entries temporarily stored in a buffer allocated for the parity generating circuitry 510. The parity generating circuitry 510 may include an engine (XOR engine) that is configured to perform an exclusive OR operation and a buffer (e.g., Bin (16 KB) #0 to #2, PG Table) that is configured to store a data entry and a parity entry. According to an embodiment, the parity generating circuitry 510 may be disposed between the flash translation layer (FTL) 240 and a plurality of memory dies Die-0 to Die-3 included in the memory device 150.

Referring to FIG. 19, data entries stored in the memory device 150 within the memory system 110 can be managed and a parity entry can be generated based on the data entries. The controller 130, 400 in the memory system 110 may include the parity generating circuitry 510 and write data control circuitry 520. The write data control circuitry 520 may generate a buffer address Bin-ID for each data entry DIN to be programmed in the memory device 150. Here, the buffer address Bin-ID may be determined in response to location information (e.g., a physical address) where the data entry DIN is stored in the memory device 150.

FIG. 19 explains in detail the operation of the parity generating circuitry 510 and the data entries temporarily stored in the parity operation buffer 514 used by the parity generation device 510. The parity generating engine 512 in the parity generation device 510 may include a logical operation circuit 516 that performs an exclusive OR (XOR) operation on data entries and a parity operation buffer 514 that stores a calculated parity entry or a result of the exclusive OR operation performed on the data entries. In a view of transmission or movement of the data entry DIN, the parity generating circuitry 510 can be disposed between the flash translation layer (FTL) 240 and the plurality of memory dies Die-0 to Die-3 included in the memory device 150. The write data control circuitry 520 included in, or linked to, the flash translation layer (FTL) 240 can determine a parity group including the data entry DIN. The buffer address Bin-ID can be determined according to the parity group to which the corresponding data entry DIN belongs. For example, the buffer address Bin-ID transmitted with a specific data entry DIN may indicate a space in the parity operation buffer 514 used to generate a specific parity entry (i.e., corresponds to information indicating which parity the data entry DIN is associated with). The write data control circuitry 520 can control or process a data structure Context including the data entry DIN and the buffer address Bin-ID to correspond to a preset format. Additionally, the write data control circuitry 520 can manage and control a parity group table PGT, which includes information regarding the parity groups.

Figure 20:
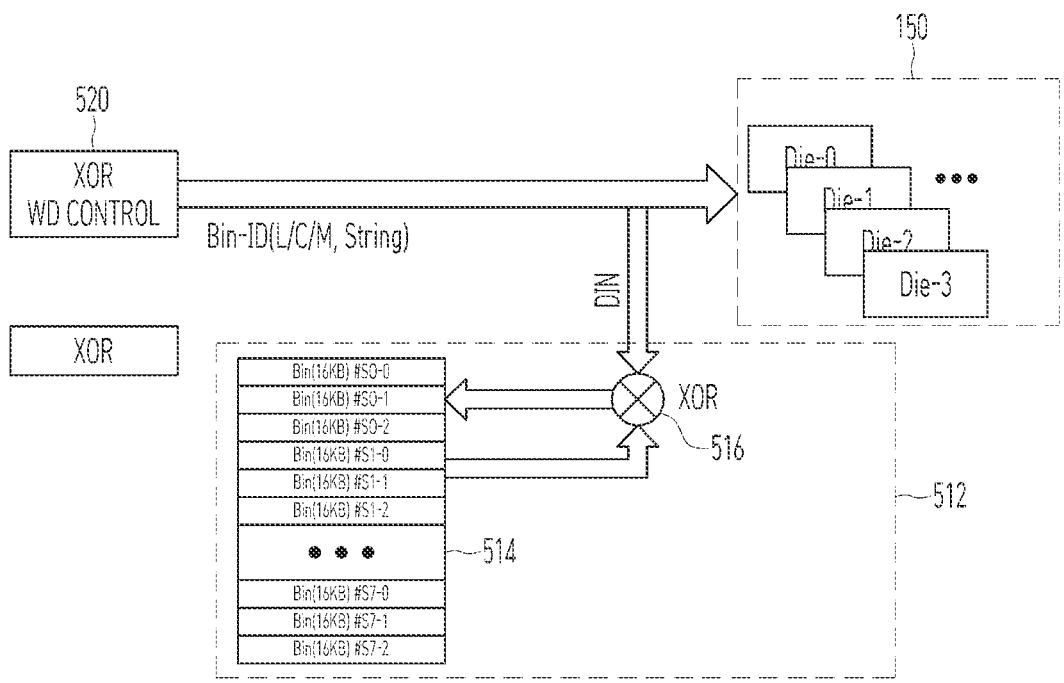
FIG. 20 illustrates how to generate a parity entry in a memory system according to another embodiment of the present disclosure.

FIG. 20 illustrates how to generate a parity entry in a memory system according to another embodiment of the present disclosure.

Referring to FIG. 20, a case where parity entries are stored in one virtual block (Virtual BLK) within the memory device 150 is shown, like the embodiment shown in FIG. 17. The write data control circuitry 520 within the controller 130, 400 may transmit the number of data entries in a preset group to the memory device 150 through the one-shot program operation. The write data control circuitry 520 may associate plural data entries delivered through the one-shot program operation with at least one parity entry to establish at least one parity group. The write data control circuitry 520 can transmit each data entry DIN along with the buffer address Bin-ID corresponding to the physical address indicating location where the data entry is stored (e.g., location stored in a memory cell such as cell string information, one of Least Significant Bit(L), Central Significant Bit(C), and Most significant Bit(M), etc.).

The parity operation buffer 514 can have a size that can store 24 data entries corresponding to the number of bits (e.g., 3) of the multi-bit data (L/C/M) stored in each memory cell and the number of cell strings String0 to String7 (i.e., 8). The parity generating engine 512 may determine which of the previous results or values stored in the parity operation buffer 514 to perform an exclusive OR operation on the data entry DIN based on an indicator (e.g., the buffer address Bin-ID of the data entry DIN). Then, a current result of the exclusive OR operation on the previous result or value stored in the location corresponding to the buffer address Bin-ID and the data entry DIN may be stored in the location where the previous result or value was stored. That is, when the data entry DIN is transmitted to the parity generating engine 512, at least one value in the parity operation buffer 514 may be updated after the exclusive OR operation.

Data entries programmed in the memory device 150 in parallel through the one-shot program operation can be determined based on program operation characteristics of the memory device 150 (e.g., program disturb, etc.) and an internal structure in the memory device 150 (e.g., number of cell strings, etc.). The parity generating engine 512 described in FIG. 20 can generate and update a plurality of parity entries generated based on the data entries sequentially transmitted through the one-shot program operation.

Thus, the size of the parity operation buffer 514 may be determined depending on the number of parity entries corresponding to the data entries programmed through the one-shot program operation. For example, the number of parity entries may be determined depending on the number of bits of multi-bit data stored in each memory cell and the number of cell strings coupled to a single word line.

As described in FIGS. 8 to 16, error recovery performance required for the memory device 150 may be different, and there may be a difference in methods for establishing a parity group. Depending on how to establish the parity group, the number of data entries included in each parity group may vary. However, the parity generating engine 512 shown in FIG. 20 does not need to have a buffer whose size corresponds to the number of data entries. The parity operation buffer 514 may be determined based on the internal structure of the memory device 150 rather than the number of data entries constituting each parity group.

Figure 21:
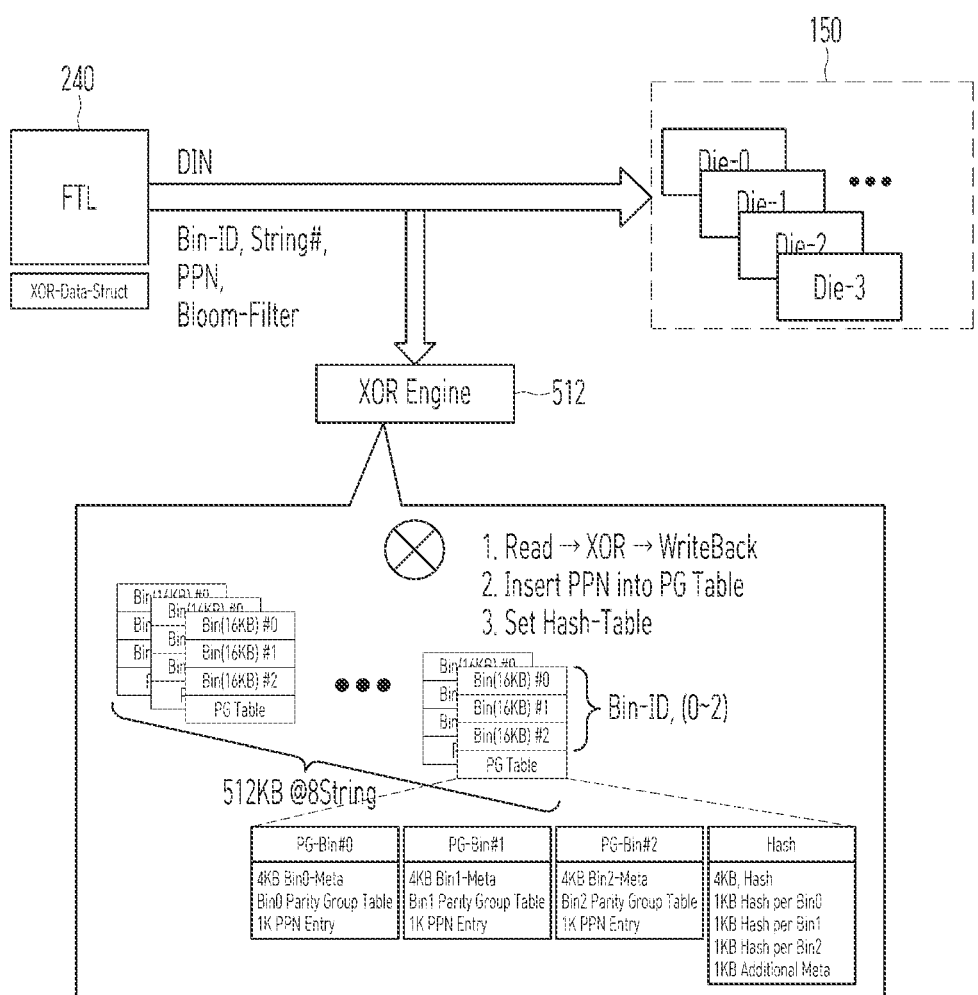
FIG. 21 illustrates how to manage or control a parity group in a memory system according to another embodiment of the present disclosure.

FIG. 21 illustrates how to manage or control a parity group in a memory system according to another embodiment of the present disclosure.

Referring to FIG. 21, the data entry DIN programmed into the memory device 150 in the memory system 110 can include information (PPN, String #) regarding a location stored in the memory device 150, a buffer address Bin-ID, Bloom filter information, etc., which are determined by the flash translation layer (FTL) 240.

Herein, Bloom filter relates to a probabilistic data structure used to check whether an element belongs to a set. The Bloom filter information can be used as information indicating whether a data entry belongs to a parity group. According to an embodiment, a Bloom Filter may be implemented using a bit array structure of m bit size and K different hash functions. Each hash function can output m values with equal probability. The two main operations of the Bloom Filter are an addition operation and a verification operation. The addition operation is to add a corresponding key value to the Bloom filter, while the verification operation is to check whether the corresponding key value exists. Based on the Bloom filter, if a key value does not exist, it can be checked that a specific data entry does not belong to a specific parity group. Conversely, if a key value exists based on the Bloom filter, it could be checked that a specific data entry may belong to a specific parity group. For example, when using a Bloom filter that uses a chaining hash, the memory system 110 can check whether each of data entries belongs to a specific parity group even though not accessing or reading the data entries stored in the memory device 150 several to dozens of times each time.

The parity generating engine 512 in the parity generating circuitry 510 can perform an exclusive OR operation, record the location of data related to parity (e.g., a physical address PPN), and set a hash table (Hash-Table). To this end, the parity generating engine 512 can read a value (e.g., a previous result) stored in the parity operation buffer 514 at a location corresponding to the buffer address Bin-ID of the transmitted data entry DIN, perform an exclusive OR operation on the value and the data entry DIN, and store a result of the exclusive OR operation in the parity operation buffer 514 (e.g., overwrite the result at the location in which the previous result is stored). That is, the parity generating engine 512 may store back (i.e., update) the result of the exclusive OR (XOR) operation in the location of the parity calculation buffer 514. In addition, the parity generating circuitry 510 can add a physical address (PPN), which is information regarding the location where the data entry DIN is stored in the memory device 150, to the parity group table (PG Table). Afterwards, the parity generating engine 512 may set and update a hash table for the Bloom filter.

FIG. 21 explains an example of the parity operation buffer 514 having a size of 512 KB corresponding to a structure with 8 cell strings including memory cells (TLC) storing 3 bits of multi-bit data (i.e., the 8 cell strings coupled to one word line in one memory plane or one memory block). For example, the 512 KB space of the parity operation buffer 514 may be divided into 8 buffer groups corresponding to the 8 cell strings. Eight buffer groups (each with a size of 64 KB) can be divided into four unit buffers. Among the four unit buffers, three unit buffers can have buffer addresses Bin-ID of 0, 1, 2, which can correspond to 3 bits (L/C/M) of the multi-bit data stored in each memory cell. Another one of the four unit buffers can store information regarding the page group table. Each unit buffer can have a size of 16 KB. For example, a first unit buffer PG-Bin #0 may store meta information, calculated parity, and a physical address where the parity entry will be stored. Additionally, a fourth unit buffer (PG Table, Hash) can store hash values for the parity entry stored in the first unit buffer PG-Bin #0 to the third unit buffer PG-Bin #2.

Here, the parity generating engine 512 in the parity generating circuitry 510 can read a value or data (e.g., parity has been calculated) stored in the unit buffer (Bin (16 KB) #0~#2, PG Table). The parity generating engine 512 can perform an exclusive OR (XOR) operation on the data entry DIN, transferred from the flash translation layer (FTL) 240 to a plurality of memory dies Die-0 to Die-3 included in the memory device 150, and the value or data read from the unit buffer (Bin (16 KB) #0 to #2, PG Table). Then, the parity generating engine 512 can store the result of the exclusive OR operation in the unit buffer (Bin (16 KB) #0~#2, PG Table) (WriteBack). Referring to FIGS. 18 to 21, a parity generating method presented in an embodiment of the present disclosure may be referred to as a SOFT(Small Overhead Fail Traverse)-XOR scheme. The parity generating method does not need to use a buffer having a size corresponding to all of data entries which belonging to each parity group and are distributed and stored in a plurality of open memory blocks. Information stored in each unit buffer described in FIG. 21 and the size of the information may vary depending on configuration and performance of the memory system 110 and the memory device 150. Additionally, the size of the parity operation buffer 514 may also vary depending on a data programming method of the memory system 110 or the configuration of the memory device 150. However, the size of the parity operation buffer 514 may not be increased in proportion with the number of data entries belonging to the parity group or the number of open memory blocks.

Figure 22:
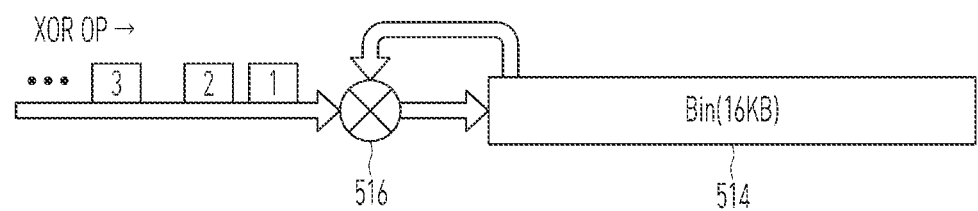
FIG. 22 illustrates a parity generation engine in a memory system according to another embodiment of the present disclosure.

FIG. 22 illustrates a parity generation engine in a memory system according to another embodiment of the present disclosure.

Referring to FIG. 22, the parity generating engine 512 can include the logical operation circuit 516 that performs an exclusive OR (XOR) operation and the parity operation buffer 514 that stores data entries 1, 2, 3 and a parity.

According to an embodiment, the data entries 1, 2, 3 which are sequentially transmitted to the parity generating engine 512 may be sequentially transmitted to and programmed in the memory device 150. At this time, locations within the memory device 150 where the data entries 1, 2, 3 are stored may not be considered to determine whether the data entries 1, 2, 3 belong to a specific parity group. The parity generating engine 512 may sequentially perform exclusive OR (XOR) operations on the input data entries 1, 2, 3 and then output the results of the exclusive OR (XOR) operations.

The parity generating engine 512 may have the parity operation buffer 514 corresponding to a structure within the memory device 150. However, according to an embodiment, the parity generating engine 512 may generate a parity entry based on an order in which the data entries 1, 2, 3 are transmitted to the memory device 150 for data program operations. For example, one parity group may include 9 data entries and 1 parity entry. In this case, the parity generating engine 512 may perform logical operations on nine sequentially transmitted data entries (i.e., the $1^{st}$ to $9^{th}$ data entries) and output a result as a first parity entry. Afterwards, the parity generating engine 512 may calculate a second parity entry based on the $10^{th}$ to $18^{th}$ other data entries sequentially transmitted.

The controller 130, 400 including the parity generating engine 512 can recognize a physical location regarding a data entry sequentially transmitted to, and programmed in, the memory device 150. The parity entry output from the parity generating engine 512 can include additional information regarding locations where plural data entries are stored in the memory device 150. In this case, the plural data entries corresponding to a specific parity (i.e., belonging to a specific parity group) can be distributed and stored in different memory dies, different memory planes, or different memory blocks. According to an embodiment, the plural data entries can be stored in a same memory die, a same memory plane, or a same memory block. The parity group can be determined regardless of where the plural data entries are stored. Each of the plural data entries can include information regarding a parity group which is associated with each data entry, while a parity entry may include physical addresses of the plural data entries associated with the parity entry.

The parity generating engine 512 described in FIG. 22 may generate a parity entry in a preset number unit of data entries based on a program order of the data entries or an order in which the data entries are transmitted to the memory device 150 through at least one channel for data program operations. Further, the controller 150, 400 including the parity generating engine 512 may change or adjust the number of data entries constituting a single parity group based on the number of data entries to be programmed in the memory device 150.

For example, a parity group may include 10 data entries and 1 parity entry. When 20 data entries are programmed, the 20 data entries can be divided into two parity groups of 10 each, and two parity entries (i.e., a $1^{st}$ parity entry and a $2^{nd}$ parity entry) can be generated. Provided that 21 data entries are programmed, it is difficult for the 21st data entry to be stored in the memory device 150 until either 9 other data entries are newly input and programmed or a $3^{rd}$ parity entry is generated based on 9 dummy data entries and the 21st data entry. However, when the number of data entries constituting each parity group can be dynamically changed or adjusted, the 21 data entries can be assigned to 3 parity groups, each parity group including 9 data entries. When three parity entries are generated, 21 the data entries can be stored in the memory device 150 without other data entries or dummy data entries.

According to an embodiment, the parity generating engine 512 may be used to update a parity entry based on an erased data entry when at least one data entry in the parity group stored in the memory device 150 is erased. An erase operation or garbage collection will be explained later.

Figure 23:
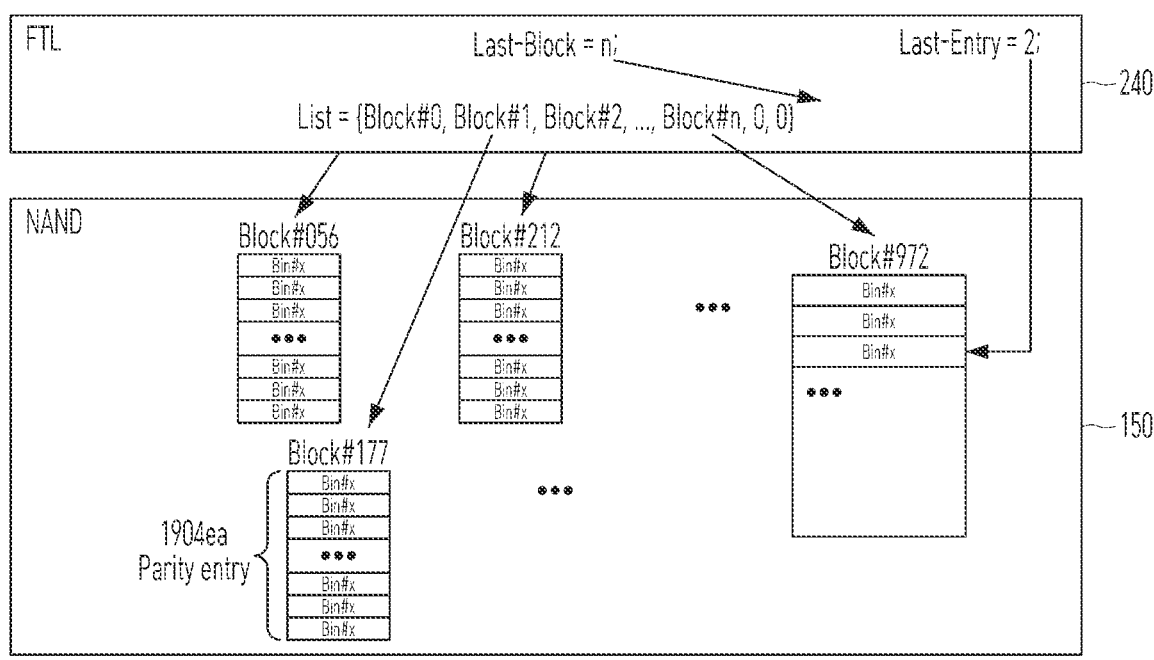
FIG. 23 illustrates a data structure of write data in a memory device according to another embodiment of the present disclosure.

FIG. 23 illustrates a data structure of write data in a memory device according to another embodiment of the present disclosure. Specifically, FIG. 23 describes a structure of programmed data entries stored in the memory device 150 by the flash translation layer (FTL) 240 through a program operation.

Referring to FIG. 23, the flash translation layer (FTL) 240 can determine a structure of a parity group including program data that is stored in the memory device 150 during a program operation performed by the memory system 110.

The flash translation layer 240 may use a virtual block address. Here, the virtual block address can be distinguished from a logical address used by the host 102, which is an external device coupled to the memory system 110, and a physical address indicating a data storage location within the memory device 150. For example, the virtual block address may correspond to an open memory block within the memory device 150.

The flash translation layer 240 can sort and group data entries to be programmed in the memory device 150. Additionally, the flash translation layer 240 may configure a list List[ ] containing virtual block addresses of locations where the corresponding data entries will be stored. The list List[ ] may include a location in which a parity entry generated based on the corresponding data entries is stored. For example, the 177th memory block Block #177 in the memory device 150 may be designated as a memory block for storing parity entries (e.g., see the embodiment of FIG. 17). The 177th memory block Block #177 can store 1904 number of Parity entries.

Memory blocks of the memory device 150 included in the list List[ ] may be continuously changed. The list List[ ] may include super block information. Additionally, a virtual block address included in the list List[ ] may change based on a defect in the memory block, whether garbage collection is performed, etc.

The flash translation layer (FTL) 240 may determine a data structure of the parity group including data entries to be programmed in the memory device 150. The data structure of the parity group containing the data entries can be configured based on the list List[ ] as well as the total number (e.g., Last-Block) of memory block addresses (i.e., data entries) included in the list List[ ] and current entry information (e.g., Last-Entry) indicating the difference between the current data entry and the last data entry of memory block addresses. For example, the list List[ ] may include up to 128 memory block addresses for the memory device 150 having a 1 TB storage space, provided that the memory device 150 includes 1% overheads. While adding the block address for the data entry to be programmed in the memory device 150 to the list List[ ], the flash translation layer 240 can determine how many other data entries can be further added to the list List[ ] based on the total number (e.g., Last-Block) and the current entry information (e.g., Last-Block).

Figure 24:
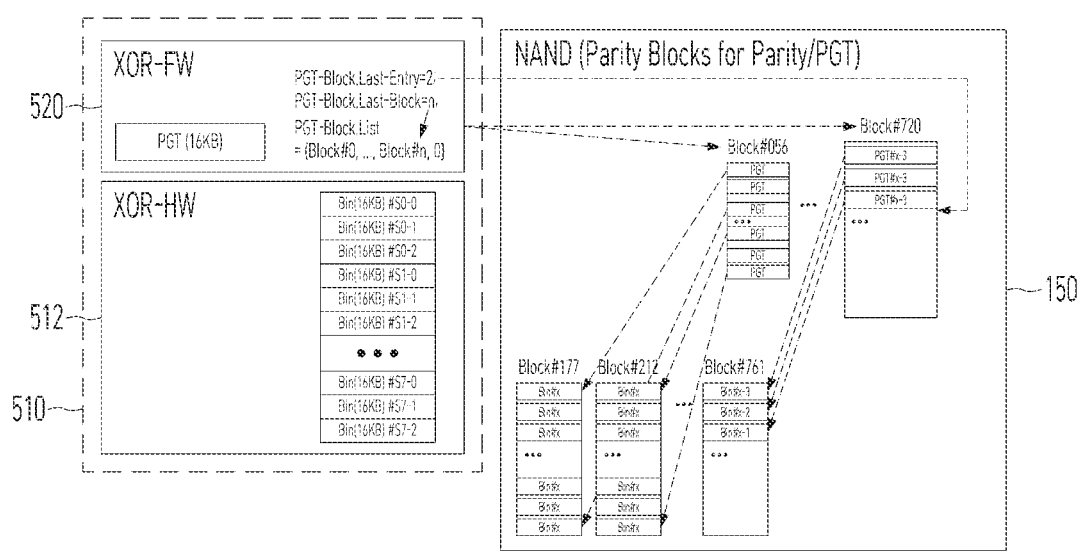
FIG. 24 illustrates an operation for generating metadata in the parity generating circuitry.

FIG. 24 illustrates an operation for generating metadata in the parity generating circuitry.

Referring to FIG. 24, the parity generating circuitry 510 may include the write data control circuitry 520 including firmware executed by at least one processor and the parity generating engine 512. According to an embodiment, the write data control circuitry 520 is not included in the parity generating circuitry 510 but the write data control circuitry 520 may control a parity generating operation in conjunction with the parity generating circuitry 510.

The write data control circuitry 520 can set a data structure for generating a parity entry. Here, the data structure may include a parity group set for generating the parity entry, storage locations of data entries and parity entries belonging to the parity group, and information regarding the parity group. Additionally, the data structure can include various types of meta information having a preset size for each data entry and each parity entry.

Although the number of data entries belonging to a parity group may vary according to an embodiment, the write data control circuitry 520 can recognize the number of data entries belonging to each parity group. The flash translation layer 240 can recognize the number of data entries to be programmed in the memory device 150 and determine a method and an order of storing the data entries in the memory device 150. The write data control circuitry 520 can establish a data structure related to the parity group based on what is determined by the flash translation layer 240.

For example, the memory device 150 can include a first memory block Block #056, Block #720 capable of storing a parity group table and parity entries, and a second memory block Block #177, Block #212, Block #761 capable of storing data entries belonging to a parity group. According to an embodiment, memory cells in the first memory block Block #056, Block #720 may be an SLC block that stores 1 bit of data in each memory cell or a TLC block that stores 3 bits of data in each memory cell. On the other hand, memory cells in the second memory block Block #177, Block #212, Block #761 may be a TLC block that store 3 bits of data in each memory cell.

According to an embodiment, the write data control circuitry 520 may set the minimum number of parity groups corresponding to the data storage space of the memory device 150. The write data control circuitry 520 may determine the number of parity groups. The number of parity groups may be proportional to data density of the memory device 150 (i.e., the number of data entries stored per a preset size/range of storage). For example, as the number of bits of data stored in a memory cell increases, the number of parity groups may increase. Additionally, the number of parity groups may be inversely proportional to the size of the parity group. For example, as the number of data entries included in a parity group increases, the number of parity groups may decrease.

According to an embodiment, the write data control circuitry 520 may set the number of memory blocks that can store parity entries. The number of parity memory blocks that can store parity entries may be proportional to the data density of the memory device 150 and may be inversely proportional to the size of the parity group.

According to an embodiment, the write data control circuitry 520 may collect data entries belonging to a parity group and physical addresses indicating memory blocks in which the parity entries would be stored. Memory blocks in which the data entries and the parity entry would be stored may be all or a part of open memory blocks in the memory device 150. The write data control circuitry 520 may insert the physical addresses corresponding to the data entries belonging to the parity group into metadata of the data entries.

The physical address corresponding to the data entry delivered by the write data control circuitry 520 may correspond to the buffer address Bin-ID. For example, the buffer address Bin-ID may correspond to a part of the physical address of the data entry. Based on the buffer address Bin-ID, the parity generating engine 512 may determine which parity value stored in the parity operation buffer 514 should be subject to an exclusive OR operation performed on the data entry DIN.

According to an embodiment, the parity generating engine 512 may repeatedly perform an exclusive OR operation on a data entry transmitted from the write data control circuitry 520 and a previous result (i.e., a calculated value) of a previous exclusive OR operation. Additionally, the parity generating engine 512 may configure metadata including a physical address regarding a location where the generated or updated parity entry will be stored in the memory device 150.

Figure 25:
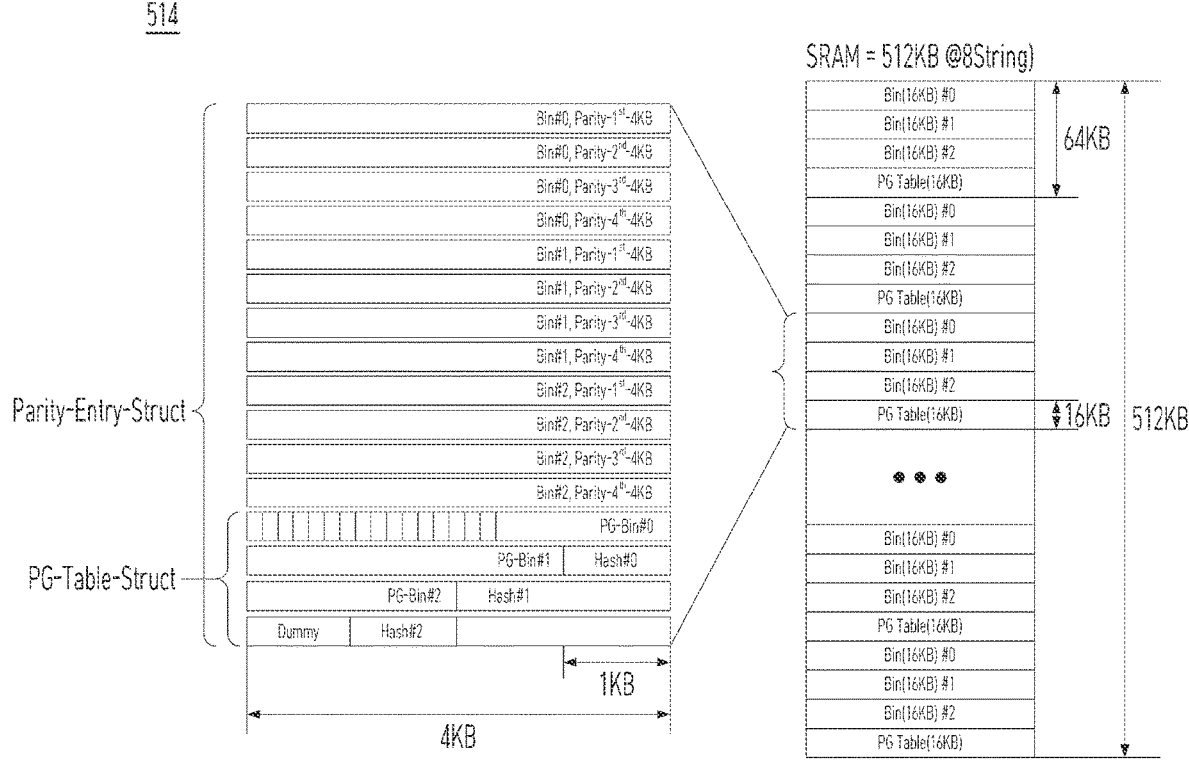
FIG. 25 illustrates a buffer in the parity generating circuitry.

FIG. 25 illustrates a buffer in the parity generating circuitry. Specifically, FIG. 25 explains the parity operation buffer 514 within the parity generating circuitry 510.

Referring to FIGS. 18 and 25, the parity generating circuitry 510 may include the parity operation buffer 514. According to an embodiment, the parity generating circuitry 510 may include a processor that performs a specific function and a cache memory used as the parity operation buffer 514.

According to an embodiment, the parity generating circuitry 510 may include a processor performing a specific function and a cache memory. According to an embodiment, the parity generating circuitry 510 can include an application-specific integrated circuit (ASIC) designed for performing a specific operation. For example, the parity generating circuitry 510 can include a processing unit engaged with a cache memory such as SRAM. The processing unit can be implemented in a processor, a co-processor, a micro-processor, an accelerator, a designated processor, or the like designed to handle a specific task. According to another embodiment, the processing unit can be implemented in a multi-processor or a multi-core processor. Targeted adaptive design for the processing unit used for performing specific operations can reduce power consumption, and the memory system 110 can have good performance regarding the data input/output operations.

According to an embodiment, the parity operation buffer 514 may have a size of 512 KB. Referring to FIGS. 21 and 25, the size of the parity operation buffer 514 may be determined according to a structure or configuration of the memory device 150. For example, 3-bit data can be stored in each memory cell in the memory device 150. The number of cell strings, coupled to a single word line in each memory block or each memory plane, can be eight. Four unit buffers can correspond to the 3-bit data and parity table information. The parity operation buffer 514 would be configured for corresponding to eight cell strings. Thus, the parity operation buffer 514 can include 32 number of unit buffers. Each unit buffer can have a size of 16 KB.

Referring to FIG. 25, the four unit buffers are described in more detail. Parity values (Parity-Entri-Struct) can be stored in three of the four unit buffers, and parity group table information (PG-Table-Struct) can be stored in the other of the four unit buffers. The 16 KB unit buffer storing the parity entry (Parity-Entri-Struct) can be divided into four 4 KB sub-units. The 16 KB parity group table information (PG-Table-Struct) may include multiple data entries related to the parity entry. Hereinafter, the parity entry and the parity group table information will be described in detail.

Figure 26:
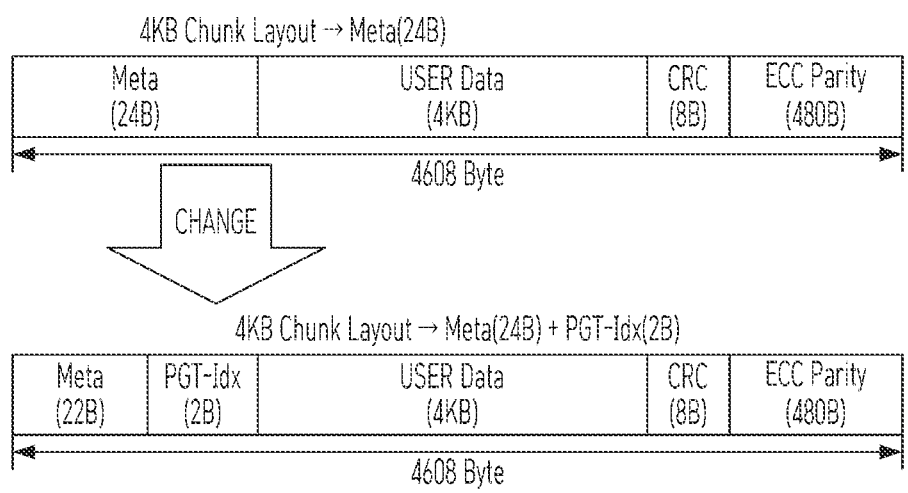
FIG. 26 illustrates a data entry structure and a write operation in the memory system including the parity generating circuitry.

FIG. 26 illustrates a data entry structure and a write operation in the memory system including the parity generating circuitry. Specifically, FIG. 26 describes a data structure of each data entry which is transferred from the controller 130 to the memory device 150 for a data program operation. For example, FIG. 26 shows that a structure of a 4 KB data chunk is changed.

The controller 130, 400 in the memory system 110 may transmit a data chunk, which is a preset size unit or format, to store data in the memory device 150. The parity generating circuitry 510 described in FIG. 18 can generate a parity entry in a different manner from the memory system described in FIGS. 8 to 17. When the size of the data chunk is changed due to a changed parity entry stored within the memory system 110, there is a burden of changing at least some part of the configurations of the controller 130, 400 and the memory device 150. However, the parity generating circuitry 510 according to an embodiment of the present disclosure can be applied without changing the size of the data chunk.

According to an embodiment, the data chunk within the memory system 110 may be divided into four pieces of data. A data chunk can have a size of 4 KB (i.e., 4608 bytes). Specifically, the data chunk may include 24 bytes of meta data, 4000 (4K) bytes of user data, 8 bytes of CRC data, and 480 bytes of parity data (ECC Parity). The controller 130, 400 can generate the parity data (ECC Parity) for the user data (USER DATA) through the ECC circuitry 138 described in FIG. 1 and the ECC module 266 described in FIG. 2. The controller 130, 400 can include the parity data (ECC Parity) in the data chunk. Further, the controller 130, 400 can read the data chunk. If there is an error in the user data (USER DATA), the ECC circuitry 138 described in FIG. 1 and the ECC module 266 described in FIG. 2 can recover the user data (USER DATA) using the parity data (ECC Parity). If the ECC circuitry 138 described in FIG. 1 and the ECC module 266 described in FIG. 2 fail to recover an error, the corresponding data chunk may be determined to have an UECC. If the corresponding data chunk has the UECC, the UECC can be recovered based on the parity entry generated by the parity generating circuitry 510.

In the memory devices shown in FIGS. 8 to 17, locations where plural data entries belonging to a parity group are stored and a location where the parity entry corresponding to the plural data entries is stored can be determined in advance. In these cases, it is not necessary to add or store parity group information in each data entry. This is because the location where the parity entry is stored can show the parity group information to which the parity entry belongs. Likewise, there is no difficulty in specifying the parity entry corresponding to the data entry due to a relationship between the locations where the data entry and the parity entry are stored.

However, a relationship between locations where the parity entry generated by the parity generating circuitry 510 and the data entries associated with the parity entry are stored may be different. Thus, information (e.g., parity group table) regarding the parity groups should be generated, managed, and stored. Additionally, in a case when each data entry belonging to a specific parity group can also have information regarding the parity group each data entry belongs to, it can be easy for the data entry and the parity entry to cross-verify the parity group based on the information.

According to an embodiment, the data chunk may be divided into five pieces of data. The data chunk with a size of 4 KB (i.e., 4608 bytes) can include 22 bytes of meta data, 2 bytes of parity index (PGT-Idx), 4000 (4K) bytes of user data (USER DATA), 8 bytes of CRC data, and 480 bytes of parity data (ECC Parity). The size of metadata within the data chunk can be reduced from 24 bytes to 22 bytes, and the parity index (PGT-Idx) can be added in the reduced 2 bytes. Meanwhile, the size of the parity index (PGT-Idx) may be determined based on storage capacity of the memory device 150 or the maximum number of parity groups.

For example, if a memory block where a parity entry is stored is designated, the parity index (PGT-Idx), which can be set to a size of 2 bytes (16 bits), can be used to distinguish 65536 number of parity groups (e.g., paritygroup0 to paritygroup65535) from each other.

According to an embodiment, the 2-byte parity index (PGT-Idx) may include the address (1 byte) of the memory block in which the parity entry is stored and the location (1 byte) of the parity entry within the corresponding memory block. In this case, the location where the parity entry associated with the 4000 (4K) bytes of user data (USER DATA) included in the data chunk is stored can be checked through the 2-byte parity index (PGT-Idx). If an error occurs in user data (USER DATA) in the data chunk, the controller 130, 400 may be able to find a parity entry associated with the data entry through the 2-byte parity index (PGT-Idx).

FIG. 27 illustrates the parity entry (Parity-Entri-Struct) which is generated by the parity generating circuitry 510 and stored in the memory device 150.

Referring to FIGS. 25 and 27, the parity generating circuitry 510 generates a parity entry (Parity-Entri-Struct) having a size of 16 KB. The controller 130, 400 can divide the parity entry (Parity-Entri-Struct) having the size of 16 KB into a plurality of chunks stored in the memory device 150. The parity generating circuitry 510 may perform an exclusive OR operation to generate the parity entry, and then record locations of data entries related to the generated parity entry. Further, the parity generating circuitry 510 may set a hash table.

Because the parity generating circuitry 510 can generate or calculate a parity entry in response to an order in which a plurality of data entries are transferred to the memory device 150 or the memory die, not generating the parity entry from the plural data entries corresponding to a location of the parity entry, locations in which the plural data entries involved in generating the parity entry are stored might not be fixed. The locations of data entries could be dynamically determined based on an operating state of the memory device 150. Thus, it is necessary to record the storage locations of the plural data entries determined in the flash translation layer 240 as one information included in the parity entry. For example, after performing an exclusive-OR operation to generate the parity data, the parity generating circuitry 510 can add the location information (e.g., PPN) of the data entry involved in the exclusive-OR operation into a page group table PG_Table included in metadata of the parity entry. That is, after performing the exclusive-OR operation to generate the parity entry, a location of a data entry used for the exclusive-OR operation may be recorded in meta data of the parity entry. As shown in FIG. 27, a location at which a data entry used to generate parity is programmed can be determined in correspondence to a location of an open memory block in the memory device 150 and a page number or an offset in the open memory block. The location (e.g., a physical page number PPN, or a physical address) at which the data entry is programmed may vary according to an operating state of a memory die, a memory plane, or the open memory block included in the memory device 150.

In addition, the parity generating circuitry 510 that performs the SOFT-XOR scheme can receive the buffer address Bin-ID including information corresponding to a location of the cell string, a bit (e.g., L/C/M) of multi-bit data stored in the memory cell. Based on the buffer address Bin-ID, the exclusive OR (XOR) operation can be performed on the corresponding data entry DIN and a value stored in the parity operation buffer 514. Afterwards, the parity generating circuitry 510 can update the location of the buffer address (Bin-ID) in the parity operation buffer 514 as a result of the exclusive OR (XOR) operation, and insert the location (e.g., PPN) of the corresponding data entry into the page group table PG_Table. Further, the parity generating circuitry 510 may additionally perform a Bloom-Filter Bit Marking operation in the hash table.

Herein, a bloom filter can be used to construct a set that determines whether data entries are in a set and have a probabilistic data structure that operates in a hash coding method (similar to a Hash Table). The bloom filter may be a memory-efficient and probabilistic data structure that can be used to check whether a given data belongs to a set or a cluster. In a case of checking whether a given data entry in a data list belongs to a set or a cluster, it could be checked based on the Bloom filter. For example, after recording a physical location (e.g., physical addresses) of data entry which is used to calculate a parity entry, the parity generating apparatus FCT can mark whether the corresponding physical address is an aggregate configuration.

According to an embodiment, a Bloom Filter may include a bitmap called Bloom and a Hash function. The parity generating circuitry 510 can obtain a hash value by applying the key value for the corresponding data entry DIN to a hash function. The parity generating circuitry 510 can use the obtained hash value to specify the bit position in Bloom using a modular operation, etc. For example, the parity generating device 510 can pass the physical address (e.g., PPN) of the corresponding data entry DIN to the hash function in order to obtain hash values Hash #0, Hash #1, Hash #3. Then, the parity generating device 510 can perform the modular operation with the number of bits in the bitmap PG-Bin #0, PG-Bin #1, PG-Bin #2 in the Bloom in order to specify the bit position and mark the corresponding bit.

The memory system 110 can read a data entry programmed in the memory device 150. In this case, when an error (e.g., UECC) occurs in the read data entry, the controller 130, 400 can restore or recover an errored read data entry by using a parity entry stored during a program operation. Hereinafter, how to recover the errored read data entry based on the parity entry (Parity-Entri-Struct) used in the memory system 110 will be described.

Figure 28:
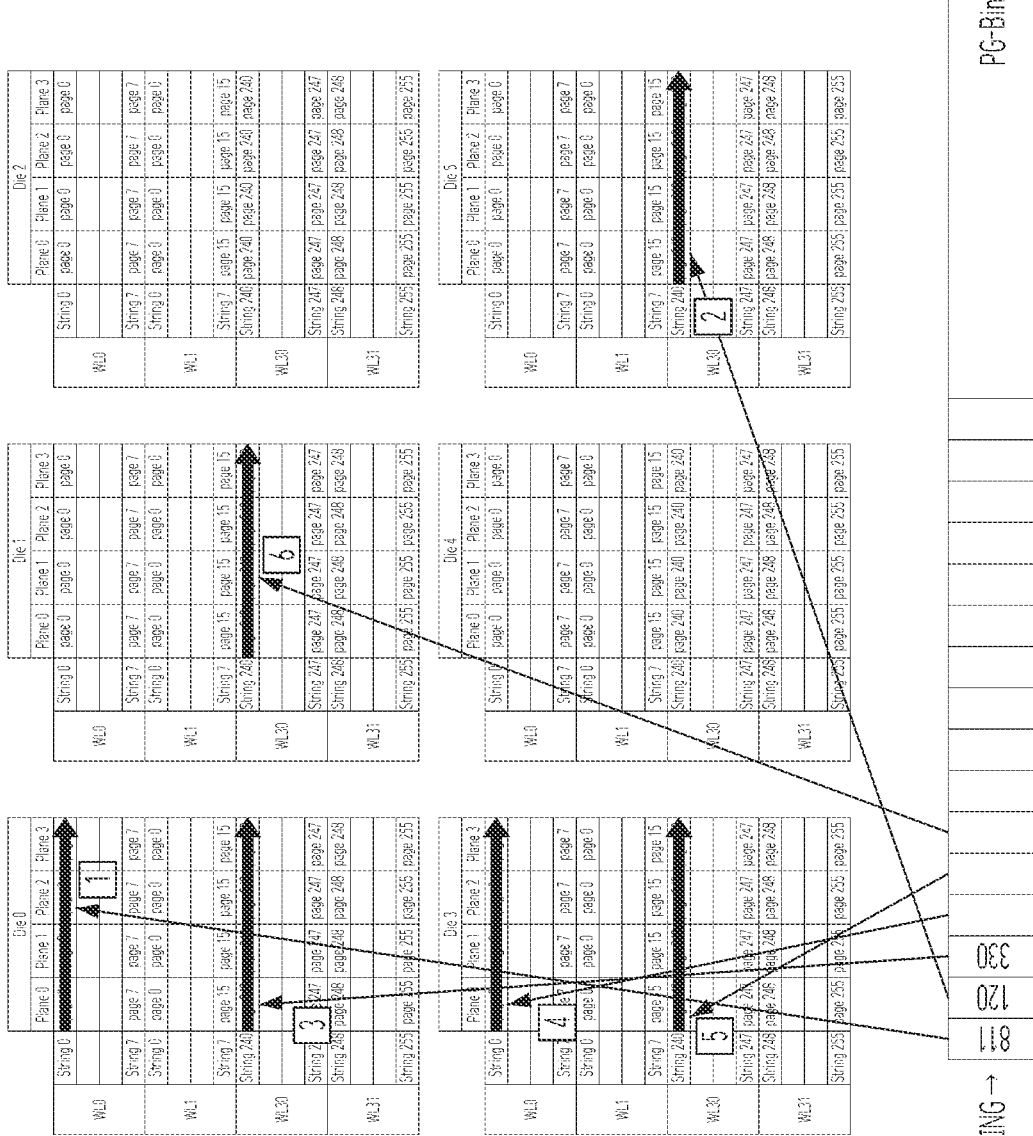
FIG. 28 illustrates physical addresses, indicating locations in which plural data entries are stored, in the parity entry.

FIG. 28 illustrates physical addresses, indicating locations in which plural data entries are stored, in the parity entry.

Referring to FIGS. 25, 27, and 28, the parity generating circuitry 510 can performs an exclusive OR (XOR) operation, and then add the physical address (PPN) indicating a location in which the data entry DIN that is subject to the exclusive OR (XOR) operation is stored in the memory device 150 into the parity entry (Parity-Entri-Struct). Plural physical addresses (PPNs) of multiple data entries belonging to a same parity group may be sequentially added into the parity entry (Parity-Entri-Struct).

A method of configuring or setting the physical address (PPN) may vary according to an embodiment. Depending on the method of configuring or setting the physical address (PPN), an area or a location indicated by the physical address (PPN) may include plural memory cells or plural pages. Referring to FIG. 28, the physical address (PPN) may include information that can specify a memory die, a word line, and a cell string. Additionally, a single physical address (PPN) can point to memory cells included in all memory planes within a specific memory die. For example, a first physical address 811 first added in the parity entry may point to a first cell string String0 coupled to the first word line WL0 in all memory planes Plane0, Plane1, Plane2, Plane3 of the first memory die Die0. The first physical address 811 can indicate all locations specified by the first cell string String0 connected to the first word line WL0 in the first to fourth memory planes Plane0 to Plane3 of the first memory die Die0. In addition, a second physical address 120 may indicate all locations specified by the 241st cell string String240 coupled to the 31st word line WL30 in the first to fourth memory planes Plane0 to Plane3 of the sixth memory die Die5.

The parity generating circuitry 510 may add a physical address (PPN), which is a location where the corresponding data entries are stored, into the parity entry (Parity-Entri-Struct). The number of added physical addresses may be equal to the number of data entries belonging to each parity group. For example, if the number of data entries belonging to a specific parity group is 20, the parity entry (Parity-Entri-Struct) corresponding to the specific parity group may include 20 number of physical addresses (PPNs). According to an embodiment, a length of the physical address may be 1 byte. The length of the physical address may vary depending on the internal configuration of the memory device 150.

Unlike the memory devices described in FIGS. 8 to 17, locations where plural data entries belonging to a same parity group are stored may be not fixed according to a program operation method in the memory device described in FIG. 28. The locations can be determined or changed based on an operating state of the memory block 150. Because the locations where the plural data entries are stored are not fixed, the physical addresses (PPNs), which indicate the locations where the plural data entries are stored, could be included in the parity entry (Parity-Entri-Struct) to be stored in the memory device 150.

Further, unlike the memory device illustrated in FIGS. 8 to 17, data entries stored in plural cell strings coupled to a single word line may belong to different parity groups in the memory device shown in FIG. 28. The memory device described in FIG. 28 can change the number of data entries constituting the parity group, and the data entries do not need to be stored in predetermined or fixed locations based on the program operation method. Thus, there is no need to program a dummy data entry into the memory device 150. Data entries stored in plural cell strings coupled to a single word line in at least one memory block in the memory device 150 may belong to different parity groups.

Figure 29:
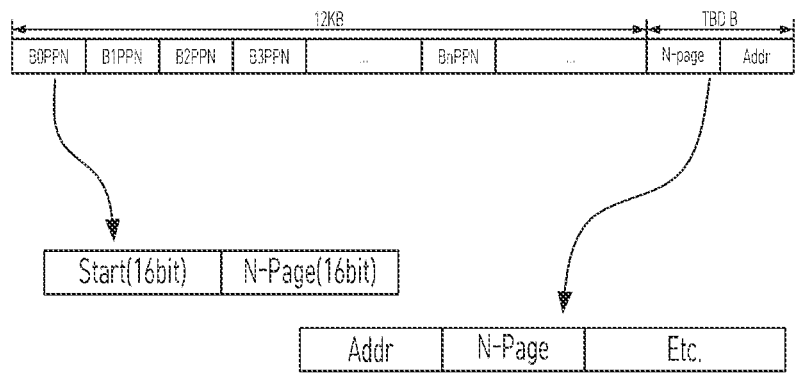
FIG. 29 illustrates a parity group table stored in the memory device.

FIG. 29 illustrates a parity group table stored in the memory device.

Referring to FIG. 29, the memory system 110 may form a parity group table based on a plurality of parity entries (Parity-Entri-Struct) included in the parity operation buffer 514. According to an embodiment, the parity generating circuitry 510 may configure or set a data structure (PGT-Structure) for the parity group table that includes information regarding parity groups, each parity group including a parity entry and data entries. Further, the parity generating circuitry 510 may configure a data structure (PPN-Struct) regarding physical addresses associated with data entries belonging to each parity group.

The configuration and size of the parity group table generated by the parity generating circuitry 510 may vary according to an embodiment. For example, depending on the internal configuration of the memory device 150 where data entries and parity entries are stored, the configuration and size of the parity group table may vary.

Referring to FIG. 29, the data structure (PGT-Structure) of the parity group table can include physical address information (B0PPN, B1PPN, B2PPN, . . . , BnPPN, . . . ) regarding locations where plural data entries are stored. For example, an area having a size of approximately 12 KB can be allocated for recording location information regarding plural data entries belonging to a single parity group.

In addition, the data structure (PGT-Structure) of the parity group table can include the physical address (Addr) indicating a location where the parity entry is stored and an additional information area (TBD_B) including the total number of pages (N-page) regarding how many data entries are included (e.g., the number of pages). According to an embodiment, the additional information area (TBD_B) may further include additional information (etc.) used for controlling or managing the parity group.

According to an embodiment, physical address information (e.g., B0PPN) for plural data entries belonging to a parity group may have a size of 32 bits. The physical address information (e.g., B0PPN) for a data entry can include a first address (e.g., Start(16 bit)) of the data entry within the memory block in which the data entry is stored in the memory device 150 and the total number of data entries (e.g., N-Page(16 bit)) stored in the corresponding memory block. Referring to the memory devices described in FIGS. 8 to 17, some data entries may be sequentially stored in at least one open memory block among the plural data entries belonging to a single parity group. In this case, provided that the first address of the first data entry stored in the corresponding open memory block and the number of data entries stored in the corresponding open memory block, all the plural data entries which belonging to a specific parity group and are stored in the corresponding open memory block could be recognized.

For example, one physical address (e.g., B0PPN) may point to not a single data entry but plural data entries successively programmed in a memory block. The address of the first data entry stored in the first physical address information (B0PPN) can point to the first cell string String0 coupled to the first word line WL0 of the first memory block Block #0, and the number of data entries (N-Pages) may be 328. The number of cell strings connected to each word line in the first memory block within four memory planes Plane0 to Plane3 may be 8. In this case, the first physical address information B0PPN can refer to data entries stored in 328 consecutive pages from a first cell string String0 coupled to the first word line WL0 to a second cell string String1 of the 11th word line WL10 in the first memory block Block #0. In addition, the address of the first data entry stored in the second physical address information (B1PPN) can point to the first cell string String0 coupled to the first word line WL0 of the second memory block Block #1, and the number of data entries (N-Page) may be 20. In this case, the first physical address information (B0PPN) can refer to data entries stored in 20 consecutive pages from the first cell string String0 to the fifth cell string String4 coupled to the first word line WL0 of the first memory block Block #0.

According to an embodiment, each physical address information (e.g., B0PPN) may be information regarding each open memory block. In this case, the number of physical address information (B0PPN, B1PPN, B2PPN, . . . , BnPPN, . . . ) included in the data structure (PGT-Structure) of the parity group table can be equal to the number of open memory blocks in the memory device 150.

According to an embodiment, each memory die in the memory device 150 may include four memory planes, and the memory die may include hundreds of word lines. A length of 16 bits may be required to identify a specific word line and a specific cell string within a specific memory block. However, the length may vary depending on the internal configuration of the memory device 150.

Meanwhile, as described in FIG. 28, plural data entries may not be stored continuously within a specific memory block or a specific memory die. In this case, after a location where the corresponding data entry is stored is recorded, the total number of data entries may be stored as 1.

Accordingly, the number of physical addresses (B0PPN, B1PPN, B2PPN, . . . , BnPPN, . . . ) included in the data structure (PGT-Structure) of the parity group table may vary depending on the internal configuration and program method of the memory device 150. In addition, depending on the number of physical addresses (B0PPN, B1PPN, B2PPN, . . . , BnPPN, . . . ) included in the parity group table (Page Group Table), a size/length allocated to record the physical address (B0PPN, B1PPN, B2PPN, . . . , BnPPN, . . . ) in the data structure (PGT-Structure) of the parity group table may also vary.

As described above, referring to FIGS. 8 to 29, a method of programming data entries in the memory device 150 within the memory system 110 can be set in various ways. In FIGS. 8 to 29, how to generate a parity entry for a parity group and how to configure or set a parity group are explained. Hereinafter, an operation of the controller 130, 400 to load a parity group stored in the memory device 150 for a data recovery operation will be described.

Figure 30:
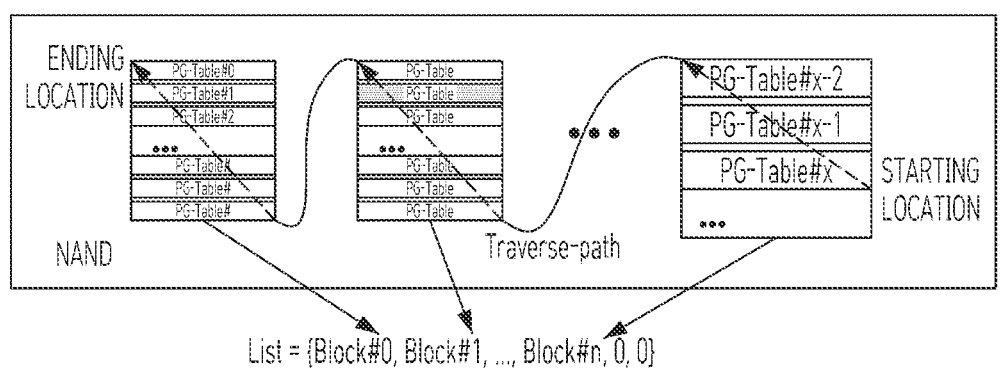
FIG. 30 illustrates an operation for checking a parity group including a data entry having an error in the parity group table.

FIG. 30 illustrates an operation for checking a parity group including a data entry having an error in the parity group table.

According to an embodiment, the ECC circuitry 138 shown in FIG. 1 and the ECC module 266 shown in FIG. 2 may check an error occurring in a read data entry. In addition, the ECC circuitry 138 or the ECC unit 266 may recover the read data entry in which an error has occurred by using the parity entry generated by the parity generating circuitry 510. As described above, because the locations of the plurality of data entries used to generate the parity entry are not predetermined or preset (e.g., not fixed in advance) in the memory system 110 according to an embodiment of the disclosure, the metadata corresponding to the parity entry can include the physical addresses (e.g., PPN) that are the locations regarding the plurality of data entries associated with the parity entry.

The ECC circuitry 138 or the ECC module 266 may find a parity entry of which meta data includes the physical address of the read data entry in which the error occurred. For example, the controller 130 can find the parity entry having the meta data including a corresponding physical address in a specific memory block in which plural parity entries are stored in the memory device 150. After finding the parity entry, the controller 130 may read a plurality of data entries corresponding to all physical addresses recorded in the parity metadata. The ECC circuitry 138 or the ECC module 266 may perform an exclusive OR operation on the plurality of data entries and the parity entry to restore the read data entry in which the error has occurred. When the controller 130 sequentially reads the plurality of data entries, the ECC circuitry 138 or the ECC module 266 can perform an exclusive-OR operation on the sequentially read data with the parity entry. Similar to the parity generating circuitry 510, the ECC module 266 can also perform an exclusive OR operation when a plurality of data entries corresponding to the parity entry are sequentially read. Accordingly, the ECC circuitry 138 or the ECC module 266 does not have to be engaged with a buffer or a cache which is capable of temporarily storing all the plurality of data entries used for recovery operation. Similar to the parity generating circuitry 510, the ECC circuitry 138 or the ECC module 266 may reduce a size of the buffer or the cache allocated to the ECC circuitry 138 or the ECC module 266 while an errored read data entry is recovered using the parity entry generated through the exclusive OR operation.

According to an embodiment of the disclosure, the ECC circuitry 138 or the ECC module 266 determines whether an error (e.g., UECC) is included in the read data entry. The flash translation layer (FTL) 240 can use the parity generating circuitry 510 to restore or recover an errored read data entry based on a parity entry. Referring to FIG. 30, when recovering the errored read data entry based on the parity entry generated through the SOFT-XOR operation performed by the parity generating circuitry 510, data entries (e.g., a chipkill unit or a chipkill decoding unit) used for generating the parity entry during a program operation can be searched and recognized.

The flash translation layer 240 can find the parity group to which the data entry in which the error occurs (that is, parity entries belonging to a parity group) in the parity group table (information regarding plural parity groups). A parity entry indicating a parity group can include information regarding the corresponding data entries in the parity operation buffer 514, which is obtained by exclusive OR operations on the data entries belonging to the parity group. The parity entry could be registered in the parity group table when stored in the memory device 150. The flash translation layer 240 may rearrange the parity group table and perform a tracking operation (fail traverse) to find a parity entry corresponding to a parity group associated with an error-generated data entry. That is, the flash translation layer 240 rearranges the parity group table and performs the tracking operation for the parity group containing the errored data entry to search a location of the parity entry corresponding to the parity group containing the errored data entry (e.g., Fail Page) in the memory device 150. The flash translation layer 240 can find the corresponding parity group through the tracking operation and perform a read operation (Parity Group Read, Page Read of the Parity Group) for the corresponding parity group. The flash translation layer 240 may read a parity entry belonging to the corresponding parity group and then perform a recovery operation on the data entry in which an error occurred.

Referring to FIG. 30, the flash translation layer 240 may perform the tracking operation to find the parity group to which the erroneous data entry belongs. Referring to FIG. 26, the flash translation layer 240 can recognize information regarding the parity group through the parity index (PGT-Idx) included in the data entry in which an error occurred. The flash translation layer 240 may calculate a buffer address Bin-ID0 to BinID2 and a hash value for the physical address information of the data entry in which an error occurred.

Referring to FIGS. 23 and 30, the flash translation layer 240 can rearrange the parity group table information in a reverse order from the last memory block in the list List[ ] to the starting memory block, which is an opposite order when constructing the list List[ ] before the list List[ ] in the memory device 150 (i.e., the parity group table is stored in the memory device 150). At this time, based on the Bloom filter and the stored hash value, it can be checked whether an address of the memory block retrieved from the parity group table information points to the corresponding parity group. This operation may be performed repeatedly until the flash translation layer 240 finds the addresses of all memory blocks included in the list List[ ] (that is, until information regarding all parity group table is collected).

Based on the buffer address Bin-ID0 to BinID2 and the hash value which are information regarding the parity group to which the error occurred data entry belongs, the flash translation layer 240 can find a physical address that indicates a location in which the party entry corresponding to the parity group is stored from the parity group table information. To recover an errored data entry, the flash translation layer 240 may read the parity entry from the memory device 150 based on the physical address.

The flash translation layer 240 may use the parity generating circuitry 510 for error recovery. The flash translation layer 240 can read a parity entry included in the parity group to which the data entry belongs when an error occurs. Referring to FIGS. 25 and 27, based on information belonging to the parity entry, the flash translation layer 240 can sequentially read data entries based on the physical addresses (PPNs) recorded in the parity entry. The parity generating circuitry 510 may establish the parity operation buffer 514 based on the parity entry and perform an exclusive OR (XOR) operation on the data entries and the parity entry read by the flash translation layer 240. When the parity generating circuitry 510 performs an exclusive OR (XOR) operation on the parity entry and data entries other than the data entry in which an error occurred in the corresponding parity group, the errored data entry could be recovered.

According to an embodiment, the flash translation layer 240 can recover the errored read data entry by performing "Fail Traverse" (searching for a bin including a Fail Page) and "Parity Group Read" (reading the pages of the group). The process of finding a dynamic PG ("Fail Traverse") is as follows.

① FTL calculates Bin-ID (0~2) and Hash for Failed-PPN.
② FTL composes Traverse-Path in reverse order of Last-Entry of List[Last-Block].
③ FTL repeats ③ for Entry until Hash matches in Traverse-Path.
④ FTL proceeds to ⑤ when PPN is searched in PG-Bin [1024]. If not, repeat ③ again.
⑤ FTL starts parity group recovery with PG-Bin[ ] when traverse is normally completed.

Further, the operation of reading the data group (e.g., a chipkill unit or a chipkill decoding unit) including a plurality of data entries related to the parity entry generated through XOR ("Parity Group Read") is as follows.

① FTL reads 16 KB parity from the bin location found during traverse.
② FTL reads data in the order of PPN written in PG-Bin[ ].
③ FTL XORs the bin and the read data. If it is not the last, repeat ②.
④ FTL uses the remainder of XOR of all PPNs constituting the bin as recovery data.
⑤ FTL updates data and bins recovered in NAND for Failed-PPN.

Meanwhile, the parity generating circuitry 510 can update the physical address (PPN) corresponding to the errored data entry in the parity operation buffer 514 with a physical address (PPN) indicating a location where the recovered data entry will be stored. This operation is performed to recover the data entry if an error occurs in the data entry within a specific parity group. Further, this operation may be performed during an operation of erasing a data entry within a specific parity group. Hereinafter, the erase operation that can be performed in the memory system 110 will be described.

FIG. 31 illustrates an operation for erasing a data entry stored in the memory system.

Referring to FIGS. 1 to 3, the memory system 110 can perform an operation of erasing a data entry stored in the memory device 150 while performing a data input/output operation. Deletion of the data entry may be performed in response to a command input from an external device such as the host 102. Deleting or erasing the data entry may include removing a map data entry of the corresponding data entry from a map table.

In the above-described operation, the data entry programmed in the memory device 150 might be not removed, but memory cells in which the data have been programmed are no longer used (so data programmed in the memory cells are no longer valid). This process may include changing a previously valid data entry into a data entry that is no longer valid (e.g., become useless).

Meanwhile, erasing a memory block having no valid data entries may include changing the corresponding memory block into a free block by deleting all data stored in memory cells of the memory block. Because an erase operation on a memory block including invalid data entry might not affect map information or a parity entry, a data erase operation and a memory block erase operation performed within the memory system 110 might be distinguished from each other.

Referring to FIG. 31, the parity generating circuitry 510 can generate one parity entry based on plural data entries, and the controller 130, 400 can perform an operation to erase or delete at least one data entry among the plural data entries. If the at least one data entry among the plural data entries is deleted, the parity entry previously generated based on the plural data entries becomes also no longer valid. Accordingly, when deleting the at least one data entry, the controller 130, 400 can recalculate a parity entry through the parity generating circuitry 510 and store an updated parity entry in the memory device 150.

A data erase operation in the memory system 110 that stores parity generated through SOFT-XOR performed by the parity generation device 510 can be performed as follows. The controller 130, 400 can read at least one data entry related to the data erase operation and a parity entry corresponding to the data entry before erasing the data entry in the memory device 150. The controller 130, 400 may update the parity entry by performing an exclusive OR operation on the parity entry and the data entry which are read for the data erase operation. Before erasing the data entry, the parity entry should be re-generated and updated because the previous parity entry might be valid no longer. A parity update sequence performed during the data erase operation may be similar to the data recovery operation for recovering an errored data entry. The controller 130, 400 can find the parity group from the parity group table to which the errored data entry belongs, through the tracking operation (fail traverse) to read the parity entry corresponding to the parity group. If the corresponding parity entry is found, the controller 130, 400 can perform a read operation (Parity Group Read, Page Read of the Parity Group) for obtaining the corresponding parity entry. Based on the parity entry, the parity generating circuitry 510 can perform an exclusive OR (XOR) operation on the data entry to be deleted and the previous parity entry, and the result of the exclusive OR operation would be a new parity entry for the parity group excluding the data entry to be deleted.

Referring to FIG. 31, plural data entries belong to a specific parity group may be erased. When five data entries are erased, the controller 130, 400 can sequentially read the five data entries to be erased. The parity generating circuitry 510 can perform a first exclusive OR operation on the previous parity entry and a first data entry among the five data entries and store a result of the first exclusive OR operation. The parity generating circuitry 510 can perform a second exclusive OR on a second data entry among the five data entries and the result of the first exclusive OR operation and then store a result of the second exclusive OR operation. When exclusive OR operations are sequentially performed on the five data entries, a new parity entry may be generated for remaining data entries (valid data entries) excluding the five data entries to be deleted in the corresponding parity group. Additionally, the parity generating circuitry 510 may remove physical addresses for the five data entries included in the parity entry. Through these operations, the parity generating circuitry 510 can leave only physical addresses of the remaining data entries in the parity entry, excluding the physical addresses of the data entries to be deleted.

Figure 32:
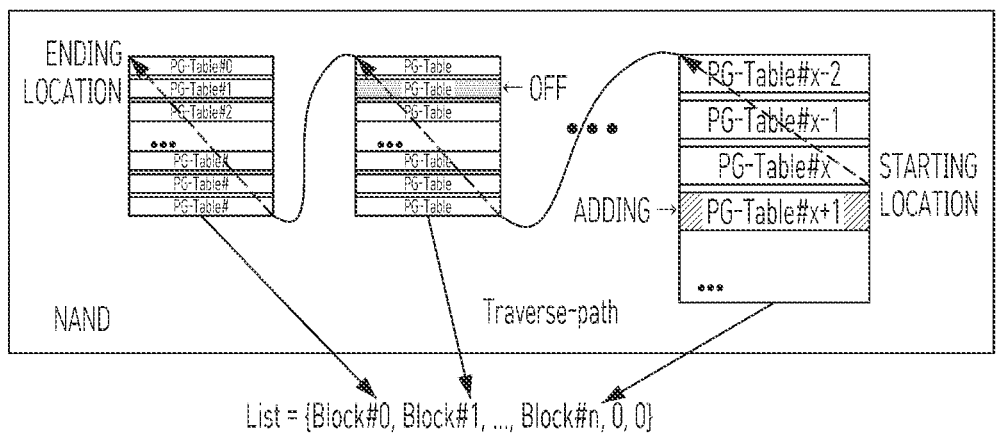
FIG. 32 illustrates how to update the parity group table after erasing a data entry in the memory system.

FIG. 32 illustrates how to update the parity group table after erasing a data entry in the memory system.

Referring to FIGS. 30 and 32, the controller 130, 400 may rearrange parity group table information stored in the memory device 150. For example, through the parity index (PGT-Idx) included in the data entry, the flash translation layer 240 can calculate or determine the buffer address Bin-ID0 to BinID2 and hash values for the physical address information regarding an errored data entry or an erased data entry.

The flash translation layer 240 may rearrange the parity group table stored in the memory device 150. As described in FIG. 30, the reordering of the parity group table is performed in the reverse direction opposite to the order in which parity groups have been added into the parity group table. That is, the parity group table can be rearranged in an order from the most recently added parity group PG-Table #x to the earliest added parity group PG_Table #0.

Thereafter, the flash translation layer 240 can read a parity entry, indicating the parity group to which the errored data entry or the erased data entry belongs, from the memory device 150. Additionally, the flash translation layer 240 may exclude the corresponding parity entry from the list List[ ]. Here, the parity entry indicating the parity group to which the errored data entry or the erased data entry belongs can be updated with a new parity entry (e.g., the physical address of the recovered data entry or the parity entry excluding the erased data entry), because the previously stored parity entry may no longer be valid.

As described in FIGS. 30 and 31, the controller 130, 400 may either recover the errored data entry and store a recovered data entry in a new location or generate a new parity entry excluding the erased data entry. A new parity group corresponding to the new parity entry may be added into the parity group table information stored in the memory device 150. For example, referring to FIG. 32, a new parity group PG_Table #x+1 may be added into the parity group table information, following the previously added parity group PG_Table #x.

FIGS. 30 and 32 show that the parity group table is logically arranged in the reverse direction of the order in which parity groups are added into the parity group table. However, a physical location where the parity entry for each parity group is stored in the memory device 150 can vary according to an embodiment such as a case (e.g., the embodiments shown in FIGS. 8 to 17) when locations in which the parity entries are stored are designated or an area is allocated for only parity entries, or another case (e.g., the embodiment shown in FIG. 28) when a parity entry could be stored in a random location or a different location.

Figure 33:
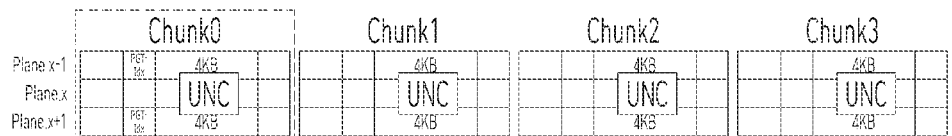
FIG. 33 illustrates an operation for searching a parity entry for a data error recovery operation performed in the memory system.

FIG. 33 illustrates an operation for searching a parity entry for a data error recovery operation performed in the memory system. FIG. 34 illustrates an operation for searching a parity entry for a data erase operation performed in the memory system. Referring to FIGS. 33 and 34, parity entry searches are compared and explained based on the worst cases as examples in a view of operation margin during the data error recovery operation and the data erase operation performed within a memory system.

Referring to FIGS. 30 to 32, the data error recovery operation and the data erase operation within a memory system may be performed in a similar manner. However, times required for the data error recovery operation and the data erase operation performed within the memory system may vary. The data erase operation performed in the memory system 110 may include not only an operation of excluding or extracting a specific data entry from a parity group, but also an operation of erasing data in a unit of memory block for garbage collection or wear leveling.

Referring to FIG. 33, provided that an error occurs in a data entry read from the memory device 150, it could be understood that the data entry has an error in user data within a 4 KB data chunk, as described in FIG. 26. In order to recover from the error in the data chunk, the parity entry can be searched based on the parity index (PGT-Idx) included in the data chunk. Additionally, referring to FIGS. 28 and 33, if an error occurs in a data entry stored in a specific memory plane (Plane x), the controller 130, 400 can perform an operation (1st RD) of reading data entries from the neighboring data planes (Plane x+1, Plane x−1). Further, the controller 130, 400 can perform an operation (2nd RD) of reading the parity group table from the memory device 150. Afterwards, the controller 130, 400 can find a parity group to which the data in error belongs from the parity group table and perform an operation (3rd RD) of reading the parity entry corresponding to the parity group. That is, if an error occurs in a data entry read from the memory device 150, the controller 130, 400 can perform three read operations (1st RD, 2nd RD, 3rd RD) to secure the parity entry associated with an errored data entry.

Referring to FIG. 34, a data entry may be erased from a specific memory block within the memory device 150. A data entry stored in a specific memory block may be deleted, moved, or copied in the memory system 110 due to operations such as bad block management, garbage collection, or wear leveling.

Although it may vary depending on the internal configuration of the memory device 150, the memory block may include a plurality of memory cells and a plurality of cell strings coupled to a plurality of word lines. Referring to FIG. 28, it may take the longest time for the memory system to erase data entries from a specific memory block even if all data entries stored in the specific memory block are valid. Further, each of the data entries stored in the memory block may belong to different parity groups. In this case, the controller 130, 400 may search for parity groups equal to the number of data entries targeted for the data erase operation in the memory block and read parity entries corresponding to the parity groups. Comparing the embodiments shown in FIGS. 33 and 34, all parity entries for the data erase operation might not be secured through three read operations (1st RD, 2nd RD, 3rd RD) for the data recovery operation. Although there are differences depending on the internal configuration of the memory device 150, all parity entries for the data erase operation could be secured through tens or hundreds of read operations.

Referring to FIGS. 33 and 34, the time spent on securing at least one parity entry may vary based on which one of the data recovery operation and the data erase operation is performed. Further, a time spent on generating a new parity entry or storing the new parity entry in the memory device 150 may vary based on which one of the data recovery operation and the data erase operation is performed.

As described above, according to an embodiment, even when the memory system 110 moves or migrates a data entry stored in the memory device 150 to another location by performing operations such as garbage collection, read reclaim, and wear leveling, a data erase operation can be performed. Typically, data movement or migration in the memory device 150 can include a read operation of reading a valid data entry from the original location, a program operation for storing the valid data entry in another location, and a erase operation for erasing the data entry remained at the original location. Movement or migration of data entries in the memory device 110 may include updating map information associated with the physical location of the data from an old location to a new location. Hereinafter, a parity update operation in an operation that includes data migration (e.g., garbage collection) will be described.

Figure 35:
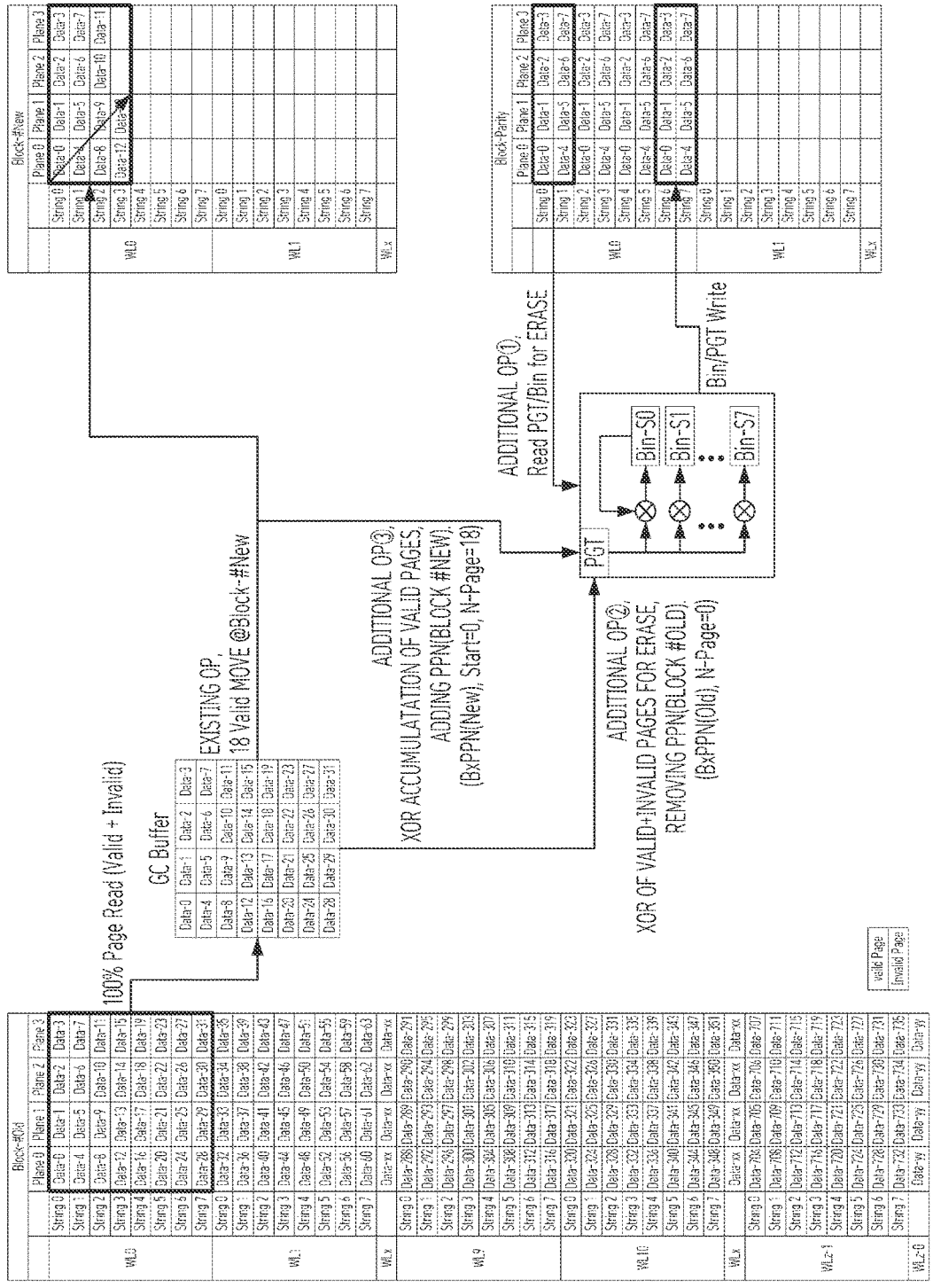
FIG. 35 illustrates garbage collection performed in the memory system.

FIG. 35 illustrates garbage collection performed in the memory system.

Referring to FIG. 35, the controller 130, 400 in the memory system can be configured to read both a valid data entry and an invalid data entry included in a target block Block-#Old that is subject to the garbage collection and then store read data entries into a buffer (GC Buffer) established for the garbage collection.

In a typical memory system, a controller can move or copy valid data entries to a new memory block Block-#New. For example, if there are 18 valid data entries among 32 data entries, the controller may be configured to move or copy the 18 valid data entries to the new memory block Block-#New. If the 18 valid data entries may be not suitable for a program operation, the memory system can program the 18 valid data entries along with at least some dummy data entries in the new memory block Block-#New.

According to an embodiment, the memory system 110 including the parity generating circuitry 510 can move and copy only valid data entries without dummy data entries to the new memory block Block-#New. However, the memory system 110 needs to perform a parity generating operation to erase invalid data entries between valid data entries and invalid data entries included in the target block Block-#Old. For the garbage collection, the controller 130, 400 can perform three additional operations.

First, the controller 130, 400 can select invalid data entries (i.e., erased data entries) included in the target block Block-#Old and load corresponding parity entries from a parity memory block Block-Parity in the memory device 150 (①).

The controller 130, 400 need to newly calculate a parity entry through the data erase operation. The controller 130, 400 can use the parity generating circuitry 510 to perform an exclusive OR operation on the erased data entry (i.e., invalid data) stored in the buffer (GC Buffer) and the corresponding parity entry obtained from the parity memory block Block-Parity and remove the physical address (PPN) for the erased data entry from the parity entry (②).

Additionally, the controller 130, 400 can update a physical address (PPN) of the data entry copied and moved to the memory block (Block-#New) in the parity entry (③).

After the controller 130, 400 calculate a new parity entry, the new parity entry can be stored in the parity memory block Block-Parity within the memory device 150 (Bin/PGT Write).

When locations where plural data entries and a parity entry are stored are determined, the controller 130, 400 may perform an operation to recalculate or regenerate a parity entry based on only valid data entries and store the recalculated parity entry in the memory device 150. Garbage collection may be understood as an operation which includes not deleting a parity-related data entry but changing a location of the parity-related data entry from a first location to a second location. Accordingly, because the plurality of data entries per se is not changed, a parity entry corresponding to the plurality of data entries does not have to be changed or updated. However, garbage collection may include an operation for updating a location (e.g., a physical address from the first location to the second location) of the data entry, which is stored and recorded in metadata corresponding to the parity entry.

The memory system 110 including the parity generating device 510 may be configured to copy or migrate the plural data entries and the parity entry in locations which are not fixed but adjustable. Thus, during the garbage collection, the memory system 110 can perform a parity tracking operation, a parity recalculation operation, and an operation of removing the physical address of the erased data entry from the parity entry, which are performed during the data erase operation. Further, because valid data entries are programmed into a new memory block during the garbage collection, an operation of adding or inserting physical addresses of the valid data entries in the parity entry would be performed.

However, in the memory system 110 including the parity generating circuitry 510, the parity operation buffer 514 used by the parity generating circuitry 510 that performs the parity recalculation or regeneration operation does not have to be configured to have a size proportional to a size of data entries included in the memory block that is a target of garbage collection.

Figure 36:
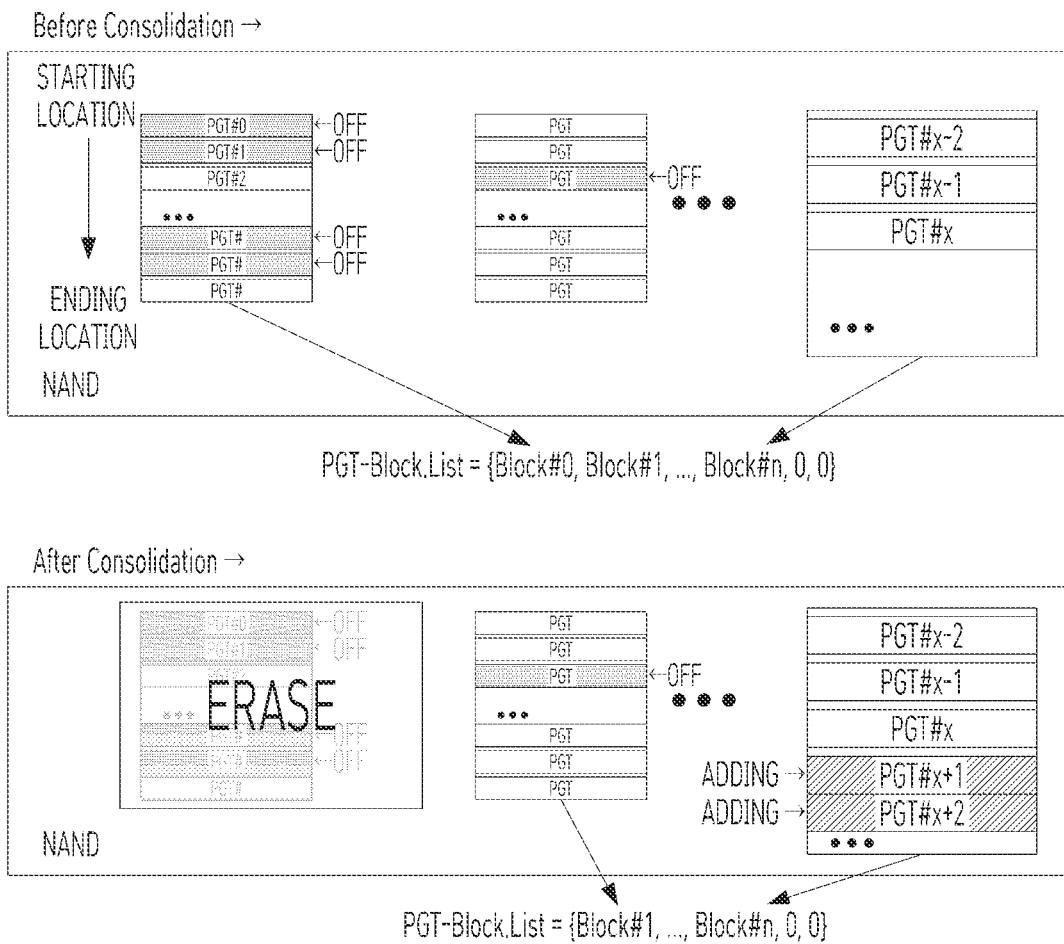
FIG. 36 illustrates a consolidation operation performed in the memory system.

FIG. 36 illustrates a consolidation operation performed in the memory system.

According to an embodiment, the maximum number of parity groups may be set in advance according to a size of the data storage capacity of the memory system 110. Accordingly, sizes of the parity entry and parity group table may also be set according to the size of the data storage capacity. As a data entry is stored and deleted in the memory system 110, parity groups can be exhausted, and each parity group may include less data entries than when each parity group is first generated. The memory system 110 can perform the consolidation operation on old parity groups to reduce the number of parity groups used and secure at least one parity group that can be allocated to a new data entry. Consolidation operation in the memory system 110 that stores a parity entry generated through SOFT-XOR performed by the parity generating circuitry 510 may be performed as follows.

Herein, the consolidation operation can include an operation for managing parity entries included in a parity group table. According to an embodiment, garbage collection may also be performed on a memory block that stores a plurality of parity entries, which will be described as a consolidation operation. In this case, a parity entry rather than a plurality of data entries associated with the parity entry may be moved or migrated to a new memory block. In this case, the parity entry itself and locations of the plurality of data entries corresponding to the parity entry might not be changed.

The consolidation operation performed within the memory system 110 that is configured to store a parity entry which is generated through SOFT-XOR performed by the parity generating circuitry 510 may be performed as follows. Here, the consolidation operation is for securing a free block by erasing invalid entries from a memory block (e.g., an oldest memory block (Parity Block List[ ]) storing parity entries), which may be performed similarly to garbage collection. For example, the memory system 110 can move all valid entries in the Oldest Block to the Last-Block (MOVE), and then erase the Oldest Block (ERASE). Referring to FIG. 36, for the above-described consolidation operation, the controller 130, 400 may track the list PGT-Block.List={ } for the parity group table in the memory device 150. The controller 130, 400 can remove information regarding the erased parity groups from the list PGT-Block.List={ } and add information regarding at least one newly added parity group PGT #x+1, PGT #x+2 to the list PGT-Block.List={ }.

Parity search and tracking operations during the consolidation operation can be performed according to an order in which each parity group is included in the parity group table. The consolidation path for the integration operation may proceed in the order from the first entry Entry0, which is the oldest memory block, to the 1904th entry Entry1903. For example, the oldest memory block may be the first memory block Block #0 in the list PGT-Block.List={ }. The number of entries stored in each memory block may vary depending on the internal configuration of the memory device 150. The controller 130, 400 can check a valid map or a bitmap indicating validity for each entry along a consolidation path for integrated operation.

The controller 130, 400 select at least one entry whose validity has been confirmed through the valid map or the bitmap of the first memory block Block #0 and move the selected entry to the most recent memory block Last-Block.

Thereafter, the controller 130, 400 may erase the first memory block Block #0, which is the oldest memory block, and add the erased memory block to the free block list.

The controller 130, 400 may erase the first memory block Block #0 in the list PGT-Block.List={ }. Likewise, the controller 130, 400 may exclude 1904 bits corresponding to the oldest first entry Entry0 to the 1904th entry (Entry1903) from the valid map or the bitmap.

For example, a valid parity entry search in the consolidation operation may be performed along the consolidation path. Through the consolidation path, valid map for each entry may be checked in an order from Entry0 of Oldest Block to Entry1903. In the consolidation operation, GC of the oldest block can be performed as follows.

① FTL examines the Valid-Map from Block #0 of the List.
② FTL moves the entries that are ON on the Valid-Map to the Last-Entry of the Last-Block.
③ FTL repeats ② for all valid entries of Block #0.
④ FTL erases Block #0 and adds it to the Free Block list.
⑤ FTL deletes List[0] by shift-left entries in List[ ].
⑥ FTL deletes the Oldest-Block by shift-left 1904 bit in the Valid-Map.

According to an embodiment, when a memory block allocated to store parity entries is exhausted while frequently generating and updating a parity entry, the controller 130 might start to perform the consolidation operation of the memory block allocated to store the parity entry. For example, the consolidation operation may be a sort of background operations independently performed within the memory system 110 in which the host 102, which is an external device, does not participate.

According to an embodiment, a timing at which the consolidation operation is performed may vary depending on the internal configuration of the memory device 150. Based on an amount of data entries to be programmed within a preset time, the timing may be predictable. For example, the timing at which the integration operation is performed may vary depending on how many word lines coupled to memory cells or how many cell strings each memory block in the memory device 150 includes. Additionally, the timing at which the consolidation operation is performed may vary depending on the amount of data programmed into the memory device 150 during one week, one day, or one hour. The internal configuration of the memory device 150 may be designed or determined to reduce the impact of the consolidation operation, which is a background operation, on the data input/output performance of the memory system 110.

According to an embodiment, if it is assumed that 1024 XORs per bin are processed for the consolidation operation, one entry per 16 MB may be used. In the configuration of 1904ea Entry per Block, Free Block may be required for every 30 GB write on average. According to the TBW definition of Mobile PRD, assuming 18 GB/day, 1 free block can be calculated in 1.5 days.

As above described, the memory system according to an embodiment of the present disclosure can reduce overheads that occur in a process of distributing and storing large amounts of data entries.

Further, the memory controller in the memory system according to an embodiment of the present disclosure can reduce a size of buffer memory or a cache memory usage during an operation of generating a parity entry associated with data entries distributed and stored in the memory device. Thus, a size of the volatile memory device included in the memory controller and allocated for generating the parity entry can be reduced, or a storage space in the volatile memory device can be utilized or available for various purposes other than generating the parity entry during storing the data entries, thereby improving resource usage efficiency of the memory system.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods or operations of the computer, processor, controller, or other signal processing device, are described in detail, the code or instructions for implementing the operations of the method embodiments may transform the computer, processor, controller, or other signal processing device into a special-purpose processor for performing the methods herein.

Also, another embodiment may include a computer-readable medium, e.g., a non-transitory computer-readable medium, for storing the code or instructions described above. The computer-readable medium may be a volatile or non-volatile memory or other storage device, which may be removably or fixedly coupled to the computer, processor, controller, or other signal processing device which is to execute the code or instructions for performing the method embodiments or operations of the apparatus embodiments herein.

The controllers, processors, control circuitry, devices, modules, units, multiplexers, generators, logic, interfaces, decoders, drivers, generators and other signal generating and signal processing features of the embodiments disclosed herein may be implemented, for example, in non-transitory logic that may include hardware, software, or both. When implemented at least partially in hardware, the controllers, processors, control circuitry, devices, modules, units, multiplexers, generators, logic, interfaces, decoders, drivers, generators and other signal generating and signal processing features may be, for example, any of a variety of integrated circuits including but not limited to an application-specific integrated circuit, a field-programmable gate array, a combination of logic gates, a system-on-chip, a microprocessor, or another type of processing or control circuit.

When implemented at least partially in software, the controllers, processors, control circuitry, devices, modules, units, multiplexers, generators, logic, interfaces, decoders, drivers, generators and other signal generating and signal processing features may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods or operations of the computer, processor, microprocessor, controller, or other signal processing device, are described in detail, the code or instructions for implementing the operations of the method embodiments may transform the computer, processor, controller, or other signal processing device into a special-purpose processor for performing the methods described herein.

While the present teachings have been illustrated and described with respect to the specific embodiments, it will be apparent to those skilled in the art in light of the present disclosure that various changes and modifications may be made without departing from the spirit and scope of the disclosure as defined in the following claims. Furthermore, the embodiments may be combined to form additional embodiments.

What is claimed is:

1. A memory system, comprising:
    plural memory regions comprising plural memory dies, plural memory planes, or plural memory blocks in which plural data entries are distributed and stored to resolve an uncorrectable error correction code error (UECC); and
    a memory controller comprising parity generating circuitry configured to perform logical operations on the plural data entries, based on an order in which the plural data entries are transmitted to the plural memory regions, to generate a parity entry, the memory controller configured to change a number of the plural data entries involved in the logical operations.

2. The memory system according to claim 1, wherein the plural memory regions are coupled via plural channels to the memory controller.

3. The memory system according to claim 1, wherein the data entry comprises metadata, parity group information, user data, and parity data,
    wherein the parity group information indicates which parity group the data entry belongs to, and
    wherein the parity data is generated based on an error correction code used by an ECC module.

4. The memory system according to claim 1, wherein the parity entry comprises:
    a result of the logical operations; and
    physical addresses indicating locations at which the plural data entries are stored in the plural memory regions.

5. The memory system according to claim 1, wherein the parity entry comprises information regarding a number of the plural data entries.

6. The memory system according to claim 1, wherein each of the plural memory regions is distinguished from each other based on a number of cell strings coupled to a single word line in the memory plane and a number of bits of multi-bit data stored in each memory cell.

7. The memory system according to claim 1, wherein a number of the plural memory regions corresponds to a number of open memory blocks.

8. The memory system according to claim 1, wherein the plural memory regions comprise a parity memory block configured to store the parity entry without the plural data entries.

9. The memory system according to claim 1, wherein the logical operations are exclusive OR (XOR) operations.

10. The memory system according to claim 1, wherein the parity generating circuitry comprises:
    a calculation circuit configured to perform the logical operations; and
    a buffer coupled to the calculation circuit and configured to provide a previous result for the logical operations and store a current result of the logical operations.

11. The memory system according to claim 10, wherein the buffer is configured to store data having a size corresponding to data intertemporally programmed in the plural memory regions.

12. The memory system according to claim 10, wherein the buffer has a size equal to or less than a size of page buffers included in, or coupled to, the plural memory regions.

13. The memory system according to claim 1, wherein, when the memory controller erases at least one data entry among the plural data entries, the parity generating circuitry is configured to:
    perform the logical operation on the at least one data entry and the parity entry;
    remove location information regarding the at least one data entry from the parity entry; and
    output an updated parity entry to be stored in the plural memory regions.

14. The memory system according to claim 1, wherein the memory controller performs garbage collection or wear leveling to at least some memory regions of the plural memory regions.

15. The memory system according to claim 14, wherein the garbage collection comprises:
    at least one logical operation performed on a first data entry which is invalid and stored in the at least some memory regions and a first parity entry associated with the first data entry;
    an operation of erasing a first physical address of the first data entry in the first parity entry; and
    an operation of adding a second physical address in the first parity entry, the second physical address indicating a location in which a second data entry which is valid and stored in the at least some memory regions is migrated.

16. The memory system according to claim 1, wherein the memory controller comprises a flash translation layer configured to:
    establish a parity group including the plural data entries and the parity entry;
    determine locations in which the plural data entries and the parity entry are stored; and
    transfer the parity group and the locations to the parity generating circuitry.

17. The memory system according to claim 16, wherein the flash translation layer is configured to, after recognizing an error in at least one of the plural data entries, search for the parity entry associated with the plural data entries, sequentially read the plural data entries based on the location information of the plural data entries, which is included in the parity entry, and
    wherein the parity generating circuitry is configured to perform the logical operation on the parity entry and the plural data entries sequentially read from the plural data entries.

18. The memory system according to claim 16, wherein, two data entries, stored in two cell strings coupled to a single word line included in at least one of the plural memory regions, belong to different parity groups.

* * * * *